(12) United States Patent
Won

(10) Patent No.: US 11,729,737 B2
(45) Date of Patent: Aug. 15, 2023

(54) METHODS, APPARATUSES, AND COMPUTER PROGRAM PRODUCTS FOR HANDLING EMERGENCY SERVICES IN PRIVATE NETWORKS

(71) Applicant: Nokia Technologies Oy, Espoo (FI)

(72) Inventor: Sung Hwan Won, Irving, TX (US)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 17/167,129

(22) Filed: Feb. 4, 2021

(65) Prior Publication Data

US 2021/0250890 A1 Aug. 12, 2021

Related U.S. Application Data

(60) Provisional application No. 62/972,912, filed on Feb. 11, 2020.

(51) Int. Cl.
*H04W 60/04* (2009.01)
*H04W 76/34* (2018.01)
(Continued)

(52) U.S. Cl.
CPC .......... *H04W 60/04* (2013.01); *H04W 48/16* (2013.01); *H04W 76/11* (2018.02); *H04W 76/34* (2018.02); *H04W 76/50* (2018.02); *H04W 84/042* (2013.01)

(58) Field of Classification Search
CPC ..... H04W 60/04; H04W 48/16; H04W 76/11; H04W 76/34; H04W 76/50;
(Continued)

(56) References Cited

U.S. PATENT DOCUMENTS

2019/0124561 A1* 4/2019 Faccin ................. H04W 8/02
2020/0329524 A1* 10/2020 Park ................... H04W 48/16
(Continued)

OTHER PUBLICATIONS

Prados-Garzon, Jonathan, et al. "5G Non-Public Networks: Standardization, Architectures and Challenges." IEEE Access 9 (2021) (Year: 2021).*
(Continued)

*Primary Examiner* — Sharad Rampuria
(74) *Attorney, Agent, or Firm* — Alston & Bird LLP

(57) ABSTRACT

Methods, apparatuses, and computer program products are provided for handling session requests for emergency services. Updated closed access group (CAG) configuration information can be provided to user equipment (UE) requesting an emergency session with a public land mobile network (PLMN), and the UE may update their CAG information or discontinue its session request. When the PLMN determines that the UE's session request to the PLMN was sent via a non-CAG cell, the PLMN may then determine if the session request is for emergency services, in which case the PLMN may decide to not clear or reject the session request, while if the PLMN determines that the session request via the non-CAG cell is for non-emergency services, then the PLMN may clear or reject the session request. When a session request is rejected by the PLMN, the UE may enter a deregistered state and conduct a search for a new PLMN.

14 Claims, 12 Drawing Sheets

(51) Int. Cl.
  *H04W 76/50* (2018.01)
  *H04W 76/11* (2018.01)
  *H04W 48/16* (2009.01)
  *H04W 84/04* (2009.01)

(58) Field of Classification Search
  CPC ..... H04W 84/042; H04W 48/18; H04W 4/50; H04W 4/90; H04W 72/04; H04W 72/12; H04W 76/00; H04B 7/2121; H04B 7/2123; H04J 2203/0069; H04Q 2213/394
  See application file for complete search history.

(56) References Cited

U.S. PATENT DOCUMENTS

| | | | | |
|---|---|---|---|---|
| 2020/0351980 | A1* | 11/2020 | Talebi Fard | H04W 68/00 |
| 2021/0297859 | A1* | 9/2021 | Faccin | H04W 12/082 |
| 2022/0174464 | A1* | 6/2022 | Ohlsson | H04W 76/50 |
| 2023/0041912 | A1* | 2/2023 | Talebi Fard | H04W 36/0016 |

OTHER PUBLICATIONS

Prados-Garzon, Jonathan, et al. "5G non-public networks: Standardization, architectures and challenges." IEEE Access 9 (2021): 153893-153908 (Year: 2021).*
Extended European Search Report for European Application No. 21155413.4 dated Nov. 8, 2021, 15 pages.
International Search Report and Written Opinion for Patent Cooperation Treaty Application No. PCT/EP2021/052770 dated Jun. 30, 2021, 18 pages.
NTT Docomo et al., "PNI-NPN CAG Configuration Update", Change Request 23.502, CR 1956 rev 3, 3GPP TSG-SA WG2 Meeting #136-AH, S2-2001522, (Jan. 13-17, 2020), 6 pages.
Partial European Search Report for European Application No. 21155413.4 dated Jun. 17, 2021, 14 pages.
Samsung, "Emergency Registered State Handling", 3GPP TSG-CT WG1 Meeting #121, C1-198913, (Nov. 11-15, 2019), 22 pages.
"3rd Generation Partnership Project; Technical Specification Group Services and System Aspects; System architecture for the 5G System (5GS); Stage 2 (Release 16)", 3GPP TS 23.501 v16.3.0 (Dec. 2019), 417 pages.
"3rd Generation Partnership Project; Technical Specification Group Core Network and Terminals; Non-Access-Stratum (NAS) Functions Related to Mobile Station (MS) in Idle Mode (Release 16)", 3GPP TS 23.122 v16.4.0 (Dec. 19, 2019), 80 pages.
"3rd Generation Partnership Project; Technical Specification Group Services and System Aspects; Security Architecture and Procedures for 5G System (Release 16)", 3GPP TS 33.501 v.16.1.0 (Dec. 31, 2019), 202 pages.
"3rd Generation Partnership Project; Technical Specification Group Services and System Aspects; Service requirements for the 5G system; Stage 1 (Release 17)", 3GPP TS 22.261 v17.1.0 (Dec. 27, 2019), 83 pages.
"3rd Generation Partnership Project; Technical Specification Group Services and System Aspects; Procedures for the 5G System (5GS); Stage 2 (Release 16)" 3GPP TS 23.502 v16.3.0 (Dec. 22, 2019), 558 pages.
"3rd Generation Partnership Project; Technical Specification Group Core Network and Terminals; Non-Access-Stratum (NAS) protocol for Evolved Packet System (EPS); Stage 3 (Release 16)", 3GPP TS 24.301 v16.3.0 (Dec. 20, 2019), 532 pages.
"3rd Generation Partnership Project; Technical Specification Group Core Network and Terminals; Non-Access-Stratum (NAS) Protocol for 5G Systems (5GS); Stage 3; (Release 15)", 3GPP TS 24.501 v16.3.0 (Dec. 20, 2019), 645 pages.
"3rd Generation Partnership Project; Technical Specification Group Core Network and Terminals; 5G System; Session Management Services; Stage 3 (Release 16)" 3GPP TS 29.502 v16.2.0 (Dec. 2019), 211 pages.
"3rd Generation Partnership Project; Technical Specification Group Services and System Aspects; Architecture enhancements for 5G System (5GS) to support Vehicle-to-Everything (V2X) services (Release 16)", 3GPP TS 23.287 v16.1.0 (Dec. 2019), 51 pages.
"3rd Generation Partnership Project; Technical Specification Group Core Network and Terminals; Technical realization of the Short Message Service (SMS) (Release 15)", 3GPP TS 23.040 v15.3.0 (Mar. 2019), 216 pages.
"3rd Generation Partnership Project; Technical Specification Group Services and System Aspects; 5G System (5GS) Location Services (LCS); Stage 2 (Release 16)", 3GPP TS 23.273 v16.2.0 (Dec. 2019), 91 pages.
"3rd Generation Partnership Project; Technical Specification Group Core Network and Terminals; Universal Subscriber Identity Module (USIM) Application Toolkit (USAT) (Release 15)", 3GPP TS 31.111 v15.8.0 (Dec. 2019), 156 pages.
Office Action for Taiwanese Application No. 110104763 dated Apr. 12, 2022, 17 pages.
Notice of Allowance for Taiwanese Application No. 110104763 dated Jan. 19, 2023, 3 pages.
First Examination Report for Indian Application No. 202247050648 dated Mar. 6, 2023, 9 pages.

* cited by examiner

METHODS, APPARATUSES, AND COMPUTER PROGRAM PRODUCTS FOR HANDLING EMERGENCY SERVICES IN PRIVATE NETWORKS

CROSS-REFERENCE TO RELATED APPLICATIONS

The present application claims priority to, and the benefit of, U.S. Provisional Application Ser. No. 62/972,912, titled "Method, Apparatuses, And Computer Program Products For Handling Emergency Services In Private Networks" and filed on Feb. 11, 2020, the entire disclosures of which are hereby incorporated herein by reference in their entireties for all purposes.

TECHNOLOGICAL FIELD

An example embodiment relates generally to managing communication in a communication system, and more particularly to handling emergency services in private networks.

BACKGROUND

A communication system can be often operate as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system, at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined.

BRIEF SUMMARY

Described herein are methods, apparatuses, and computer program products provided in accordance with example embodiments to handle emergency services in private networks. In some embodiments, a method can comprise receiving, at a user equipment (UE), a configuration update command message from a network entity of a current public land mobile network (PLMN), the configuration update command message comprising an updated closed access group (CAG) information list; and performing, by the UE, a local release of all protocol data unit (PDU) session(s) except for an emergency PDU session, if the entry for the PLMN in the received CAG information list includes an indication that the UE is only allowed to access the PLMN via CAG cells and the allowed CAG list for the PLMN in the received CAG information list does not include any CAG-identification (CAG-ID).

In some embodiments, the configuration update command message may comprise one or more of: a fifth-generation-globally unique temporary identity (5G-GUTI), a tracking area identify (TAI) list, one or more allowed network slice selection assistance information (NSSAI), one or more mapped single-NSSAIs, local area data network (LADN) information, a service area list, a mobile indicated connection only (MICO) indication, network identity and timezone (NITZ) information, one or more configured NSSAI, one or more rejected NSSAI, a network slicing subscription change indication, one or more operator-defined access category definitions, a short message service (SMS) indication, a service gap time value, a UE radio capability identity, a 5G system registration result, or a UE radio capability identity deletion indication.

In some embodiments, the configuration update command message may comprise a configuration update indication information element comprising a registration requested bit, the registration requested bit being set to indicate that registration is requested.

In some embodiments, the method can further comprise transmitting, from the UE, to or towards the network entity of the current PLMN, a PDU session request.

In some embodiments, an apparatus can comprise at least one processor; and at least one memory including computer program code, the at least one memory and the computer program code configured to, with the at least one processor, cause the apparatus at least to perform: receiving, at a user equipment (UE), a configuration update command message from a network entity of a current public land mobile network (PLMN), the configuration update command message comprising an updated closed access group (CAG) information list; and performing, by the UE, a local release of all protocol data unit (PDU) session(s) except for an emergency PDU session, if the entry for the PLMN in the received CAG information list includes an indication that the UE is only allowed to access the PLMN via CAG cells and the allowed CAG list for the PLMN in the received CAG information list does not include any CAG-identification (CAG-ID).

In some embodiments, the configuration update command message may comprise one or more of: a fifth-generation-globally unique temporary identity (5G-GUTI), a tracking area identify (TAI) list, one or more allowed network slice selection assistance information (NSSAI), one or more mapped single-NSSAIs, local area data network (LADN) information, a service area list, a mobile indicated connection only (MICO) indication, network identity and timezone (NITZ) information, one or more configured NSSAI, one or more rejected NSSAI, a network slicing subscription change indication, one or more operator-defined access category definitions, a short message service (SMS) indication, a service gap time value, a UE radio capability identity, a 5G system registration result, or a UE radio capability identity deletion indication.

In some embodiments, the configuration update command message may comprise a configuration update indication information element comprising a registration requested bit, the registration requested bit being set to indicate that registration is requested.

In some embodiments, the at least one memory and the computer program code may be configured to, with the at least one processor, cause the apparatus at least to perform: transmitting, to or towards a network entity of the current PLMN, a PDU session request.

In some embodiments, an apparatus can comprise means, such as a processor or processing circuitry and a memory storing computer program code, for receiving a configuration update command message from a network entity of a current public land mobile network (PLMN), the configuration update command message comprising an updated closed access group (CAG) information list; and means for performing a local release of all protocol data unit (PDU) session(s) except for an emergency PDU session, if the entry for the PLMN in the received CAG information list includes an indication that user equipment are only allowed to access the PLMN via CAG cells and the allowed CAG list for the PLMN in the received CAG information list does not include any CAG-ID.

In some embodiments, the configuration update command message may comprise one or more of: a fifth-generation-globally unique temporary identity (5G-GUTI), a tracking area identify (TAI) list, one or more allowed network slice selection assistance information (NSSAI), one or more mapped single-NSSAIs, local area data network (LADN) information, a service area list, a mobile indicated connection only (MICO) indication, network identity and timezone (NITZ) information, one or more configured NSSAI, one or more rejected NSSAI, a network slicing subscription change indication, one or more operator-defined access category definitions, a short message service (SMS) indication, a service gap time value, a UE radio capability identity, a 5G system registration result, or a UE radio capability identity deletion indication.

In some embodiments, the configuration update command message may comprise a configuration update indication information element comprising a registration requested bit, the registration requested bit being set to indicate that registration is requested.

In some embodiments, the apparatus can further comprise: means for transmitting, from the apparatus, to or towards the network entity of the current PLMN, a PDU session request.

In some embodiments, a computer program product can comprise a non-transitory computer readable medium comprising computer instructions stored thereon for performing at least the following: receiving, at a user equipment (UE), a configuration update command message from a network entity of a current public land mobile network (PLMN), the configuration update command message comprising an updated closed access group (CAG) information list; and performing, by the UE, a local release of all protocol data unit (PDU) session(s) except for an emergency PDU session, if the entry for the PLMN in the received CAG information list includes an indication that the UE is only allowed to access the PLMN via CAG cells and the allowed CAG list for the PLMN in the received CAG information list does not include any CAG-ID.

In some embodiments, the configuration update command message may comprise one or more of: a fifth-generation-globally unique temporary identity (5G-GUTI), a tracking area identify (TAI) list, one or more allowed network slice selection assistance information (NSSAI), one or more mapped single-NSSAIs, local area data network (LADN) information, a service area list, a mobile indicated connection only (MICO) indication, network identity and timezone (NITZ) information, one or more configured NSSAI, one or more rejected NSSAI, a network slicing subscription change indication, one or more operator-defined access category definitions, a short message service (SMS) indication, a service gap time value, a UE radio capability identity, a 5G system registration result, or a UE radio capability identity deletion indication.

In some embodiments, the configuration update command message may comprise a configuration update indication information element comprising a registration requested bit, the registration requested bit being set to indicate that registration is requested.

In some embodiments, the non-transitory computer readable medium can further comprise computer instructions stored thereon for performing at least the following: transmitting, from the UE, to or towards the network entity of the current PLMN, a PDU session request.

In some embodiments, a method can comprise receiving, at a mobility management sublayer of a user equipment, from a network entity of a public land mobile network (PLMN), a downlink non-access stratum (NAS) transport message including a message to request session management and a cause value indicating that the UE is not authorized to make the request due to CAG constraints; sending an indication, from the mobility management sublayer of the user equipment to a session management sublayer of the user equipment, an indication that the message to request session management was not forwarded due to CAG along with the message to request session management; and, upon receiving, at the session management sublayer of the user equipment, the indication that the message to request session management was not forwarded due to CAG along with the message to request session management, stopping a timer associated with the session management request and aborting the procedure for the session management.

In some embodiments, an apparatus can comprise at least one processor; and at least one memory including computer program code, the at least one memory and the computer program code configured to, with the at least one processor, cause the apparatus at least to perform: receiving, at a mobility management sublayer of a user equipment, from a network entity of a public land mobile network (PLMN), a downlink non-access stratum (NAS) transport message including a message to request session management and a cause value indicating that the UE is not authorized to make the request due to CAG constraints; sending an indication, from the mobility management sublayer of the user equipment to a session management sublayer of the user equipment, an indication that the message to request session management was not forwarded due to CAG along with the message to request session management; and, upon receiving, at the session management sublayer of the user equipment, the indication that the message to request session management was not forwarded due to CAG along with the message to request session management, stopping a timer associated with the session management request and aborting the procedure for the session management.

In some embodiments, an apparatus can comprise means, such as a processor or processing circuitry and a memory storing computer program code, for receiving, at a mobility management sublayer of a user equipment, from a network entity of a public land mobile network (PLMN), a downlink non-access stratum (NAS) transport message including a message to request session management and a cause value indicating that the UE is not authorized to make the request due to CAG constraints; means for sending an indication, from the mobility management sublayer of the user equipment to a session management sublayer of the user equipment, an indication that the message to request session management was not forwarded due to CAG along with the message to request session management; and means for, upon receiving, at the session management sublayer of the user equipment, the indication that the message to request session management was not forwarded due to CAG along with the message to request session management, stopping a timer associated with the session management request and aborting the procedure for the session management.

In some embodiments, a computer program product can comprise a non-transitory computer readable medium comprising computer instructions stored thereon for performing at least the following: receiving, at a mobility management sublayer of a user equipment, from a network entity of a public land mobile network (PLMN), a downlink non-access stratum (NAS) transport message including a message to request session management and a cause value indicating that the UE is not authorized to make the request due to CAG constraints; sending an indication, from the mobility management sublayer of the user equipment to a session management sublayer of the user equipment, an indication that the message to request session management was not forwarded due to CAG along with the message to request session management; and, upon receiving, at the session management sublayer of the user equipment, the indication that the message to request session management was not forwarded due to CAG along with the message to request session management, stopping a timer associated with the session management request and aborting the procedure for the session management.

In some embodiments, a method can comprise receiving, at a user equipment, a configuration update command message from a network entity of a current public land mobile network (PLMN), the configuration update command message comprising an updated closed access group (CAG) information list; in an instance in which the configuration update command message is received via a particular CAG cell, an entry for the current PLMN in the CAG information list includes an indication that the user equipment is only allowed to access PLMNs via CAG cells, an allowed CAG list for the current PLMN in the received CAG information list does not include CAG identification information, and the user equipment has not requested or established an emergency protocol data unit (PDU) session with the current PLMN, entering a deregistered PLMN search state and applying a PLMN selection process based on the updated CAG information list; in an instance in which the configuration update command message is received via a particular CAG cell, the entry for the current PLMN in the CAG information list includes an indication that the user equipment is only allowed to access the current PLMN via CAG cells, the allowed CAG list for the current PLMN in the received CAG information list does not include CAG identification information, and the user equipment has requested or established an emergency PDU session with the current PLMN, performing a local release of all PDU sessions except for the emergency PDU session.

In some embodiments, the method can further comprise: in an instance in which the configuration update command message is received via a non-CAG cell, the entry for the current PLMN in the CAG information list includes an indication that the UE is only allowed to access PLMNs CAG cells, the allowed CAG list for the current PLMN in the received CAG information list does not include CAG identification information, and the user equipment has not requested or established an emergency PDU session with the current PLMN, entering the deregistered PLMN search state and applying the PLMN selection process based on the updated CAG information list.

In some embodiments, the method can further comprise: in an instance in which the configuration update command message is received via a non-CAG cell, the entry for the current PLMN in the CAG information list includes an indication that the UE is only allowed to access PLMNs CAG cells, the allowed CAG list for the current PLMN in the received CAG information list does not include CAG identification information, and the user equipment has requested or established an emergency PDU session with the current PLMN, performing the local release of all PDU sessions except for the emergency PDU session.

In some embodiments, an apparatus can be provided that comprises at least one processor; and at least one memory including computer program code, the at least one memory and the computer program code configured to, with the at least one processor, cause the apparatus at least to perform: receiving, at a user equipment, a configuration update command message from a network entity of a current public land mobile network (PLMN), the configuration update command message comprising an updated closed access group (CAG) information list; in an instance in which the configuration update command message is received via a particular CAG cell, an entry for the current PLMN in the CAG information list includes an indication that the user equipment is only allowed to access PLMNs via CAG cells, an allowed CAG list for the current PLMN in the received CAG information list does not include CAG identification information, and the user equipment has not requested or established an emergency protocol data unit (PDU) session with the current PLMN, entering a deregistered PLMN search state and applying a PLMN selection process based on the updated CAG information list; in an instance in which the configuration update command message is received via a particular CAG cell, the entry for the current PLMN in the CAG information list includes an indication that the user equipment is only allowed to access the current PLMN via CAG cells, the allowed CAG list for the current PLMN in the received CAG information list does not include CAG identification information, and the user equipment has requested or established an emergency PDU session with the current PLMN, performing a local release of all PDU sessions except for the emergency PDU session.

In some embodiments, the at least one memory and the computer program code can be configured to, with the at least one processor, cause the apparatus at least to perform: in an instance in which the configuration update command message is received via a non-CAG cell, the entry for the current PLMN in the CAG information list includes an indication that the UE is only allowed to access PLMNs CAG cells, the allowed CAG list for the current PLMN in the received CAG information list does not include CAG identification information, and the user equipment has not requested or established an emergency PDU session with the current PLMN, entering the deregistered PLMN search state and applying the PLMN selection process based on the updated CAG information list.

In some embodiments, the at least one memory and the computer program code can be configured to, with the at least one processor, cause the apparatus at least to perform:

in an instance in which the configuration update command message is received via a non-CAG cell, the entry for the current PLMN in the CAG information list includes an indication that the UE is only allowed to access PLMNs CAG cells, the allowed CAG list for the current PLMN in the received CAG information list does not include CAG identification information, and the user equipment has requested or established an emergency PDU session with the current PLMN, performing the local release of all PDU sessions except for the emergency PDU session.

In some embodiments, an apparatus can be provided that comprises means, such as a processor or processing circuitry and a memory storing computer program code, for receiving, at a user equipment, a configuration update command message from a network entity of a current public land mobile network (PLMN), the configuration update command message comprising an updated closed access group (CAG) information list; means for, in an instance in which the configuration update command message is received via a particular CAG cell, an entry for the current PLMN in the CAG information list includes an indication that the user equipment is only allowed to access PLMNs via CAG cells, an allowed CAG list for the current PLMN in the received CAG information list does not include CAG identification information, and the user equipment has not requested or established an emergency protocol data unit (PDU) session with the current PLMN, entering a deregistered PLMN search state and applying a PLMN selection process based on the updated CAG information list; means for, in an instance in which the configuration update command message is received via a particular CAG cell, the entry for the current PLMN in the CAG information list includes an indication that the user equipment is only allowed to access the current PLMN via CAG cells, the allowed CAG list for the current PLMN in the received CAG information list does not include CAG identification information, and the user equipment has requested or established an emergency PDU session with the current PLMN, performing a local release of all PDU sessions except for the emergency PDU session.

In some embodiments, the apparatus can further comprise: means for, in an instance in which the configuration update command message is received via a non-CAG cell, the entry for the current PLMN in the CAG information list includes an indication that the UE is only allowed to access PLMNs CAG cells, the allowed CAG list for the current PLMN in the received CAG information list does not include CAG identification information, and the user equipment has not requested or established an emergency PDU session with the current PLMN, entering the deregistered PLMN search state and applying the PLMN selection process based on the updated CAG information list.

In some embodiments, the apparatus can further comprise: means for, in an instance in which the configuration update command message is received via a non-CAG cell, the entry for the current PLMN in the CAG information list includes an indication that the UE is only allowed to access PLMNs CAG cells, the allowed CAG list for the current PLMN in the received CAG information list does not include CAG identification information, and the user equipment has requested or established an emergency PDU session with the current PLMN, performing the local release of all PDU sessions except for the emergency PDU session.

In some embodiments, a computer program product can be provided that comprises a non-transitory computer readable medium comprising computer instructions stored thereon for performing at least the following: receiving, at a user equipment, a configuration update command message from a network entity of a current public land mobile network (PLMN), the configuration update command message comprising an updated closed access group (CAG) information list; in an instance in which the configuration update command message is received via a particular CAG cell, an entry for the current PLMN in the CAG information list includes an indication that the user equipment is only allowed to access PLMNs via CAG cells, an allowed CAG list for the current PLMN in the received CAG information list does not include CAG identification information, and the user equipment has not requested or established an emergency protocol data unit (PDU) session with the current PLMN, entering a deregistered PLMN search state and applying a PLMN selection process based on the updated CAG information list; in an instance in which the configuration update command message is received via a particular CAG cell, the entry for the current PLMN in the CAG information list includes an indication that the user equipment is only allowed to access the current PLMN via CAG cells, the allowed CAG list for the current PLMN in the received CAG information list does not include CAG identification information, and the user equipment has requested or established an emergency PDU session with the current PLMN, performing a local release of all PDU sessions except for the emergency PDU session.

In some embodiments, the non-transitory computer readable medium can further comprise computer instructions stored thereon for, in an instance in which the configuration update command message is received via a non-CAG cell, the entry for the current PLMN in the CAG information list includes an indication that the UE is only allowed to access PLMNs CAG cells, the allowed CAG list for the current PLMN in the received CAG information list does not include CAG identification information, and the user equipment has not requested or established an emergency PDU session with the current PLMN, performing at least the following: entering the deregistered PLMN search state and applying the PLMN selection process based on the updated CAG information list.

In some embodiments, the non-transitory computer readable medium can further comprise computer instructions stored thereon for, in an instance in which the configuration update command message is received via a non-CAG cell, the entry for the current PLMN in the CAG information list includes an indication that the UE is only allowed to access PLMNs CAG cells, the allowed CAG list for the current PLMN in the received CAG information list does not include CAG identification information, and the user equipment has requested or established an emergency PDU session with the current PLMN, performing at least the following: performing the local release of all PDU sessions except for the emergency PDU session.

According to another embodiment, a method can be carried out that comprises: receiving, from a user equipment, a session request message to establish a session with a public land mobile network; in an instance in which the session request message comprises an initial emergency session request, sending a session acceptance message to the user equipment; in an instance in which the session request message does not comprise the initial emergency session request, determining a cell type through which the session request message was made and determining whether the user equipment is allowed to establish sessions with the public land mobile network through the determined cell type; and, in an instance in which the user equipment is not allowed to establish sessions with the public land mobile network through the determined cell type, sending a session rejection message to the user equipment.

In some embodiments, the method can further comprise: in an instance in which the session request message does not comprise the initial emergency session request, the session request was made through a closed access group cell, and a selected closed access group cell identification in the session request message is not included in a list of allowed closed access groups for the public land mobile network, sending the session rejection message to the user equipment.

In some embodiments, the method can further comprise: in an instance in which the session request message does not comprise the initial emergency session request, the session request was made through a non-closed access group cell, and an entry of a closed access group information list for the public land mobile network includes an indication that the user equipment is only allowed to access the public land mobile network through closed access group cells, sending the session rejection message to the user equipment.

According to another embodiment, an apparatus can be provided that comprises: at least one processor; and at least one memory including computer program code, the at least one memory and the computer program code configured to, with the at least one processor, cause the apparatus at least to perform: receiving, from a user equipment, a session request message to establish a session with a public land mobile network; in an instance in which the session request message comprises an initial emergency session request, sending a session acceptance message to the user equipment; in an instance in which the session request message does not comprise the initial emergency session request, determining a cell type through which the session request message was made and determining whether the user equipment is allowed to establish sessions with the public land mobile network through the determined cell type; and, in an instance in which the user equipment is not allowed to establish sessions with the public land mobile network through the determined cell type, sending a session rejection message to the user equipment.

In some embodiments, the at least one memory and the computer program code is configured to, with the at least one processor, cause the apparatus at least to perform: in an instance in which the session request message does not comprise the initial emergency session request, the session request was made through a closed access group cell, and a selected closed access group cell identification in the session request message is not included in a list of allowed closed access groups for the public land mobile network, sending the session rejection message to the user equipment.

In some embodiments, the at least one memory and the computer program code is configured to, with the at least one processor, cause the apparatus at least to perform: in an instance in which the session request message does not comprise the initial emergency session request, the session request was made through a non-closed access group cell, and an entry of a closed access group information list for the public land mobile network includes an indication that the user equipment is only allowed to access the public land mobile network through closed access group cells, sending the session rejection message to the user equipment.

According to another embodiment, an apparatus can be provided that comprises: means for receiving, from a user equipment, a session request message to establish a session with a public land mobile network; means for, in an instance in which the session request message comprises an initial emergency session request, sending a session acceptance message to the user equipment; means for, in an instance in which the session request message does not comprise the initial emergency session request, determining a cell type through which the session request message was made and determining whether the user equipment is allowed to establish sessions with the public land mobile network through the determined cell type; and means for, in an instance in which the user equipment is not allowed to establish sessions with the public land mobile network through the determined cell type, sending a session rejection message to the user equipment.

In some embodiments, the apparatus can further comprise: means for, in an instance in which the session request message does not comprise the initial emergency session request, the session request was made through a closed access group cell, and a selected closed access group cell identification in the session request message is not included in a list of allowed closed access groups for the public land mobile network, sending the session rejection message to the user equipment.

In some embodiments, the apparatus can further comprise: means for, in an instance in which the session request message does not comprise the initial emergency session request, the session request was made through a non-closed access group cell, and an entry of a closed access group information list for the public land mobile network includes an indication that the user equipment is only allowed to access the public land mobile network through closed access group cells, sending the session rejection message to the user equipment.

According to another embodiment, a computer program product can be provided that comprises a non-transitory computer readable medium comprising computer instructions stored thereon for performing at least the following: receiving, from a user equipment, a session request message to establish a session with a public land mobile network; in an instance in which the session request message comprises an initial emergency session request, sending a session acceptance message to the user equipment; in an instance in which the session request message does not comprise the initial emergency session request, determining a cell type through which the session request message was made and determining whether the user equipment is allowed to establish sessions with the public land mobile network through the determined cell type; and, in an instance in which the user equipment is not allowed to establish sessions with the public land mobile network through the determined cell type, sending a session rejection message to the user equipment.

In some embodiments, the non-transitory computer readable medium can further comprise computer instructions stored thereon for performing at least the following: in an instance in which the session request message does not comprise the initial emergency session request, the session request was made through a closed access group cell, and a selected closed access group cell identification in the session request message is not included in a list of allowed closed access groups for the public land mobile network, sending the session rejection message to the user equipment.

In some embodiments, the non-transitory computer readable medium can further comprise computer instructions stored thereon for performing at least the following: in an instance in which the session request message does not comprise the initial emergency session request, the session request was made through a non-closed access group cell, and an entry of a closed access group information list for the public land mobile network includes an indication that the user equipment is only allowed to access the public land mobile network through closed access group cells, sending the session rejection message to the user equipment.

In some embodiments, a method can be provided that comprises receiving, from a user equipment, a session request message for a public land mobile network; in an instance in which the session request message comprises an initial emergency session request, sending a session acceptance message to the user equipment; in an instance in which the session request message does not comprises the initial emergency session request, the session request was made through a closed access group cell, and a selected closed access group cell identification in the session request message is not included in a list of allowed closed access groups for the public land mobile network, sending a session rejection message to the user equipment; and, in an instance in which the session request message does not comprises the initial emergency session request, the session request was made through a non-closed access group cell, and an entry of a closed access group information list for the public land mobile network includes an indication that the user equipment is only allowed to access the public land mobile network through closed access group cells, sending the session rejection message to the user equipment.

In some embodiments, an apparatus can be provided that comprises at least one processor; and at least one memory including computer program code, the at least one memory and the computer program code configured to, with the at least one processor, cause the apparatus at least to perform: receiving, from a user equipment, a session request message for a public land mobile network; in an instance in which the session request message comprises an initial emergency session request, sending a session acceptance message to the user equipment; in an instance in which the session request message does not comprises the initial emergency session request, the session request was made through a closed access group cell, and a selected closed access group cell identification in the session request message is not included in a list of allowed closed access groups for the public land mobile network, sending a session rejection message to the user equipment; and, in an instance in which the session request message does not comprises the initial emergency session request, the session request was made through a non-closed access group cell, and an entry of a closed access group information list for the public land mobile network includes an indication that the user equipment is only allowed to access the public land mobile network through closed access group cells, sending the session rejection message to the user equipment.

In some embodiments, an apparatus can be provided that comprises means, such as a processor or processing circuitry and a memory storing computer program code, for receiving, from a user equipment, a session request message for a public land mobile network; means for, in an instance in which the session request message comprises an initial emergency session request, sending a session acceptance message to the user equipment; means for, in an instance in which the session request message does not comprises the initial emergency session request, the session request was made through a closed access group cell, and a selected closed access group cell identification in the session request message is not included in a list of allowed closed access groups for the public land mobile network, sending a session rejection message to the user equipment; and means for, in an instance in which the session request message does not comprises the initial emergency session request, the session request was made through a non-closed access group cell, and an entry of a closed access group information list for the public land mobile network includes an indication that the user equipment is only allowed to access the public land mobile network through closed access group cells, sending the session rejection message to the user equipment.

In some embodiments, a computer program product can be provided that comprises a non-transitory computer readable medium comprising computer instructions stored thereon for performing at least the following: receiving, from a user equipment, a session request message for a public land mobile network; in an instance in which the session request message comprises an initial emergency session request, sending a session acceptance message to the user equipment; in an instance in which the session request message does not comprises the initial emergency session request, the session request was made through a closed access group cell, and a selected closed access group cell identification in the session request message is not included in a list of allowed closed access groups for the public land mobile network, sending a session rejection message to the user equipment; and, in an instance in which the session request message does not comprises the initial emergency session request, the session request was made through a non-closed access group cell, and an entry of a closed access group information list for the public land mobile network includes an indication that the user equipment is only allowed to access the public land mobile network through closed access group cells, sending the session rejection message to the user equipment.

In some embodiments, a method can be provided that comprises receiving, at a mobility management sublayer of a user equipment, from a network entity of a public land mobile network (PLMN), a session rejection message comprising an indication that a session request received from the user equipment was not forwarded due to updated closed access group (CAG) requirements; sending an indication, from the mobility management sublayer of the user equipment to a session management sublayer of the user equipment, an indication that the session request was rejected by the PLMN due to updated CAG requirements; and upon receiving, at the session management sublayer of the user equipment, the indication that the session request was rejected by the PLMN due to updated CAG requirements, stopping a timer associated with the session request and discontinuing the session request.

In some embodiments, an apparatus can be provided that comprises at least one processor; and at least one memory including computer program code, the at least one memory and the computer program code configured to, with the at least one processor, cause the apparatus at least to perform: receiving, at a mobility management sublayer of a user equipment, from a network entity of a public land mobile network (PLMN), a session rejection message comprising an indication that a session request received from the user equipment was not forwarded due to updated closed access group (CAG) requirements; sending an indication, from the mobility management sublayer of the user equipment to a session management sublayer of the user equipment, an indication that the session request was rejected by the PLMN due to updated CAG requirements; and upon receiving, at the session management sublayer of the user equipment, the indication that the session request was rejected by the PLMN due to updated CAG requirements, stopping a timer associated with the session request and discontinuing the session request.

In some embodiments, an apparatus can be provided that comprises means, such as a processor or processing circuitry and a memory storing computer program code, for receiving, at a mobility management sublayer of a user equipment, from a network entity of a public land mobile network (PLMN), a session rejection message comprising an indication that a session request received from the user equipment was not forwarded due to updated closed access group (CAG) requirements; means for sending an indication, from the mobility management sublayer of the user equipment to a session management sublayer of the user equipment, an indication that the session request was rejected by the PLMN due to updated CAG requirements; and means for upon receiving, at the session management sublayer of the user equipment, the indication that the session request was rejected by the PLMN due to updated CAG requirements, stopping a timer associated with the session request and discontinuing the session request.

In some embodiments, a computer program product can be provided that comprises a non-transitory computer readable medium comprising computer instructions stored thereon for performing at least the following: receiving, at a mobility management sublayer of a user equipment, from a network entity of a public land mobile network (PLMN), a session rejection message comprising an indication that a session request received from the user equipment was not forwarded due to updated closed access group (CAG) requirements; sending an indication, from the mobility management sublayer of the user equipment to a session management sublayer of the user equipment, an indication that the session request was rejected by the PLMN due to updated CAG requirements; and upon receiving, at the session management sublayer of the user equipment, the indication that the session request was rejected by the PLMN due to updated CAG requirements, stopping a timer associated with the session request and discontinuing the session request.

Various other aspects are also described in the following detailed description and in the attached claims.

BRIEF DESCRIPTION OF THE DRAWINGS

Figure 1:
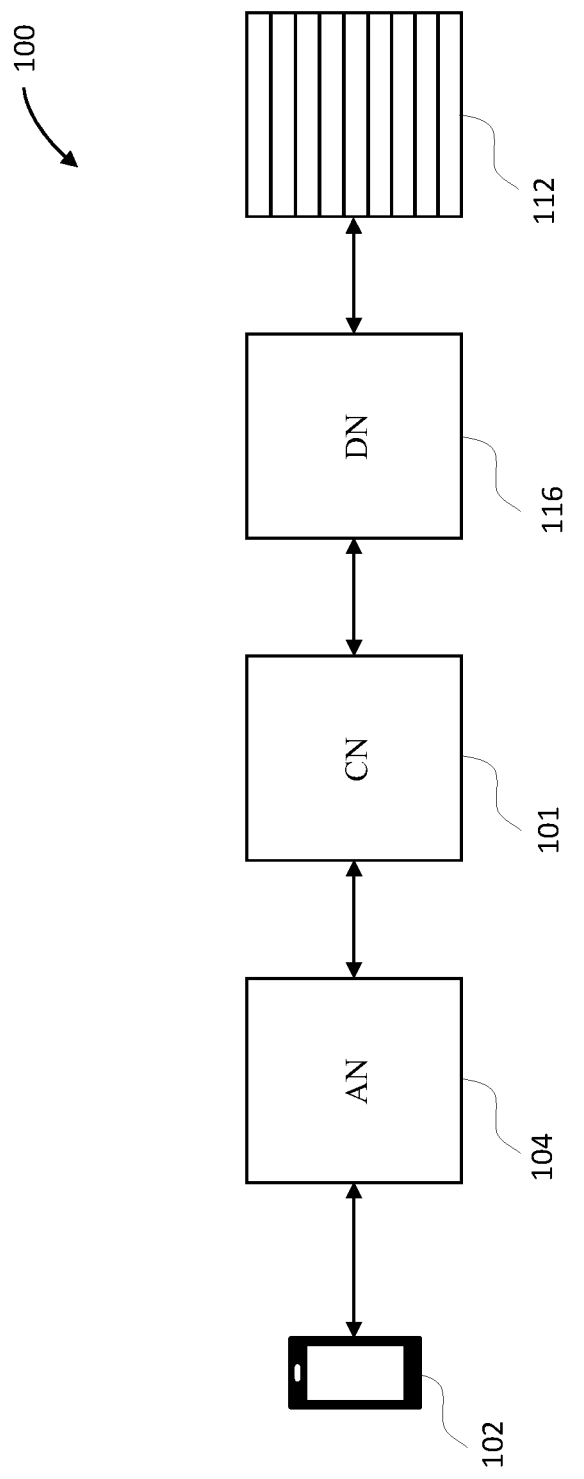
Figure 2:
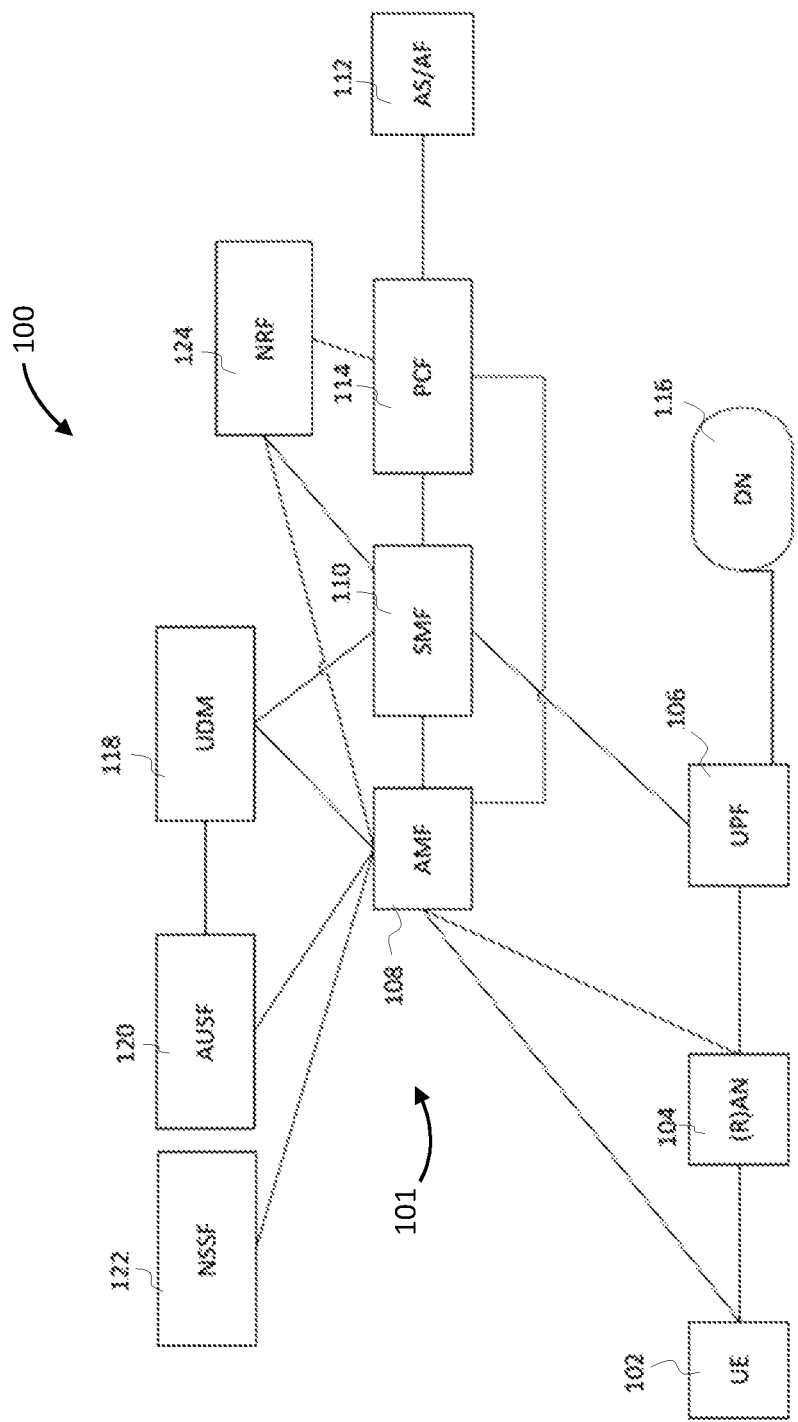
Figure 3:
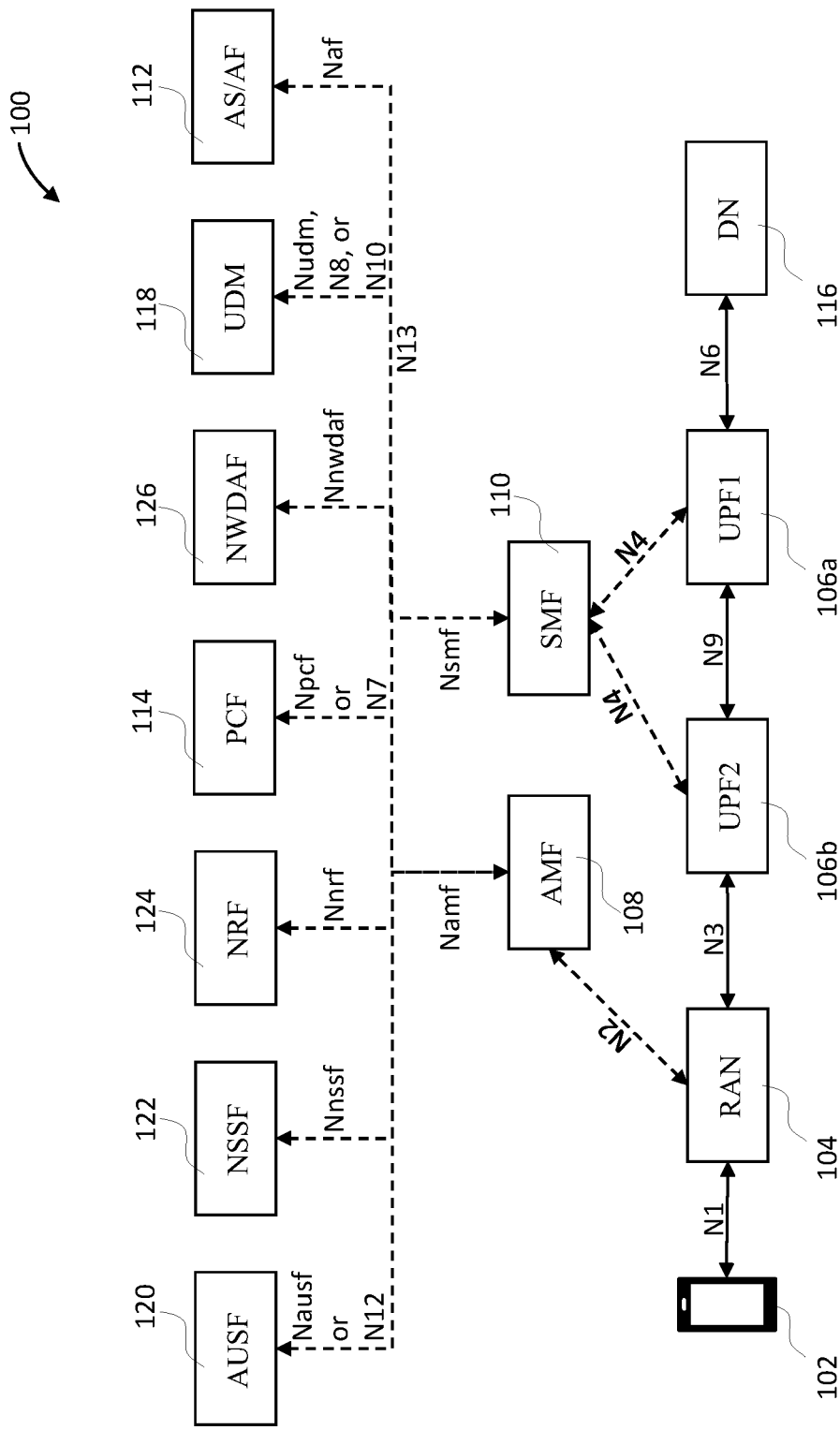
Figure 4:
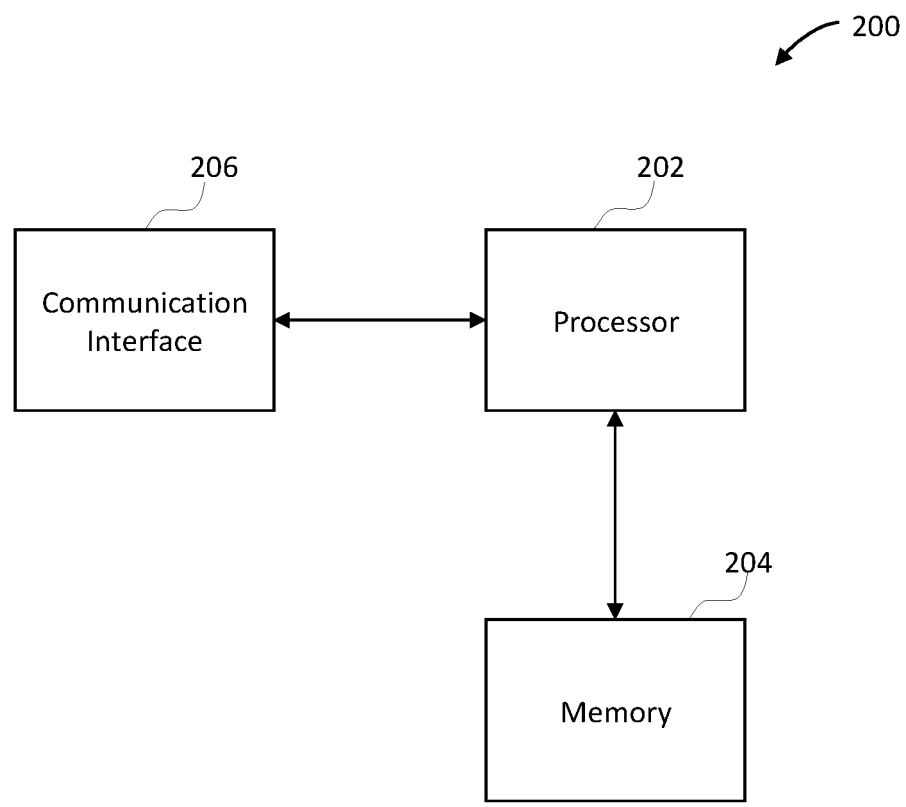
Figure 5:
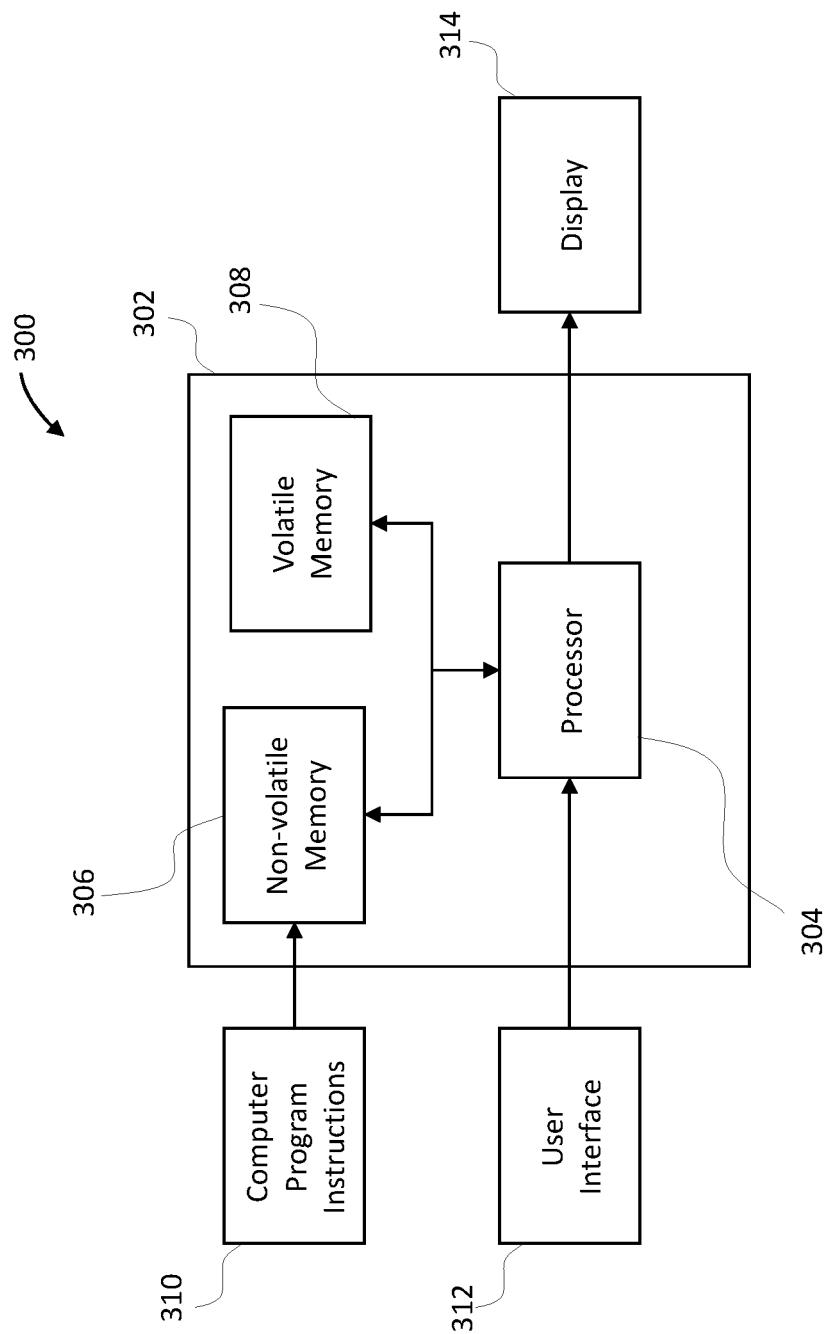
Figure 6A:
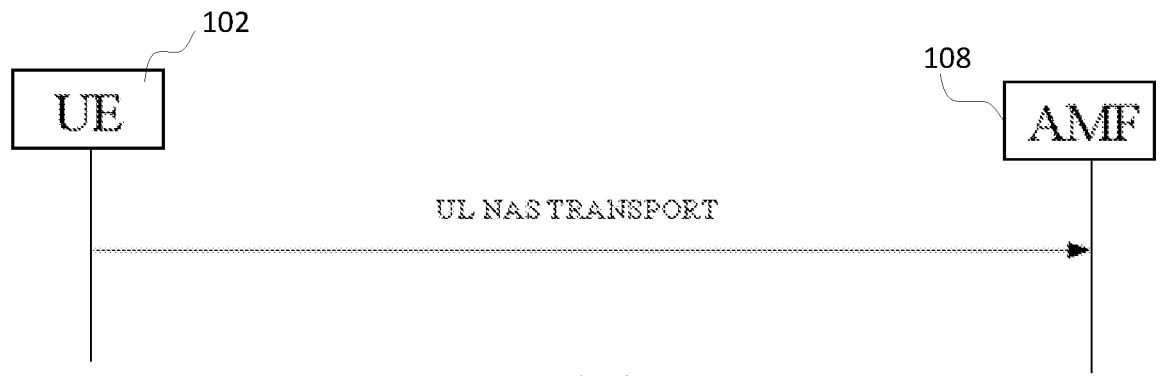
Figure 6B:
Figure 7:
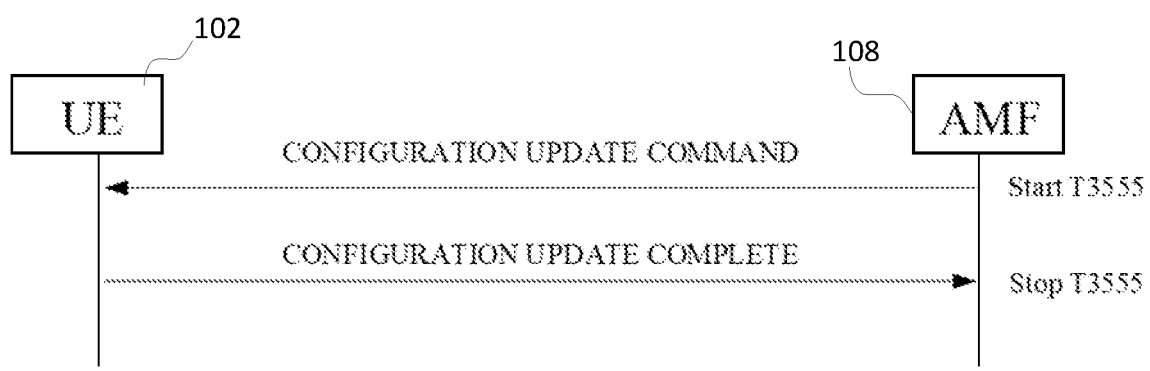
Figure 8:
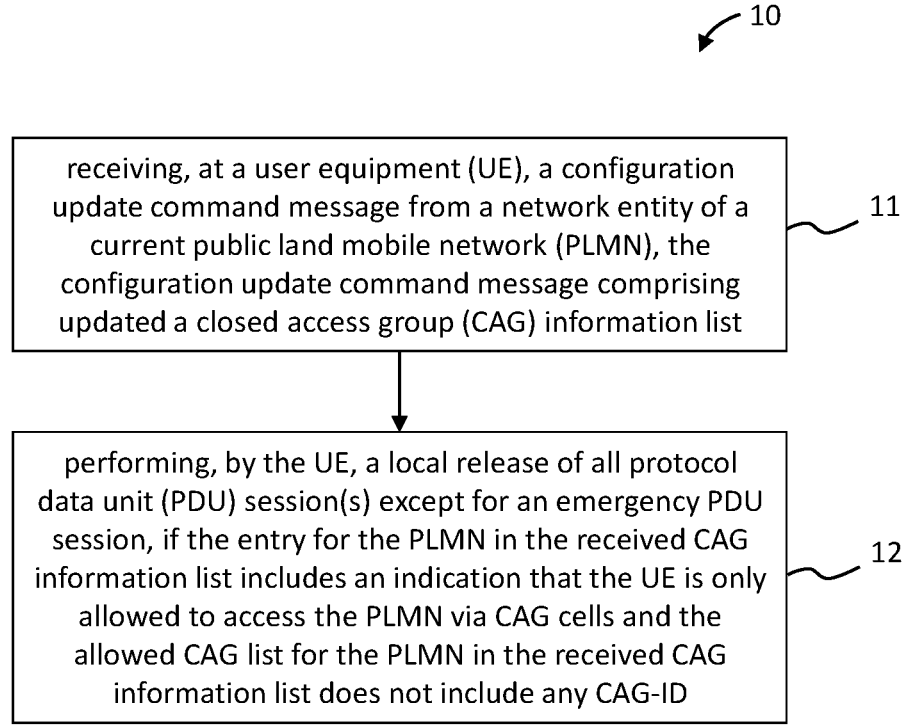
Figure 9:
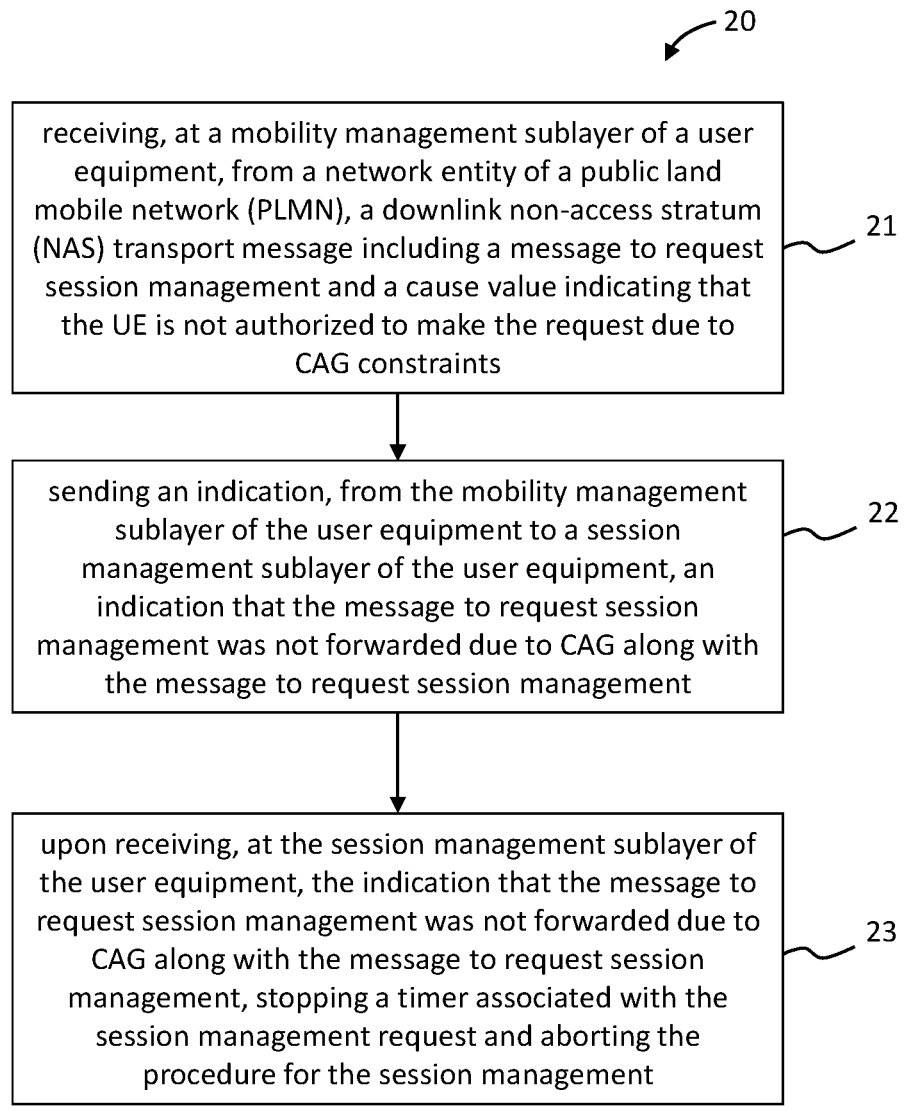
Figure 10:
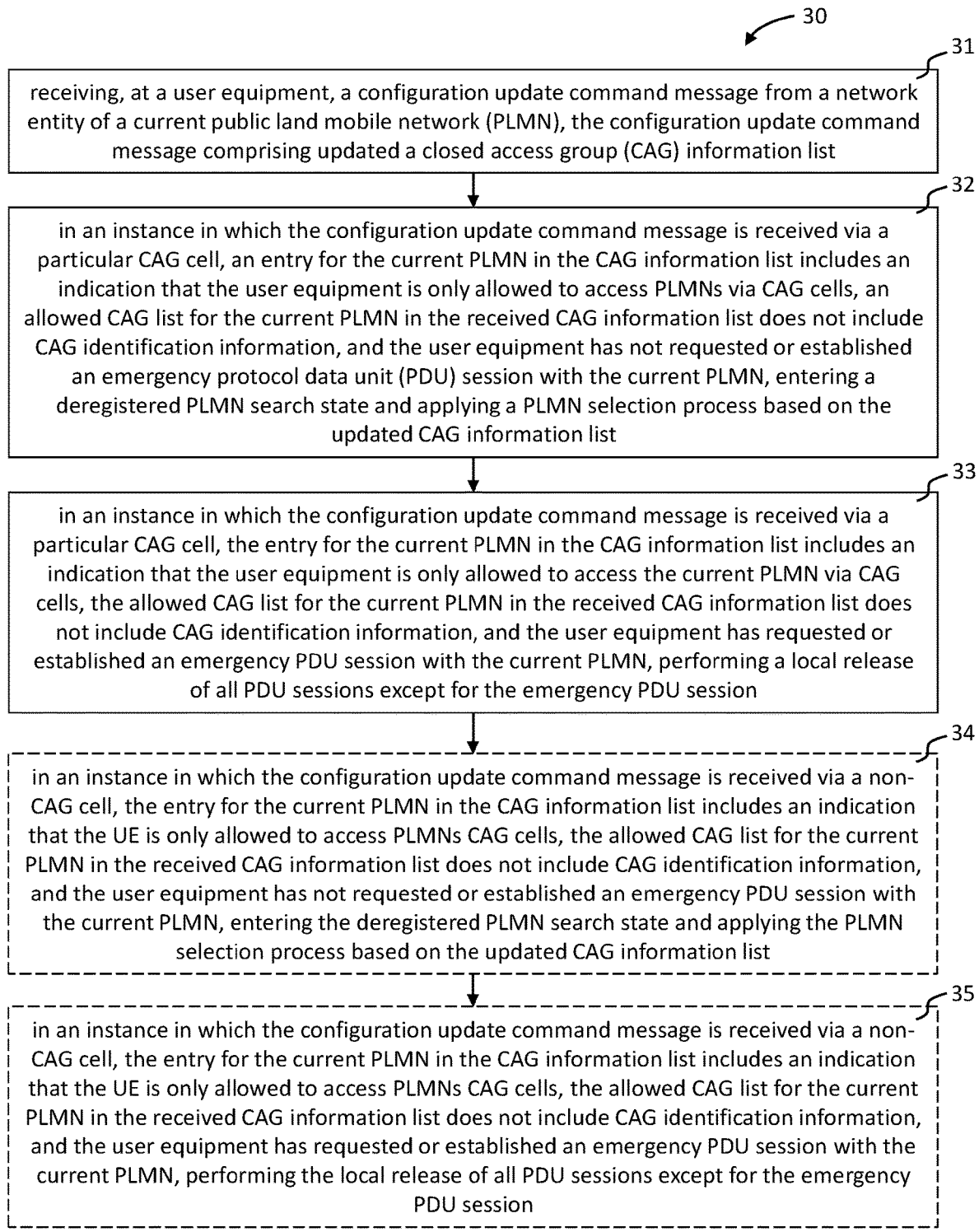
Figure 11:
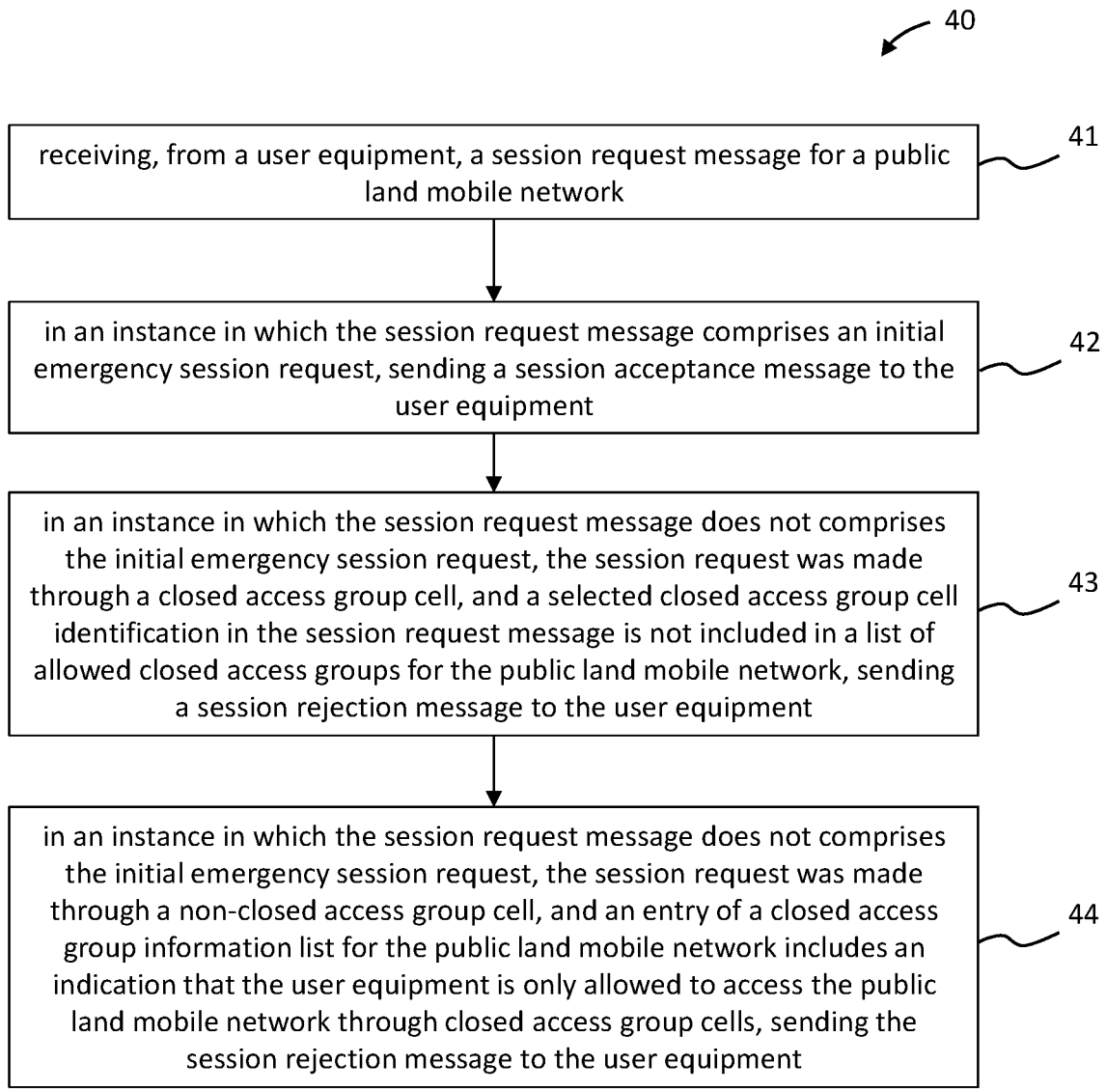
Figure 12:
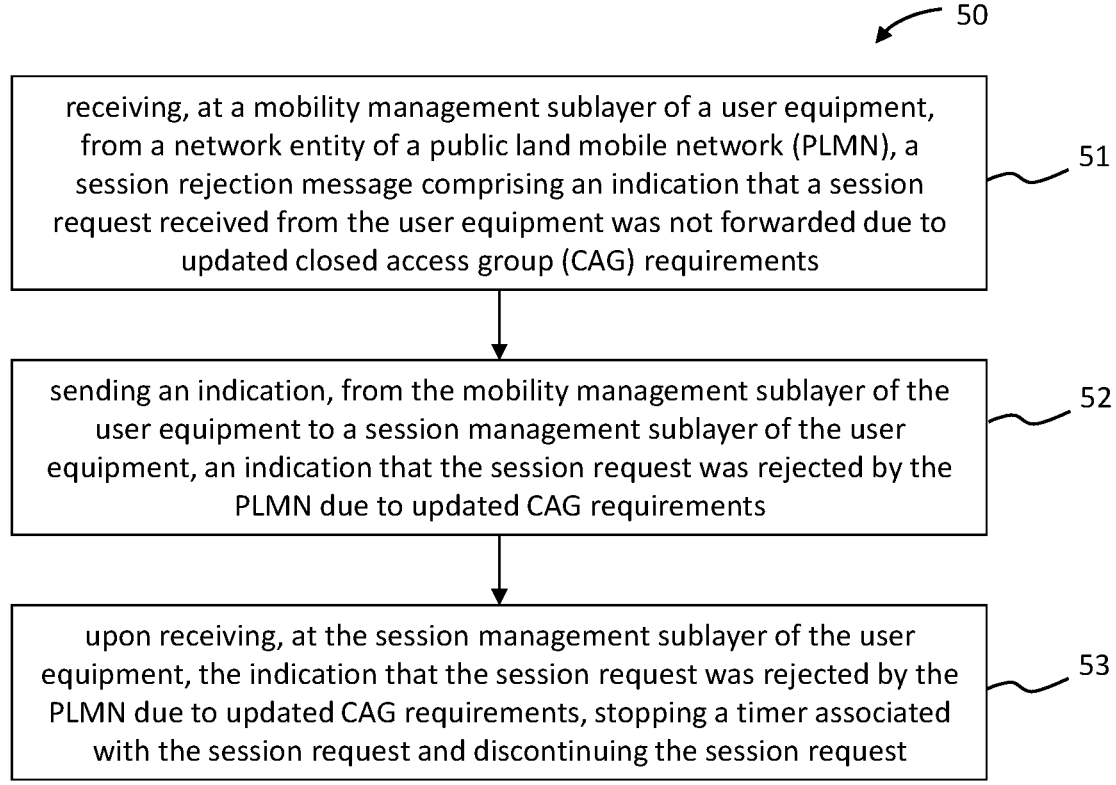

Having thus described embodiments of the disclosure in general terms, reference will now be made to the accompanying drawings, which are not necessarily drawn to scale, and wherein:

FIG. 1 illustrates an exemplary architecture for a communications network, according to an embodiment;

FIG. 2 illustrates an exemplary architecture for a communications network, according to an embodiment;

FIG. 3 illustrates an exemplary architecture for a communications network, according to an embodiment;

FIG. 4 illustrates an exemplary computing device for handling emergency services in private networks, according to an embodiment;

FIG. 5 illustrates an exemplary computing device for handling emergency services in private networks, according to an embodiment;

FIG. 6A illustrates exemplary messaging between a user equipment and a network entity for handling emergency services in private networks, according to an embodiment;

FIG. 6B illustrates exemplary messaging between a user equipment and a network entity for handling emergency services in private networks, according to an embodiment;

FIG. 7 illustrates exemplary messaging between a user equipment and a network entity for handling emergency services in private networks, according to an embodiment;

FIG. 8 is a flow chart illustrating operations performed for handling emergency services in private networks, such as by the apparatus of FIG. 4 or FIG. 5, according to an embodiment;

FIG. 9 is a flow chart illustrating operations performed for handling emergency services in private networks, such as by the apparatus of FIG. 4 or FIG. 5, according to another embodiment;

FIG. 10 is a flow chart illustrating operations performed for handling emergency services in private networks, such as by the apparatus of FIG. 4 or FIG. 5, according to a further embodiment;

FIG. 11 is a flow chart illustrating operations performed for handling emergency services in private networks, such as by the apparatus of FIG. 4 or FIG. 5, according to a further embodiment; and FIG. 12 is a flow chart illustrating operations performed for handling emergency services in private networks, such as by the apparatus of FIG. 4 or FIG. 5, according to a further embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be examples and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

In the following, certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIG. 1-3 to assist in understanding the technology underlying the described examples.

According to some embodiments, a communication device or terminal can be provided for wireless access via cells, base stations or similar wireless transmitter and/or receiver nodes, providing access points for a radio access system.

Access points and hence communications there through are typically controlled by at least one appropriate controller apparatus so as to enable operation thereof and management of mobile communication devices in communication therewith. In some embodiments, a control apparatus for a node may be integrated with, coupled to and/or otherwise provided for controlling the access points. In some embodiments, the control apparatus can be arranged to allow communications between a user equipment and a core network or a network entity of the core network. For this purpose, the control apparatus may comprises at least one memory, at least one data processing unit such as a processor or the like, and an input/output interface. Via the interface, the control apparatus can be coupled to relevant other components of the access point. The control apparatus can be configured to execute an appropriate software code to provide the control functions. It shall be appreciated that similar components can be provided in a control apparatus provided elsewhere in the network system, for example in a core network entity. The control apparatus can be interconnected with other control entities. The control apparatus and functions may be distributed between several control units. In some embodiments, each base station can comprise a control apparatus. In alternative embodiments, two or more base stations may share a control apparatus.

Access points and associated controllers may communicate with each other via a fixed line connection and/or via a radio interface. The logical connection between the base station nodes can be provided for example by an X2 or the like interface. This interface can be used for example for coordination of operation of the stations and performing reselection or handover operations.

The communication device or user equipment may comprise any suitable device capable of at least receiving wireless communication of data. For example, the device can be handheld data processing device equipped with radio receiver, data processing and user interface apparatus. Non-limiting examples include a mobile station (MS) such as a mobile phone or what is known as a 'smart phone', a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, ear pieces with wireless connectivity, jewelry and so on, universal serial bus (USB) sticks with wireless capabilities, modem data cards, machine type devices or any combinations of these or the like.

In some embodiments, a communication device, e.g., configured for communication with the wireless network or a core network entity, may be exemplified by a handheld or otherwise mobile communication device (or user equipment UE). A mobile communication device may be provided with wireless communication capabilities and appropriate electronic control apparatus for enabling operation thereof. Thus, the communication device may be provided with at least one data processing entity, for example a central processing unit and/or a core processor, at least one memory and other possible components such as additional processors and memories for use in software and hardware aided execution of tasks it is designed to perform. The data processing, storage and other relevant control apparatus can be provided on an appropriate circuit board and/or in chipsets. Data processing and memory functions provided by the control apparatus of the communication device are configured to cause control and signalling operations in accordance with certain embodiments as described later in this description. A user may control the operation of the communication device by means of a suitable user interface such as touch sensitive display screen or pad and/or a key pad, one of more actuator buttons, voice commands, combinations of these, or the like. A speaker and a microphone are also typically provided. Furthermore, a mobile communication device may comprise appropriate connectors (either wired or wireless) to other devices and/or for connecting external accessories, for example hands-free equipment, thereto.

In some embodiments, a communication device may communicate wirelessly via appropriate apparatus for receiving and transmitting signals. In some embodiments, a radio unit may be connected to the control apparatus of the device. The radio unit can comprise a radio part and associated antenna arrangement. The antenna arrangement may be arranged internally or externally to the communication device.

FIGS. 1-3 illustrate various exemplary architectures for a communications network 100 in which the various methods, apparatuses, and computer program products can be carried out and/or used. In some embodiments, the communications network 100 can comprise any suitable configuration, number, orientation, positioning, and/or dimensions of components and specialized equipment configured to provide air interface (e.g., New Radio (NR)) communication or connection between a user equipment 102 (UE 102) and a data network 116 (DN 116) via a core network 101 (CN 101) of the communications network 100. As illustrated in FIG. 1, a communications network 100 may be provided in which the UE 102 is in operable communication with the AN 104, such as by way of a transmission tower, a base station, a network node, or the like. In some embodiments, the AN 104 can communicate with the CN 101 or a component or entity thereof. In some embodiments, the CN 101 can facilitate communication between the UE 102 and the DN 116, such as for sending data, messages, requests, or the like. In some embodiments, the DN 116 or the CN 101 can be in communication with an application server or application function 112 (AS/AF 112).

In the context of a fifth-generation (5G) network, such as illustrated in FIGS. 2 and 3, the communications network 100 may comprise a series of connected network devices and specialized hardware that is distributed throughout a service region or country, and one or more network entities, which may be stored at and/or hosted by one or more of the connected network devices or specialized hardware. In some embodiments, the UE 102 may connect to the AN 104, which can then relay the communications between the UE 102 and the CN 101, the CN 101 being connected to the DN 116, which may be in communication with one or more AS/AF 112. In some embodiments, the UE 102 may be in communication with a radio access network 104 (RAN 104 or (R)AN 104), which may act as a relay between the UE 102 and other components or services of the CN 101. For instance, in some embodiments, the UE 102 may communicate with the RAN 104, which may in turn communicate with an Access and Mobility Management Function 108 (AMF 108). In other instance or embodiments, the UE 102 may communicate directly with the AMF 108. In some embodiments, the AMF 108 may be in communication with one or more network functions (NFs), such as an Authentication Server Function 120 (AUSF 120), a Network Slice Selection Function 122 (NSSF 122), a Network Repository Function 124 (NRF 124), a Policy Charging Function 114 (PCF 114), a Network Data Analytics Function 126 (NWDAF 126), a Unified Data Management function 118 (UDM 118), the AS/AF 112, a Session Management Function 110 (SMF 110), and/or the like.

In some embodiments, the SMF 110 may be in communication with one or more User Plane Functions 106 (UPF 106, UPF 106a, UPF 106b, collectively "UPF 106"). By way of example only, in some embodiments, the UPF 106 may be in communication with the RAN 104 and the DN 116. In other embodiments, the DN 116 may be in communication with a first UPF 106a and the RAN 104 may be in communication with a second UPF 106b, while the SMF 110 is in communication with both the first and second UPFs 106a, b and the first and second UPFs 106a, b are in communication each with the other.

In some embodiments, the UE 102 can comprise a single-mode or a dual-mode device such that the UE 102 can be connected to one or more RANs 104. In some embodiments, the RAN 104 may be configured to implement one or more radio access technologies (RATs), such as Bluetooth, Wi-Fi, and GSM, UMTS, LTE or 5G NR, among others, that can be used to connect the UE 102 to the CN 101. In some embodiments, the RAN 104 can comprise or be implemented using a chip, such as a silicon chip, in the UE 102 that can be paired with or otherwise recognized by a similar chip in the CN 101, such that the RAN 104 can establish a connection or line of communication between the UE 102 and the CN 101 by identifying and pairing the chip within the UE 102 with the chip within the CN 101. In some embodiments, the RAN 104 can implement one or more base stations, towers or the like to communicate between the UE 102 and the AMF 108 of the CN 101.

In some embodiments, the communications network 100 or components thereof (e.g., base stations, towers, etc.) can be configured to communicate with a communication device (e.g., the UE 102) such as a cell phone or the like over multiple different frequency bands, e.g., FR1 (below 6 GHz), FR2 (mmWave), other suitable frequency bands, sub-bands thereof, and/or the like. In some embodiments, the communications network 100 can comprise or employ massive multiple input and multiple output (massive MIMO) antennas. In some embodiments, the communications network 100 can comprise multi-user MIMO (MU-MIMO) antennas. In some embodiments, the communications network 100 can employ edge computing whereby the computing servers are communicatively, physically, computationally, and/or temporally closer to the communications device (e.g., UE 102) in order to reduce latency and data traffic congestion. In some embodiments, the communications network 100 can employ other technologies, device, or techniques, such as small cell, low-powered RAN, beamforming of radio waves, WiFi-cellular convergence, non-orthogonal multiple access (NOMA), channel coding, and the like.

As illustrated in FIG. 3, the UE 102 may be configured to communicate with the RAN 104 in a N1 interface, e.g., according to a non-access stratum (NAS) protocol. In some embodiments, RAN 104 can be configured to communicate with the CN 101 or a component thereof (e.g., the AMF 108) in a N2 interface, e.g., in a control plane between a base station of the RAN 104 and the AMF 108. In some embodiments, the RAN 104 can be configured to communicate with the UPF 106 in a N3 interface, e.g., in a user plane. In some embodiments, the AMF 108 and/or the SMF 110 can be configured to communicate with other services or network entities within the CN 101 in various different interfaces and/or according to various different protocols. For instance, in some embodiments, the AMF 108 and/or the SMF 110 can be configured to communicate with the AUSF 120 in a Nausf interface or an N12 interface. In some embodiments, the AMF 108 and/or the SMF 110 can be configured to communicate with the NSSF 122 in a Nnssf interface. In some embodiments, the AMF 108 and/or the SMF 110 can be configured to communicate with the NRF 124 in a Nnrf interface. In some embodiments, the AMF 108 and/or the SMF 110 can be configured to communicate with the PCF 114 in a Npcf interface or an N7 interface. In some embodiments, the AMF 108 and/or the SMF 110 can be configured to communicate with the NWDAF 126 in a Nnwdaf interface. In some embodiments, the AMF 108 and/or the SMF 110 can be configured to communicate with the UDM 118 in a Nudm interface, an N8 interface, or an N10 interface. In some embodiments, the AMF 108 and/or the SMF 110 can be configured to communicate with the AS/AF 112 in a Naf interface. In some embodiments, the SMF 110 can be configured to communicate with the UPF 106 in a N4 interface, which may act as a bridge between the control plane and the user plane, such as acting as a conduit for a Protocol Data Unit (PDU) session during which information is transitted between, e.g., the UE 102 and the CN 101 or components/services thereof.

It will be appreciated that example embodiments of the invention disclosed and/or otherwise described herein arise in the context of a telecommunications network, including but not limited to a telecommunications network that conforms to and/or otherwise incorporates aspects of a fifth-generation (5G) architecture. While FIGS. 1-3 illustrate various configurations and/or components of an exemplary architecture of the communications network 100, many other systems, system configurations, networks, network entities, and pathways/protocols for communication therein are contemplated and considered within the scope of this present disclosure.

While the methods, devices, and computer program products described herein are described within the context of a fifth-generation (5G) core network and system, such as illustrated in FIGS. 1-3 and described hereinabove, the described methods, devices, and computer program products can nevertheless be applied in a broader context within any suitable telecommunications system, network, standard, or protocol.

In the context of communications systems, e.g., fifth-generation (5G) networks, when a user equipment (UE) requests access to the network or services from the network, requests for emergency services are often handled with priority over requests for non-emergency services. To enable non-public networks deployed as part of a public land mobile network (PLMN), a Closed Access Group (CAG) cell can be used for network discovery, selection, and access control for such non-public networks, and network identification and authentication for non-public networks. When the UE accesses a CAG cell, the network needs to verify whether the UE is allowed to access the CAG cell.

Non-standalone Non-Public Networks are Non-Public Networks (NPNs) which are deployed with the support of public PLMNs using a CAG and/or network slicing. As described and claimed herein, a network entity may therefore refer to a CAG, an NPN, a PLMN, or any other entity in such a non-standalone network. When an NPN is made available via a PLMN, then the UE has a subscription for the PLMN to access the network and obtain the services provided by the network. A CAG identifies a group of subscribers who are permitted to access one or more CAG cells. When a UE accesses a CAG cell, the network needs to verify whether the UE is allowed to access the CAG cell. For state transition and during mobility, the AMF can or shall verify whether the CAG identifier received from a Next Generation-Radio Access Network (NG-RAN) is part of the UE's Allowed CAG list as received from the [Unified Data Management] UDM.

However, for the network to verify a UE's access to the CAG cell, the network needs to know the UE's Subscription Permanent Identifier (SUPI). As per TS 33.501, during initial Non-Access Stratum (NAS) procedure (Registration Procedure), the UE can send the Subscription Concealed Identifier (SUCI) to the network. The serving network receives the UE's SUPI from the Authentication Server Function (AUSF), only after successful primary authentication. Therefore, if the serving network needs to perform an access control procedure, such as described herein, on the UE during an initial registration procedure, then the AMF will have to wait until successful completion of the primary authentication procedure.

In some embodiments, when the UE wants to access the system or network (e.g., a fifth-generation system (5GS)), the UE may first perform an access control check to determine if access to the network is allowed. In some embodiments, an access control check can be performed for access attempts defined by the following list of events:

a) the UE is in an idle mode (e.g., 5G mobility management [5GMM]-IDLE mode) over 3GPP access and an event that requires a transition to a connected mode (e.g., 5GMM-CONNECTED mode) occurs; and b) the UE is in a connected mode (e.g., 5GMM-CONNECTED mode) over 3GPP access or a connected mode (e.g., 5GMM-CONNECTED mode) with Radio Resource Control (RRC) inactive indication and one of the following events occurs:

1) 5GMM receives a Management Object-Multi Media Telephone (MO-MMTEL)-voice-call-started indication, an MO-MMTEL-video-call-started indication, or an MO-SMS-over-IP (SMSoIP)-attempt-started indication from upper layers;

2) 5GMM receives a request from upper layers to send a mobile originated SMS over NAS unless the request triggered a service request procedure to transition the UE from 5GMM-IDLE mode to 5GMMCONNECTED mode;

3) 5GMM receives a request from upper layers to send an UL NAS TRANSPORT message for the purpose of PDU session establishment unless the request triggered a service request procedure to transition the UE from 5GMM-IDLE mode to 5GMM-CONNECTED mode;

4) 5GMM receives a request from upper layers to send an UL NAS TRANSPORT message for the purpose of PDU session modification unless the request triggered a service request procedure to transition the UE from 5GMM-IDLE mode to 5GMM-CONNECTED mode; and 5) 5GMM receives a request to re-establish the user-plane resources for an existing PDU session.

In some embodiments, 5GMM specific procedures initiated by NAS in 5GMM-CONNECTED mode may not be subject to access control, e.g., a registration procedure after PS handover will not be prevented by access control. In some embodiments, when the NAS detects one of the above events, the NAS needs to perform the mapping of the kind of request to one or more access identities and one access category and lower layers will perform access barring checks for that request based on the determined access identities and access category. In some embodiments, the NAS may be aware of the above events through indications provided by upper layers or when determining the need to start 5GMM procedures through normal NAS behavior, or both.

In some embodiments, to determine the access identities and the access category for a request, the NAS checks the reason for access, types of service requested and profile of the UE including UE configurations, against a set of access identities and access categories defined in 3GPP TS 22.261, namely: a) a set of standardized access identities; b) a set of standardized access categories; and c) a set of operator-defined access categories, if available. For the purpose of determining the applicable access identities from the set of standardized access identities defined in 3GPP TS 22.261, the NAS can or shall follow the requirements, rules, actions or otherwise described herein and/or in 3GPP TS 22.261.

In some embodiments, for the purpose of determining the applicable access category from the set of standardized access categories and operator-defined access categories defined in 3GPP TS 22.261.

Turning now to FIG. 4, examples of a core network apparatus (CNA) (including the core network services: UPF 106, AMF 108, SMF 110, PCF 114, and/or another NF and/or NRF) may be embodied as a core network apparatus 200 as configured in accordance with an example embodiment of the present disclosure. As described below in conjunction with the flowcharts of FIGS. 8-12, the CNA 200 of an example embodiment may be configured to perform the functions described herein. In any instance, the CNA 200 may more generally be embodied by a computing device, such as a server, a personal computer, a computer workstation or other type of computing device including those functioning as a user equipment and/or a wireless local area network. Regardless of the manner in which the CNA 200 is embodied, the apparatus of an example embodiment may be configured as shown in FIG. 4 so as to include, be associated with or otherwise be in communication with processing circuitry 208 including, for example, a processor 202 and a memory device 204 and, in some embodiments, and/or a communication interface 206. In some embodiments, the UE 102 or other elements of the system 100 can be embodied by an apparatus such as the CNA 200 of FIG. 4.

In the processing circuitry 208, the processor 202 (and/or co-processors or any other circuitry assisting or otherwise associated with the processor) may be in communication with the memory device 204 via a bus for passing information among components of the CNA 200. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The CNA 200 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an encoder and/or a decoder) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In embodiments that include a communication interface 206, the communication interface may be any means such as a device or circuitry embodied in either hardware or a combination of hardware and software that is configured to receive and/or transmit data from/to a network and/or any other device or module in communication with the CNA 200, such as NF, NRF, UE, radio access network, core network services, an application server/function, a database or other storage device, etc. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms. In some embodiments, a session management function can comprise a 5GC session management function for any suitable CUPS architecture, such as for the gateway GPRS support node (GGSN-C), TWAG-C, BNG-CUPS, N4, Sxa, Sxb, Sxc, evolved packet core (EPC) SWG-C, EPC PGW-C, EPC TDF-C, and/or the like.

In some embodiments, the CNA 200 may represent a user equipment that is configured to be connected to other core network entities or network equipment. In some embodiments, user equipment can comprise a mobile telephone (cell phone) or the like.

As illustrated, the CNA 200 can include a processor 202 in communication with a memory 204 and configured to provide signals to and receive signals from a communication interface 206. In some embodiments, the communication interface 206 can include a transmitter and a receiver. In some embodiments, the processor 202 can be configured to control the functioning of the CNA 200, at least in part. In some embodiments, the processor 202 may be configured to control the functioning of the transmitter and receiver by effecting control signalling via electrical leads to the transmitter and receiver. Likewise, the processor 202 may be configured to control other elements of CNA 200 by effecting control signalling via electrical leads connecting the processor 202 to the other elements, such as a display or the memory 204. The processor 202 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4 as a single processor, in some example embodiments the processor 202 may comprise a plurality of processors or processing cores.

The CNA 200 may be capable of operating with one or more air interface standards, communication protocols, modulation types, access types, and/or the like. Signals sent and received by the processor 202 may include signalling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the CNA 200 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the CNA 200 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The CNA 200 may be additionally capable of operating in accordance with 3.9G wireless communication protocols, such as Long Term Evolution (LTE), Evolved Universal Terrestrial Radio Access Network (E-UTRAN), and/or the like. Additionally, for example, the CNA 200 may be capable of operating in accordance with 4G wireless communication protocols, such as LTE Advanced, 5G, and/or the like as well as similar wireless communication protocols that may be subsequently developed. In some embodiments, the CNA 200 may be capable of operating according to or within the framework of any suitable control and user plane separation (CUPS) architecture, such as for the gateway GPRS support node (GGSN-C), trusted wireless access gateway (TWAG-C), broadband network gateways (BNGs), N4, Sxa, Sxb, Sxc, evolved packet core (EPC) SWG-C, EPC PGW-C, EPC TDF-C, and/or the like.

It is understood that the processor 202 may include circuitry for implementing audio/video and logic functions of the CNA 200. For example, the processor 202 may comprise a digital signal processor device, a microprocessor device, an analog-to-digital converter, a digital-to-analog converter, and/or the like. Control and signal processing functions of the CNA 200 may be allocated between these devices according to their respective capabilities. The processor 202 may additionally comprise an internal voice coder (VC), an internal data modem (DM), and/or the like. Further, the processor 202 may include functionality to operate one or more software programs, which may be stored in memory 204. In general, the processor 202 and software instructions stored in memory 206 may be configured to cause the CNA 200 to perform actions. For example, the processor 202 may be capable of operating a connectivity program, such as a web browser. The connectivity program may allow the CNA 200 to transmit and receive web content, such as location-based content, according to a protocol, such as wireless application protocol, WAP, hypertext transfer protocol, HTTP, and/or the like.

In some embodiments, the CNA 200 may also comprise a user interface including, for example, an earphone or speaker, a ringer, a microphone, a display, a user input interface, and/or the like, which may be operationally coupled to the processor 202. The display may, as noted above, include a touch sensitive display, where a user may touch and/or gesture to make selections, enter values, and/or the like. The processor 202 may also include user interface circuitry configured to control at least some functions of one or more elements of the user interface, such as the speaker, the ringer, the microphone, the display, and/or the like. The processor 202 and/or user interface circuitry comprising the processor 202 may be configured to control one or more functions of one or more elements of the user interface through computer program instructions, for example, software and/or firmware, stored on the memory 204 accessible to the processor 202, for example, a volatile memory, a non-volatile memory, devices comprising the same, and/or the like. The CNA 200 may include a battery for powering various circuits related to the mobile terminal, for example, a circuit to provide mechanical vibration as a detectable output. The user input interface may comprise devices allowing the CNA 200 to receive data, such as a keypad (e.g., a virtual keyboard presented on a display or an externally coupled keyboard) and/or the like.

As shown in FIG. 4, CNA 200 may also include one or more mechanisms for sharing and/or obtaining data, illustrated as the communication interface 206. For example, the communication interface 206 of the CNA 200 may include a short-range radio frequency (RF) transceiver and/or interrogator, so data may be shared with and/or obtained from electronic devices in accordance with RF techniques. The CNA 200 may include other short-range transceivers, such as an infrared (IR) transceiver, a Bluetooth™ (BT) transceiver operating using Bluetooth™ wireless technology, a wireless universal serial bus (USB) transceiver, a Bluetooth™ Low Energy transceiver, a ZigBee transceiver, an ANT transceiver, a cellular device-to-device transceiver, a wireless local area link transceiver, and/or any other short-range radio technology. In some embodiments, the CNA 200 and, in particular, the short-range transceiver may be capable of transmitting data to and/or receiving data from electronic devices within the proximity of the apparatus, such as within about 10 meters, for example. The CNA 200 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The CNA 200 may comprise other memory, such as a subscriber identity module (SIM), a removable user identity module (R-UIM), an eUICC, an UICC, and/or the like, which may store information elements related to a mobile subscriber. In addition to the SIM, the CNA 200 may include other removable and/or fixed memory. The CNA 200 may include volatile memory and/or non-volatile memory, which can comprise some or all of the memory 204 or can alternatively be a separate memory within or connected to the CNA 200. For example, volatile memory may include Random Access Memory (RAM) including dynamic and/or static RAM, on-chip or off-chip cache memory, and/or the like. Non-volatile memory, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory, non-volatile memory may include a cache area for temporary storage of data. At least part of the volatile and/or non-volatile memory may be embedded in processor 202. The memories may store one or more software programs, instructions, pieces of information, data, and/or the like which may be used by the apparatus for performing operations disclosed herein. Alternatively or additionally, the CNA 200 may be configured to cause operations disclosed herein with respect to base stations, WLAN access points, network nodes including the UEs, and the like.

The memories may comprise an identifier, such as an international mobile equipment identification (IMEI) code, capable of uniquely identifying CNA 200. The memories may comprise an identifier, such as an international mobile equipment identification (IMEI) code, capable of uniquely identifying CNA 200. In the example embodiment, the processor 202 may be configured using computer code stored at memory and/or to the provide operations disclosed herein with respect to the base stations, WLAN access points, network nodes including the UEs, and the like. Likewise, the CNA 200 can be configured to be any other component or network equipment from the core network.

Some of the embodiments disclosed herein may be implemented in software, hardware, application logic, or a combination of software, hardware, and application logic. The software, application logic, and/or hardware may reside on memory 204, the control apparatus 202, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 4, computer-readable medium may comprise a non-transitory computer-readable storage medium that may be any media that can contain or store the instructions for use by or in connection with an instruction execution system, apparatus, or device, such as a computer.

FIG. 5 illustrates another example of an apparatus 300 (e.g., comprising or embodying a core network entity, such as the CAN 200, the UE 102, and/or participating in or communicating with the core network services: UPF 106, AMF 108, SMF 110, PCF 114, and/or another network function (NF) and/or network resource function (NRF)), which may be configured in accordance with an example embodiment of the present disclosure. As described below in conjunction with the flowcharts of FIGS. 8-12, the apparatus 300 of an example embodiment may be configured to perform the functions, processes, and methods described herein, combinations thereof, variations thereof, or parts thereof.

In some embodiments, the apparatus 300 is or comprises exemplary specialized hardware particularly dimensioned and configured to carry out any of the methods, processes, and approaches described herein. In some embodiments, the apparatus 300 can be a part of the system 100 or in communication with a component thereof. It will be appreciated that the apparatus 300 is provided as an example of one embodiment and should not be construed to narrow the scope or spirit of the invention in any way. In this regard, the scope of the disclosure encompasses many potential embodiments in addition to those illustrated and described herein. As such, while FIG. 5 illustrates one example of a configuration of an apparatus for handling emergency services in a private network or other wireless communication system, such as a 5G system, other configurations may also be used to implement certain embodiments of the present disclosure.

The apparatus 300 may be embodied as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In some example embodiments, the apparatus 300 is embodied as a mobile computing device, such as mobile telephones, mobile computers, personal digital assistants (PDAs), pagers, laptop computers, desktop computers, gaming devices, televisions, e-papers, and other types of electronic systems, which may employ various embodiments of the invention.

The apparatus 300 can include a computing device 302 including a processor 304, and storage, such as a non-volatile memory 306 and/or volatile memory 308. In some embodiments, the processor 304 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 5 as a single processor, in some embodiments the processor 304 comprises a plurality of processors. These signals sent and received by the processor 304 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, fifth-generation (5G), any band, frequency or protocol thereof, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

In addition to broad-band systems, some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the apparatus 300 or a component thereof may be capable of operating according to Wi-Fi or Worldwide Interoperability for Microwave Access (WiMAX) protocols.

It is understood that the processor 304 may comprise circuitry for implementing audio/video and logic functions of the apparatus 300. For example, the processor 304 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC), an internal data modem (DM), and/or the like. Further, the processor may comprise functionality to operate one or more software programs, which may be stored in memory. For example, the processor 304 may be capable of operating a connectivity program, such as a web browser. The connectivity program may allow the apparatus 300 to transmit and receive web content, such as location-based content, according to a protocol, such as Wireless Application Protocol (WAP), hypertext transfer protocol (HTTP), and/or the like. The apparatus 300 may be capable of using a Transmission Control Protocol/Internet Protocol (TCP/IP) to transmit and receive web content across the internet or other networks.

The apparatus 300 may also comprise a user interface 312 including, for example, an earphone or speaker, a ringer, a microphone, a user display, a user input interface, and/or the like, which may be operationally coupled to the processor 304. In this regard, the processor 304 may comprise user interface circuitry configured to control at least some functions of one or more elements of the user interface, such as, for example, the speaker, the ringer, the microphone, the display, and/or the like. The processor 304 and/or user interface circuitry comprising the processor 304 may be configured to control one or more functions of one or more elements of the user interface through computer program instructions (e.g., software and/or firmware) stored on a memory accessible to the processor 304 (e.g., non-volatile memory 306, volatile memory 308, and/or the like). Although not shown, the apparatus 300 may comprise a battery for powering various circuits related to the apparatus 300, for example, a circuit to provide mechanical vibration as a detectable output. The apparatus 300 can further comprise a display 314. In some embodiments, the display 314 may be of any type appropriate for the electronic device in question with some examples including a plasma display panel (PDP), a liquid crystal display (LCD), a light-emitting diode (LED), an organic light-emitting diode display (OLED), a projector, a holographic display, or the like. The user interface 312 may comprise devices allowing the apparatus 300 to receive data, such as a keypad, a touch display (e.g., some example embodiments wherein the display 314 is configured as a touch display), a joystick (not shown), and/or other input device. In embodiments including a keypad, the keypad may comprise numeric (0-9) and related keys (#, *), and/or other keys for operating the apparatus 300.

The apparatus 300 may comprise memory, such as the non-volatile memory 306 and/or the volatile memory 308, such as RAM, read only memory (ROM), non-volatile RAM (NVRAM), a subscriber identity module (SIM), a removable user identity module (R-UIM), and/or the like. In addition to the memory, the apparatus 300 may comprise other removable and/or fixed memory. In some embodiments, the volatile memory 308 may include Random Access Memory (RAM) including dynamic and/or static RAM, on-chip or off-chip cache memory, and/or the like. In some embodiments, the non-volatile memory 306, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like the volatile memory 308, the non-volatile memory 306 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the apparatus 300.

In some example embodiments, the apparatus 300 includes various means for performing the various functions herein described. These means may comprise one or more of the processor 304, the non-volatile memory 306, the volatile memory 308, the user interface 312, or the display 314. The means of the apparatus 300 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., storage 306 or 308) that is executable by a suitably configured processing device (e.g., the processor 304), or some combination thereof.

In some example embodiments, one or more of the means illustrated in FIG. 5 may be embodied as a chip or chip set. In other words, the apparatus 300 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 304, the memory 306 and/or 308, the user interface 312, and/or the display 314 may be embodied as a chip or chip set. The apparatus 300 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein.

The processor 304 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other types of hardware processors, or some combination thereof. Accordingly, although illustrated in FIG. 5 as a single processor, in some embodiments the processor 304 comprises a plurality of processors. The plurality of processors may be in operative communication with each other and may be collectively configured to perform one or more functionalities of the apparatus 100 as described herein. The plurality of processors may be embodied on a single computing device or distributed across a plurality of computing devices collectively configured to function as the apparatus 300. In some embodiments, e.g., wherein the apparatus is embodied as an apparatus 300, the processor 304 may be embodied as or comprise the processor 304 (shown in FIG. 5). In some example embodiments, the processor 304 is configured to execute instructions stored in the memory 306 and/or 308 or otherwise accessible to the processor 304. These instructions, when executed by the processor 304, may cause the apparatus 300 to perform one or more of the functionalities of the apparatus 300 as described herein. As such, whether configured by hardware or software methods, or by a combination thereof, the processor 304 may comprise an entity capable of performing operations according to embodiments of the present invention while configured accordingly. Thus, for example, when the processor 304 is embodied as an ASIC, FPGA or the like, the processor 304 may comprise specifically configured hardware for conducting one or more operations described herein. Alternatively, as another example, when the processor 304 is embodied as an executor of instructions, such as may be stored in the memory 306 and/or 308, the instructions may specifically configure the processor 304 to perform one or more algorithms and operations described herein.

The memory 306 and/or 308 may comprise, for example, volatile memory, non-volatile memory, or some combination thereof. In this regard, the memory 306 and/or 308 may comprise a non-transitory computer-readable storage medium. Although illustrated in FIG. 5 as a single memory, the memory 306 and/or 308 may comprise a plurality of memories. The plurality of memories may be embodied on a single computing device or may be distributed across a plurality of computing devices collectively configured to function as the apparatus 300. In various example embodiments, the memory 306 and/or 308 may comprise a hard disk, random access memory, cache memory, flash memory, a compact disc read only memory (CD-ROM), digital versatile disc read only memory (DVD-ROM), an optical disc, circuitry configured to store information, or some combination thereof. In some embodiments, the memory 306 and/or 308 may comprise the volatile memory 308 and/or the non-volatile memory 306 (shown in FIG. 5). The memory 306 and/or 308 may be configured to store information, data, applications, instructions, or the like for enabling the apparatus 300 to carry out various functions in accordance with various example embodiments. For example, in some example embodiments, the memory 306 and/or 308 is configured to buffer input data for processing by the processor 304. Additionally or alternatively, the memory 306 and/or 308 may be configured to store program instructions for execution by the processor 304. The memory 306 and/or 308 may store information in the form of static and/or dynamic information. The stored information may include, for example, images, content, media content, user data, application data, and/or the like. This stored information may be stored and/or used by the processor 304 during the course of performing its functionalities.

In some embodiments, the apparatus 300 can further comprise a communication interface (not shown) that may be embodied as any device or means embodied in circuitry, hardware, a computer program product comprising computer readable program instructions stored on a computer readable medium (e.g., the memory 306 and/or 308) and executed by a processing device (e.g., the processor 304), or a combination thereof that is configured to receive and/or transmit data from/to another computing device. In some example embodiments, the communication interface is at least partially embodied as or otherwise controlled by the processor 304. In this regard, the communication interface may be in communication with the processor 304, such as via a bus. The communication interface may include, for example, an antenna, a transmitter, a receiver, a transceiver and/or supporting hardware or software for enabling communications with one or more remote computing devices. In some embodiments, e.g., wherein the apparatus is embodied as an apparatus 300, the communication interface may be embodied as or comprise the transmitter and the receiver. The communication interface may be configured to receive and/or transmit data using any protocol that may be used for communications between computing devices. In this regard, the communication interface may be configured to receive and/or transmit data using any protocol that may be used for transmission of data over a wireless network, wireline network, some combination thereof, or the like by which the apparatus 300 and one or more computing devices may be in communication. As an example, the communication interface may be configured to receive and/or otherwise access content (e.g., web page content, streaming media content, and/or the like) over a network from a server or other content source. The communication interface may additionally be in communication with the memory 306 and/or 308, user interface 312 and/or the processor 304, such as via a bus.

The user interface 312 may be in communication with the processor 304 and configured to receive an indication of a user input and/or to provide an audible, visual, mechanical, or other output to a user. As such, the user interface 312 may include, for example, a keyboard, a mouse, a joystick, a display, a touch screen display, a microphone, a speaker, and/or other input/output mechanisms. In embodiments in which the apparatus 300 is embodied as an apparatus 300, the user interface 312 may be embodied as or comprise the user input interface, such as the display 314 (shown in FIG. 5), and other components such as a keypad, mouse, etc. The user interface 312 may be in communication with the memory 306 and/or 308, communication interface, a sensor, a speaker, and/or the processor 304, such as via a bus. In some example embodiments, the user interface 312 may comprise a single input/output mechanism. In other embodiments, the user interface 312 may comprise a content display and touch display, such as the display 314. In some embodiments, the user interface 312 may comprise a touch display user interface with a content display portion and a dedicated user input portion, such as a virtual keyboard, virtual piano, or an application with a designated key for user input.

The processor 304 may be embodied as various means, such as circuitry, hardware, a computer program product comprising computer readable program instructions stored on a computer readable medium (e.g., the memory 306 and/or 308) and executed by a processing device (e.g., the processor 304), or some combination thereof and, in some embodiments, is embodied as or otherwise controlled by the processor 304. The processor 304 may further be in communication with one or more of the memory 306 and/or 308, or user interface 312, such as via a bus.

The processor 304 may be configured to receive a user input from a user interface 312, such as a touch display. The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the processor 304 may determine an element/instruction/command that corresponds with a key, or image, displayed on the touch display user interface at the determined position or within a predefined proximity (e.g., within a predefined tolerance range) of the determined position. The processor 304 may be further configured to perform a function or action related to the key corresponding to the element/instruction/command determined by the processor 304 based on the position of the touch or other user input.

Without in any way limiting the scope, interpretation, or application of the claims appearing below, a technical effect of one or more of the example embodiments disclosed herein may be improved user equipment or network equipment configuration. As such, any embodiment of a method, system, approach, device, apparatus, or computer program described or illustrated herein is understood to comprise any or all of the components, functionalities, elements, or steps of any other embodiment such that any method can be carried out by the CNA 200, the apparatus 300, or by any other suitable system or device, and likewise can be carried out according to a computer program code envisioned within the scope of this disclosure.

In the context of a communications system, e.g., the system 100, emergency services can be requested, such as by the UE 102, by sending a PDU session request message to the AMF 108. In a 5G network, for instance, a Closed Access Groups (CAG) may be established or defined. In some embodiments, a CAG may specify that only specific UEs that belong to a certain group are allowed to access the network via specific cells. However, one concern is that restrictions in access to the network should not count for UEs that request to establish or have established an emergency session, e.g., an emergency PDU session, but rather such CAG restrictions should only be effective to disallow UEs requesting or having established "normal" sessions with the network.

According to conventional network configurations and functionalities, e.g., according to the latest 5G protocol, there is currently no solution for identifying emergency session requests from a UE that is connected via a CAG, but that has been removed from the CAG list. Said otherwise, there is no current solution for determining which sessions or session requests to disallow and which to retain when, after a UE has rightfully accessed the network via a CAG, the allowance is revoked while the sessions via CAG are still ongoing. Then, all sessions should be released, except for potential emergency sessions. According to typical conventional approaches, the only option for handling sessions in such an instance is to disallow or release all sessions and deregister all UEs.

In some embodiments, in an instance in which a UE wants to establish, via a not-allowed CAG, a PDU session which is not an emergency session, then this session establishment request can or should be rejected by the AMF and the UE should stop trying to establish the non-emergency session via the non-CAG cell. On the UE side, an interaction between the mobility management (MM) layer and the session management (SM) layer can or shall be performed.

In some embodiments, when a UE is connected rightfully via a CAG cell to the network, and when the CAG information is updated, and the UE has an ongoing emergency PDU session, and when the EU does not pass CAG access control (e.g., with regards to the updated CAG information, then the AMF can or shall perform a local release of all PDU sessions except for emergency PDU sessions. When the CAG information is updated, the UE should locally release all non-emergency sessions on the UE side—as such, there is also a change on the UE side. When the UE receives new "CAG information list" and the UE's session request is for "normal" (non-emergency) sessions, which may not be allowed to access the network via the CAG once the CAG information is updated, then, up to now, the process has been that the UE can or shall enter the state 5GMM-DEREGIS-TERED.PLMN-SEARCH and can or shall apply the PLMN selection process. In some embodiments, this process or protocol can be extended by considering whether the UE has an emergency PDU session, and if so, then the UE can or shall perform a local release of all PDU sessions except for an emergency PDU session.

In some embodiments, in an instance in which a UE wants to establish a non-emergency PDU session via a not-allowed CAG, then this non-emergency PDU session request should be rejected by the AMF and the UE should stop trying. In some embodiments, the UE can then initiate an interaction between the 5G mobility management (5GMM) sublayer of the UE and the 5G session management (5GSM) sublayer of the UE to reconfigure according to the updated CAG information and/or change its state.

In some embodiments, in an instance in which a UE is connected rightfully via a CAG cell, the CAG information is updated, the UE has an ongoing emergency PDU session, and the UE does not pass CAG access control anymore based on the updated CAG information, then the AMF can or shall perform a local release of all PDU sessions except for emergency PDU sessions. Since the UE should also locally release all non-emergency session on its own side in such an instance, there is also a change on the UE side. In some embodiments, in an instance in which the UE receives a new "CAG information list" and UE requests for normal, non-emergency PDU sessions are not allowed anymore to access the network via CAG, then the UE can or shall enter the state 5GMM-DEREGISTERED.PLMN-SEARCH and can or shall apply the PLMN selection process. In some embodiments, this process can be extended by adding a determination of whether the UE has an emergency PDU session; and if so, then the UE can or shall perform a local release of all PDU sessions except for an emergency PDU session.

In some networks, such as a fourth-generation (4G) network, the CSG is "network only," such that the UE is not involved and, as such, no CSG information is provided to the UE. As such, conventional approaches and standards do not specify how the UE reacts to such an instance. In some embodiments, e.g., in a 4G network, there is no NAS signaling allowing the UE to update CSG information.

In some embodiments, e.g., in a 5G network, upon receiving updated CAG information, the UE can or shall enter a deregistered state. In some embodiments, the UE and the network should locally release non-emergency PDU sessions. Said otherwise, the UE and the network both release non-emergency PDU sessions. Without wishing to be bound by any particular theory, an unsynchronized PDU session status between the UE and network may lead to unnecessary resource consumption. For example, the UE can request a PDU session that is already locally released by the network, leading to a UE session request that the network must reject. Thus, synchronization should be achieved whenever it is possible.

In some embodiments, even if a UE does not pass CAG access control, if the UE has an emergency PDU session, the UE should not get deregistered from a PLMN due to CAG. Furthermore, a UE and the network should locally release non-emergency PDU sessions if a UE does not pass CAG access control. In some embodiments, when the AMF updates CAG information, if the UE has an emergency PDU session and the UE does not pass CAG access control with the updated CAG information, the AMF can or shall perform a local release of all PDU sessions except for an emergency PDU session. There are several cases in which a UE should get deregistered from the network upon receiving CAG information. However, deregistration needs to be avoided if a UE has an emergency PDU session and instead the UE needs to release non-emergency PDU sessions. The AMF should accept a request from the UE with an emergency PDU session and locally release non-emergency PDU sessions. PDU session synchronization can be achieved with the existing PDU session status IE.

In some embodiments, a UE configuration update procedure can be initiated by the network. In some embodiments, the AMF can or shall initiate the generic UE configuration update procedure by sending the CONFIGURATION UPDATE COMMAND message to the UE. In some embodiments, the AMF can or shall, in the CONFIGURATION UPDATE COMMAND message, either: a) include one or more of the following parameters: 5G-Globally Unique Temporary Identity (5G-GUTI), Tracking Area Identify (TAI) list, allowed Network Slice Selection Assistance Information (NSSAI) that may include the mapped S-NSSAI(s), Local Area Data Network (LADN) information, service area list, Mobile Indicated Connection Only (MICO) indication, Network Identity and TimeZone (NITZ) information, configured NSSAI that may include the mapped S-NSSAI(s), rejected NSSAI, network slicing subscription change indication, operator-defined access category definitions, Short Message Service (SMS) indication, service gap time value, "CAG information list", UE radio capability ID, 5GS registration result or UE radio capability ID deletion indication; b) include the Configuration update indication IE with the Registration requested bit set to "registration requested"; or c) include a combination of both a) and b).

In some embodiments, if an acknowledgement from the UE is requested, the AMF can or shall indicate "acknowledgement requested" in the Acknowledgement bit of the Configuration update indication IE in the CONFIGURATION UPDATE COMMAND message and can or shall start timer T3555. Acknowledgement can or shall be requested for all parameters except, in some embodiments, when only NITZ is included.

In some embodiments, to initiate parameter re-negotiation between the UE and network, the AMF can or shall indicate "registration requested" in the Registration requested bit of the Configuration update indication IE in the CONFIGURATION UPDATE COMMAND message. In some embodiments, if a new allowed NSSAI information or AMF re-configuration of supported S-NSSAIs requires an AMF relocation, the AMF can or shall indicate "registration requested" in the Registration requested bit of the Configuration update indication IE and include the Allowed NSSAI IE in the CONFIGURATION UPDATE COMMAND message.

In some embodiments, if the AMF includes a new configured NSSAI in the CONFIGURATION UPDATE COMMAND message and the new configured NSSAI requires an AMF relocation as specified in, e.g., 3GPP TS 23.501, the AMF can or shall indicate "registration requested" in the Registration requested bit of the Configuration update indication IE in the message. In some embodiments, if the AMF indicates "registration requested" in the Registration requested bit of the Configuration update indication IE, acknowledgement can or shall be requested. In some embodiments, if the CONFIGURATION UPDATE COMMAND message is initiated only due to changes to the allowed NSSAI and these changes require the UE to initiate a registration procedure, but the AMF is unable to determine an allowed NSSAI for the UE, e.g., as specified in, e.g., 3GPP TS 23.501, then the CONFIGURATION UPDATE COMMAND message can or shall indicate "registration requested" in the Registration requested bit of the Configuration update indication IE, and can or shall not contain any other parameters. In some embodiments, if a network slice-specific authentication and authorization procedure for an S-NSSAI is completed as a: success, the AMF can or shall include this S-NSSAI in the allowed NSSAI; or failure, the AMF can or shall include this S-NSSAI in the rejected NSSAI with the reject cause "S-NSSAI is not available due to the failed or revoked network slice-specific authorization and authentication" in the rejected NSSAI.

In some embodiments, the allowed NSSAI and the rejected NSSAI can or shall be included in the CONFIGURATION UPDATE COMMAND message to reflect the result of the procedures subject to network slice-specific authentication and authorization. In some embodiments, if there are multiple S-NSSAIs subject to network slice-specific authentication and authorization, it is implementation specific if the AMF informs the UE about the outcome of the procedures in one or more CONFIGURATION UPDATE COMMAND messages.

In some embodiments, if the AMF includes the Network slicing indication IE in the CONFIGURATION UPDATE COMMAND with the Network slicing subscription change indication set to "Network slicing subscription changed", and changes to the allowed NSSAI require the UE to initiate a registration procedure, but the AMF is unable to determine an allowed NSSAI for the UE, e.g., as specified in 3GPP TS 23.501, then the CONFIGURATION UPDATE COMMAND message can or shall additionally indicate "registration requested" in the Registration requested bit of the Configuration update indication IE and can or shall not include an allowed NSSAI.

If the AMF needs to update the LADN information, the AMF can or shall include the LADN information in the LADN information IE of the CONFIGURATION UPDATE COMMAND message. If the AMF needs to update the "CAG information list," the AMF can or shall include the CAG information list IE in the CONFIGURATION UPDATE COMMAND message. If the UE has an emergency PDU session and the UE does not pass CAG access control with the updated CAG information (e.g., if 1) the UE is in a CAG cell and none of the CAG-ID(s) supported by the CAG cell is/are included in the "allowed CAG list" for the current PLMN in the updated "CAG information list," or if 2) the UE is in a non-CAG cell and the entry for the current PLMN in the updated "CAG information list" includes an "indication that the UE is only allowed to access 5GS via CAG cells"), the AMF can or shall perform a local release of all PDU sessions except for an emergency PDU session.

During an established 5GMM context, the network may send none, one, or more CONFIGURATION UPDATE COMMAND messages to the UE. If more than one CONFIGURATION UPDATE COMMAND message is sent, the messages need not have the same content.

In some embodiments, a UE configuration update may be accepted by the UE. In some embodiments, upon receiving the CONFIGURATION UPDATE COMMAND message, the UE can or shall stop timer T3346 if running and use the contents to update appropriate information stored within the UE. In some embodiments, if "acknowledgement requested" is indicated in the Acknowledgement bit of the Configuration update indication IE in the CONFIGURATION UPDATE COMMAND message, the UE can or shall send a CONFIGURATION UPDATE COMPLETE message. In some embodiments, if the UE receives a new 5G-GUTI in the CONFIGURATION UPDATE COMMAND message, the UE can or shall consider the new 5G-GUTI as valid, the old 5G-GUTI as invalid, stop timer T3519 if running, and delete any stored SUCI; otherwise, the UE can or shall consider the old 5G-GUTI as valid. The UE can or shall provide the 5G-GUTI to the lower layer of 3GPP access if the CONFIGURATION UPDATE COMMAND message is sent over the non-3GPP access, and the UE is in 5GMM-REGISTERED in both 3GPP access and non-3GPP access in the same PLMN.

If the UE receives a new TAI list in the CONFIGURATION UPDATE COMMAND message, the UE can or shall consider the new TAI list as valid and the old TAI list as invalid; otherwise, the UE can or shall consider the old TAI list as valid. If the UE receives a new service area list in the CONFIGURATION UPDATE COMMAND message, the UE can or shall consider the new service area list as valid and the old service area list as invalid; otherwise, the UE can or shall consider the old service area list, if any, as valid. If the UE receives new NITZ information in the CONFIGURATION UPDATE COMMAND message, the UE considers the new NITZ information as valid and the old NITZ information as invalid; otherwise, the UE can or shall consider the old NITZ information as valid.

If the UE receives a LADN information IE in the CONFIGURATION UPDATE COMMAND message, the UE can or shall consider the old LADN information as invalid and the new LADN information as valid, if any; otherwise, the UE can or shall consider the old LADN information as valid. If the UE receives a new allowed NSSAI for the associated access type in the CONFIGURATION UPDATE COMMAND message, the UE can or shall consider the new allowed NSSAI as valid for the associated access type, store the allowed NSSAI for the associated access type, and consider the old allowed NSSAI for the associated access type as invalid; otherwise, the UE can or shall consider the old Allowed NSSAI as valid for the associated access type. If the UE receives a new configured NSSAI in the CONFIGURATION UPDATE COMMAND message, the UE can or shall consider the new configured NSSAI for the registered PLMN as valid and the old configured NSSAI for the registered PLMN as invalid; otherwise, the UE can or shall consider the old configured NSSAI for the registered PLMN as valid The UE can or shall store the new configured NSSAI.

If the UE receives the Network slicing indication IE in the CONFIGURATION UPDATE COMMAND message with the Network slicing subscription change indication set to "Network slicing subscription changed", the UE can or shall delete the network slicing information for each and every PLMN except for the current PLMN. If the UE receives Operator-defined access category definitions IE in the CONFIGURATION UPDATE COMMAND message and the Operator-defined access category definitions IE contains one or more operator-defined access category definitions, the UE can or shall delete any operator-defined access category definitions stored for a Registered Public Land Mobile Network (RPLMN) and can or shall store the received operator-defined access category definitions for the RPLMN. If the UE receives the Operator-defined access category definitions IE in the CONFIGURATION UPDATE COMMAND message and the Operator-defined access category definitions IE contains no operator-defined access category definitions, the UE can or shall delete any operator-defined access category definitions stored for the RPLMN. If the CONFIGURATION UPDATE COMMAND message does not contain the Operator-defined access category definitions IE, the UE can or shall not delete the operator-defined access category definitions stored for the RPLMN.

If the UE receives the SMS indication IE in the CONFIGURATION UPDATE COMMAND message with the SMS availability indication set to: a) "SMS over NAS not available", the UE can or shall consider that SMS over NAS transport is not allowed by the network; and b) "SMS over NAS available", the UE may request the use of SMS over NAS transport by performing a registration procedure for mobility and periodic registration update after the completion of the generic UE configuration update procedure.

If the UE receives the CAG information list IE in the CONFIGURATION UPDATE COMMAND message, the UE can or shall delete any stored "CAG information list" and can or shall store the received "CAG information list" via the CAG information list IE. If the received "CAG information list" includes an entry containing the identity of the current PLMN, the UE can or shall operate as follows:

A) If the UE receives the CONFIGURATION UPDATE COMMAND message via a CAG cell, the entry or "allowed CAG list" for the current PLMN in the received "CAG information list" may not or does not include the CAG-ID(s) supported by the current CAG cell, and:

i) the entry for the current PLMN in the received "CAG information list" does not include an "indication that the UE is only allowed to access 5GS via CAG cells", then the UE can or shall enter the state 5GMM-REGISTERED.LIMITED-SERVICE and can or shall search for a suitable cell according to, e.g., 3GPP TS 38.304 with the updated "CAG information list"; or ii) the entry for the current PLMN in the received "CAG information list" includes an "indication that the UE is only allowed to access 5GS via CAG cells" and:

iii) if the "allowed CAG list" for the current PLMN in the received "CAG information list" includes one or more CAG-IDs, the UE can or shall enter the state 5GMM-REGISTERED.LIMITED-SERVICE and can or shall search for a suitable cell according to, e.g., 3GPP TS 38.304 with the updated "CAG information list"; or iv) if the entry or "allowed CAG list" for the current PLMN in the received "CAG information list" does not include any CAG-ID, and:

a) the UE does not have an emergency PDU session, then the UE can or shall enter the state 5GMM-DEREGISTERED.PLMN-SEARCH and can or shall apply the PLMN selection process defined in, e.g., 3GPP TS 23.122 with the updated "CAG information list"; or b) the UE has an emergency PDU session, then the UE can or shall perform a local release of all PDU sessions except for an emergency PDU session; or B) If the UE receives the CONFIGURATION UPDATE COMMAND message via a non-CAG cell and the entry for the current PLMN in the received "CAG information list" includes an "indication that the UE is only allowed to access 5GS via CAG cells" and:

i) if the "allowed CAG list" for the current PLMN in the received "CAG information list" includes one or more CAG-IDs, the UE can or shall enter the state 5GMM-REGISTERED.LIMITED-SERVICE and can or shall search for a suitable cell according to, e.g., 3GPP TS 38.304 with the updated "CAG information list"; or ii) if the entry or "allowed CAG list" for the current PLMN in the received "CAG information list" does not include any CAG-ID, and:

iii) the UE does not have an emergency PDU session, then the UE can or shall enter the state 5GMM-DEREGISTERED.PLMN-SEARCH and can or shall apply the PLMN selection process defined in, e.g., 3GPP TS 23.122 with the updated "CAG information list"; or iv) the UE has an emergency PDU session, then the UE can or shall perform a local release of all PDU sessions except for an emergency PDU session.

If the CONFIGURATION UPDATE COMMAND message indicates "registration requested" in the Registration requested bit of the Configuration update indication IE and:

a) contains no other parameters or contains at least one of the following parameters: a new allowed NSSAI, a new configured NSSAI or the Network slicing subscription change indication, and:

1) an emergency PDU session exists, the UE can or shall, after the completion of the generic UE configuration update procedure and the release of the emergency PDU session, release the existing N1 NAS signalling connection, and start a registration procedure for mobility and periodic registration update; or 2) no emergency PDU Session exists, the UE can or shall, after the completion of the generic UE configuration update procedure and the release of the existing N1 NAS signalling connection, start a registration procedure for mobility and periodic registration update; or b) an MICO indication is included without a new allowed NSSAI or a new configured NSSAI, the UE can or shall, after the completion of the generic UE configuration update procedure, start a registration procedure for mobility and registration update to re-negotiate MICO mode with the network.

In some embodiments, the UE receiving the rejected NSSAI in the CONFIGURATION UPDATE COMMAND message takes the following actions based on the rejection cause in the rejected NSSAI:

"S-NSSAI not available in the current PLMN [public land mobile network] or SNPN [stand-alone non-public network]": the UE can or shall add the rejected S-NSSAI(s) in the rejected NSSAI for the current PLMN and not attempt to use this S-NSSAI in the current PLMN until switching off the UE, the UICC containing the USIM is removed, or the entry of the "list of subscriber data" with the SNPN identity of the current SNPN is updated.

"S-NSSAI not available in the current registration area": the UE can or shall add the rejected S-NSSAI(s) in the rejected NSSAI for the current registration area and not attempt to use this S-NSSAI in the current registration area until switching off the UE, the UE moving out of the current registration area, a universal integrated circuit card (UICC) containing the universal subscriber identity module (USIM) is removed, or the entry of the "list of subscriber data" with the SNPN identity of the current SNPN is updated.

If the UE receives a T3447 value IE in the CONFIGURATION UPDATE COMMAND message and has indicated "service gap control supported" in the REGISTRATION REQUEST, then the UE can or shall replace the stored T3447 value with the received value in the T3447 value IE, and if neither zero nor deactivated use the received T3447 value with the timer T3447 next time it is started. If the received T3447 value is zero or deactivated, then the UE can or shall stop the timer T3447 if running.

If the UE is not in NB-N1 mode, the UE has set a Radio Applications Cloud Server (RACS) bit to "RACS supported" in the 5GMM capability IE of the REGISTRATION REQUEST message and the CONFIGURATION UPDATE COMMAND message includes:

a) a UE radio capability ID deletion indication IE set to "Network-assigned UE radio capability IDs requested", the UE can or shall delete any network-assigned UE radio capability IDs associated with the RPLMN or RSNPN stored at the UE, then the UE can or shall initiate a registration procedure for mobility and periodic registration update. If the UE has an applicable manufacturer-assigned UE radio capability ID for the current UE radio configuration, the UE can or shall include the manufacturer-assigned UE radio capability ID in the UE radio capability ID IE of the REGISTRATION REQUEST message; and b) a UE radio capability ID IE, the UE can or shall store the UE radio capability ID.

If the UE is not currently registered for emergency services and the 5GS registration result IE in the CONFIGURATION UPDATE COMMAND message is set to "Registered for emergency services", the UE can or shall consider itself registered for emergency services.

In some embodiments, if the UE has an emergency PDU session, the AMF can or shall accept the REGISTRATION REQUEST message even if the UE does not pass CAG access control. If the UE not passing CAG access control has an emergency PDU session, the AMF can or shall perform a local release of all non-emergency PDU sessions associated with 3GPP access and can or shall request the SMF to perform a local release of all those non-emergency PDU sessions. If the registration update request has been accepted by the network, the AMF can or shall send a REGISTRATION ACCEPT message to the UE. If timer T3513 is running in the AMF, the AMF can or shall stop timer T3513 if a paging request was sent with the access type indicating non-3GPP and the REGISTRATION REQUEST message includes the Allowed PDU session status IE. If timer T3565 is running in the AMF, the AMF can or shall stop timer T3565 when a REGISTRATION REQUEST message is received.

For each of the information elements: 5GMM capability, S1 UE network capability, and UE security capability, the AMF can or shall store all octets received from the UE in the REGISTRATION REQUEST message, up to the maximum length defined for the respective information element. In some embodiments, this information can be forwarded to the new AMF during inter-AMF handover or to a new mobility management entity (MME) during inter-system handover to S1 mode.

The 5G-GUTI reallocation can or shall be part of the registration procedure for mobility registration update. The 5G-GUTI reallocation should be part of the registration procedure for periodic registration update. During the registration procedure for mobility registration update, if the AMF has not allocated a new 5G-GUTI by the generic UE configuration update procedure, the AMF can or shall include in the REGISTRATION ACCEPT message the new assigned 5G-GUTI. If a 5G-GUTI or the SOR transparent container IE is included in the REGISTRATION ACCCEPT message, the AMF can or shall start timer T3550 and enter state 5GMM-COMMON-PROCEDURE-INITIATED.

If the Operator-defined access category definitions IE or the Extended emergency number list IE is included in the REGISTRATION ACCCEPT message, the AMF can or shall start timer T3550 and enter state 5GMM-COMMON-PROCEDURE-INITIATED. If the UE is not in NB-N1 mode and the UE has set the RACS bit to "RACS supported" in the 5GMM Capability IE of the REGISTRATION REQUEST message, the AMF may include a UE radio capability ID IE or a UE radio capability ID deletion indication IE in the REGISTRATION ACCEPT message. In this case, the AMF can or shall start timer T3550 and enter state 5GMM-COMMON-PROCEDURE-INITIATED.

The AMF may include a new TAI list for the UE in the REGISTRATION ACCEPT message. The new TAI list can or shall not contain both tracking areas in NB-N1 mode and tracking areas not in NB-N1 mode. The UE, upon receiving a REGISTRATION ACCEPT message, can or shall delete its old TAI list and store the received TAI list. If there is no TAI list received, the UE can or shall consider the old TAI list as valid. In some embodiments, when assigning the TAI list, the AMF can consider the eNodeB's capability of support of Cellular Internet-of-Things (CIoT) 5GS optimization.

The AMF may also include a list of equivalent PLMNs in the REGISTRATION ACCEPT message. Each entry in the list contains a PLMN code (e.g., mobile country code [MCC]+mobile network code [MNC]). The UE can or shall store the list as provided by the network, and if there is no emergency PDU session established, the UE can or shall remove from the list any PLMN code that is already in the list of "forbidden PLMNs". If the UE is not registered for emergency services and there is an emergency PDU session established, the UE can or shall remove from the list of equivalent PLMNs any PLMN code present in the "forbidden PLMNs list" when the emergency PDU session is released. In addition, the UE can or shall add to the stored list the PLMN code of the registered PLMN that sent the list. The UE can or shall replace the stored list on each receipt of the REGISTRATION ACCEPT message. If the REGISTRATION ACCEPT message does not contain a list, then the UE can or shall delete the stored list. In some embodiments, if the UE is not registered for emergency services, and if the PLMN identity of the registered PLMN is a member of the list of "forbidden PLMNs", any such PLMN identity can or shall be deleted from the corresponding list(s).

The AMF may include new service area restrictions in the Service area list IE in the REGISTRATION ACCEPT message. The UE may receive and act upon a REGISTRATION ACCEPT message with new service area restrictions, such as described elsewhere herein. If the Service area list IE is not included in the REGISTRATION ACCEPT message, any tracking area in the registered PLMN and its equivalent PLMN(s) in the registration area is considered as an allowed tracking area.

In some embodiments, the AMF can or shall include the MICO indication IE in the REGISTRATION ACCEPT message only if the MICO indication IE was included in the REGISTRATION REQUEST message, the AMF supports and accepts the use of MICO mode. If the AMF supports and accepts the use of MICO mode, the AMF may indicate "all PLMN registration area allocated" in the MICO indication IE in the REGISTRATION ACCEPT message. If "all PLMN registration area allocated" is indicated in the MICO indication IE, the AMF can or shall not assign and include the TAI list in the REGISTRATION ACCEPT message. If the REGISTRATION ACCEPT message includes an MICO indication IE indicating "all PLMN registration area allocated", the UE can or shall treat all TAIs in the current PLMN as a registration area and delete its old TAI list. If "strictly periodic registration timer supported" is indicated in the MICO indication IE in the REGISTRATION REQUEST message, the AMF may indicate "strictly periodic registration timer supported" in the MICO indication IE and may include the T3512 value IE in the REGISTRATION ACCEPT message. If the timer value received in T3512 IE is different from the already stored value of the timer T3512 and the timer T3512 is running, the UE can or shall restart T3512 with the new value received in the T3512 value IE.

In some embodiments, the AMF can or shall include an active time value in the T3324 IE in the REGISTRATION ACCEPT message if the UE requested an active time value in the REGISTRATION REQUEST message and the AMF accepts the use of MICO mode and the use of active time. In some embodiments, if the UE does not include MICO indication IE in the REGISTRATION REQUEST message, then the AMF can or shall disable MICO mode if it was already enabled. In some embodiments, the AMF may include the T3512 value IE in the REGISTRATION ACCEPT message only if the REGISTRATION REQUEST message was sent over the 3GPP access. In some embodiments, the AMF may include the non-3GPP de-registration timer value IE in the REGISTRATION ACCEPT message only if the REGISTRATION REQUEST message was sent for the non-3GPP access.

If the UE requests "control plane CIoT 5GS optimization" in the 5GS update type IE, indicates support of control plane CIoT 5GS optimization in the 5GMM capability IE and the AMF decides to accept the requested CIoT 5GS optimization and the registration request, the AMF can or shall indicate "control plane CIoT 5GS optimization supported" in the 5GS network feature support IE of the REGISTRATION ACCEPT message. In some embodiments, if the UE has indicated support for the control plane CIoT 5GS optimizations, and the AMF decides to activate the congestion control for transport of user data via the control plane, then the AMF can or shall include the T3448 value IE in the REGISTRATION ACCEPT message.

For inter-system change from S1 mode to N1 mode in 5GMM-IDLE mode, if the UE has included a ngKSI indicating a current 5G NAS security context in the REGISTRATION REQUEST message by which the REGISTRATION REQUEST message is integrity protected, the AMF can or shall take one of the following actions:

a) if the AMF retrieves the current 5G NAS security context as indicated by the ngKSI and 5G-GUTI sent by the UE, the AMF can or shall integrity check the REGISTRATION REQUEST message using the current 5G NAS security context and integrity protect the REGISTRATION ACCEPT message using the current 5G NAS security context;

b) if the AMF cannot retrieve the current 5G NAS security context as indicated by the ngKSI and 5G-GUTI sent by the UE, the AMF can or shall treat the REGISTRATION REQUEST message as failing the integrity check and take action, e.g., according to 3GPP TS 24.501 or 3GPP TS 29.502; or c) if the UE has not included an Additional GUTI IE, the AMF may treat the REGISTRATION REQUEST message as in the previous item, i.e. as if it cannot retrieve the current 5G NAS security context.

In some embodiments, the procedure for handling described above at failure to retrieve the current 5G NAS security context or if no Additional GUTI IE was provided does not preclude the option for the AMF to perform a primary authentication and key agreement procedure and create a new native 5G NAS security context. In some embodiments, the integrity check at the AMF for inter-system change from S1 mode to N1 mode in 5GMM-CONNECTED mode can be FFS.

Upon receipt of the REGISTRATION ACCEPT message, the UE can or shall reset the registration attempt counter and service request attempt counter, enter state 5GMM-REGISTERED and set the 5GS update status to 5U1 UPDATED. In some embodiments, if the UE receives the REGISTRATION ACCEPT message from a PLMN, then the UE can or shall reset the PLMN-specific attempt counter for that PLMN for the specific access type for which the message was received. The UE can or shall also reset the PLMN-specific N1 mode attempt counter for that PLMN for the specific access type for which the message was received. If the message was received via 3GPP access, the UE can or shall reset the counter for "SIM/USIM considered invalid for GPRS services" events and the counter for "SIM/USIM considered invalid for non-GPRS services", if any. If the message was received via non-3GPP access, the UE can or shall reset the counter for "SIM/USIM considered invalid for 5GS services over non-3GPP" events.

If the UE receives the REGISTRATION ACCEPT message from an SNPN, then the UE can or shall reset the SNPN-specific attempt counter for the current SNPN for the specific access type for which the message was received. If the message was received via 3GPP access, the UE can or shall reset the counter for "the entry for the current SNPN considered invalid for 3GPP access" events. If the message was received via non-3GPP access, the UE can or shall reset the counter for "the entry for the current SNPN considered invalid for non-3GPP access" events.

In some embodiments, if the REGISTRATION ACCEPT message included a T3512 value IE, the UE can or shall use the value in T3512 value IE as a periodic registration update timer (e.g., a T3512 timer). If the T3512 value IE is not included, the UE can or shall use the value currently stored, e.g. from a prior REGISTRATION ACCEPT message. In some embodiments, if the REGISTRATION ACCEPT message include a T3324 value IE, the UE can or shall use the value in the T3324 value IE as an active time timer (e.g., a T3324 timer). If the REGISTRATION ACCEPT message does not include a T3324 value IE, UE can or shall not start the timer T3324 until a new value is received from the network.

In some embodiments, if the REGISTRATION ACCEPT message included a non-3GPP de-registration timer value IE, the UE can or shall use the value in non-3GPP de-registration timer value IE as non-3GPP de-registration timer. In some embodiments, if non-3GPP de-registration timer value IE is not included, the UE can or shall use the value currently stored, e.g. from a prior REGISTRATION ACCEPT message. In some embodiments, if non-3GPP de-registration timer value IE is not included and there is no stored non-3GPP de-registration timer value in the UE, the UE can or shall use the default value of the non-3GPP de-registration timer.

In some embodiments, if the REGISTRATION ACCEPT message contains a 5G-GUTI, the UE can or shall return a REGISTRATION COMPLETE message to the AMF to acknowledge the received 5G-GUTI, stop timer T3519 if running, and delete any stored SUCI. In some embodiments, the UE can or shall provide the 5G-GUTI to the lower layer of 3GPP access if the REGISTRATION ACCEPT message is sent over the non-3GPP access, and the UE is in 5GMM-REGISTERED in both 3GPP access and non-3GPP access in the same PLMN.

In some embodiments, if the REGISTRATION ACCEPT message contains the Network slicing indication IE with the Network slicing subscription change indication set to "Network slicing subscription changed", or contains a configured NSSAI IE with a new configured NSSAI for the current PLMN and optionally the mapped S-NSSAI(s) for the configured NSSAI for the current PLMN, the UE can or shall return a REGISTRATION COMPLETE message to the AMF to acknowledge the successful update of the network slicing information.

In some embodiments, if the REGISTRATION ACCEPT message contains the Operator-defined access category definitions IE or the Extended emergency number list IE or both, the UE can or shall return a REGISTRATION COMPLETE message to the AMF to acknowledge reception of the operator-defined access category definitions or the extended local emergency numbers list or both. In some embodiments, if the REGISTRATION ACCEPT message contains the UE radio capability ID IE or the UE radio capability ID deletion indication IE, the UE can or shall return a REGISTRATION COMPLETE message to the AMF to acknowledge reception of the UE radio capability ID IE or the UE radio capability ID deletion indication IE.

In some embodiments, if the T3448 value IE is present in the received REGISTRATION ACCEPT message and the value indicates that this timer is neither zero nor deactivated, the UE can or shall: a) stop timer T3448 if it is running; and b) start timer T3448 with the value provided in the T3448 value IE. In some embodiments, if the UE is using 5GS services with control plane CIoT 5GS optimization, the T3448 value IE is present in the REGISTRATION ACCEPT message and the value indicates that this timer is either zero or deactivated, the UE can or shall ignore the T3448 value IE and proceed as if the T3448 value IE was not present.

In some embodiments, if the UE in 5GMM-IDLE mode initiated the registration procedure for mobility and periodic registration update and the REGISTRATION ACCEPT message does not include the T3448 value IE and if timer T3448 is running, then the UE can or shall stop timer T3448. In some embodiments, upon receiving a REGISTRATION COMPLETE message, the AMF can or shall stop timer T3550 and change to state 5GMM-REGISTERED. In some embodiments, the 5G-GUTI, if sent in the REGISTRATION ACCEPT message, can or shall be considered as valid, and the UE radio capability ID, if sent in the REGISTRATION ACCEPT message, can or shall be considered as valid.

In some embodiments, if the 5GS update type IE was included in the REGISTRATION REQUEST message with the SMS requested bit set to "SMS over NAS supported" and:
  a) the SMSF address is stored in the UE 5GMM context and:
    1) the UE is considered available for SMS over NAS; or
    2) the UE is considered not available for SMS over NAS and the SMSF has confirmed that the activation of the SMS service is successful; or
  b) the SMSF address is not stored in the UE 5GMM context, the SMSF selection is successful and the SMSF has confirmed that the activation of the SMS service is successful;
then the AMF can or shall set the SMS allowed bit of the 5GS registration result IE in the REGISTRATION ACCEPT message. If the UE 5GMM context does not contain an SMSF address or the UE is not considered available for SMS over NAS, then the AMF can or shall:
  a) store the SMSF address in the UE 5GMM context if not stored already; and
  b) store the value of the SMS allowed bit of the 5GS registration result IE in the UE 5GMM context and consider the UE available for SMS over NAS.

In some embodiments, if SMSF selection in the AMF or SMS activation via the SMSF is not successful, or the AMF does not allow the use of SMS over NAS, then the AMF can or shall set the SMS allowed bit of the 5GS registration result IE to "SMS over NAS not allowed" in the REGISTRATION ACCEPT message.

In some embodiments, if the 5GS update type IE was included in the REGISTRATION REQUEST message with the SMS requested bit set to "SMS over NAS not supported" or the 5GS update type IE was not included in the REGISTRATION REQUEST message, then the AMF can or shall:
  a) mark the 5GMM context to indicate that the UE is not available for SMS over NAS; and
  b) set the SMS allowed bit of the 5GS registration result IE to "SMS over NAS not allowed" in the REGISTRATION ACCEPT message.

In some embodiments, the AMF can notify the SMSF that the UE is deregistered from SMS over NAS based on local configuration. In some embodiments, when the UE receives the REGISTRATION ACCEPT message, if the UE is also registered over another access to the same PLMN, the UE considers the value indicated by the SMS allowed bit of the 5GS registration result IE as applicable for both accesses over which the UE is registered. In some embodiments, if the 5GS update type IE was included in the REGISTRATION REQUEST message with the NG-RAN-RCU bit set to "NG-RAN radio capability update needed", the AMF can or shall delete any stored UE radio capability information for NG-RAN.

In some embodiments, the AMF can or shall include the 5GS registration result IE in the REGISTRATION ACCEPT message. If the 5GS registration result IE value indicates:
  a) "3GPP access", the UE:
    can or shall consider itself as being registered to 3GPP access only; and
    if in 5GMM-REGISTERED state over non-3GPP access and on the same PLMN as 3GPP access, can or shall enter state 5GMM-DEREGISTERED.ATTEMPTING-REGISTRATION over non-3GPP access and set the 5GS update status to 5U2 NOT UPDATED over non-3GPP access;
  b) "Non-3GPP access", the UE:
    can or shall consider itself as being registered to non-3GPP access only; and
    if in the 5GMM-REGISTERED state over 3GPP access and is on the same PLMN as non-3GPP access, can or shall enter the state 5GMM-DEREGISTERED.ATTEMPTING-REGISTRATION over 3GPP access and set the 5GS update status to 5U2 NOT UPDATED over 3GPP access; or
  c) "3GPP access and Non-3GPP access", the UE can or shall consider itself as being registered to both 3GPP access and non-3GPP access.

In some embodiments, if the UE is not currently registered for emergency services and the 5GS registration result IE value in the REGISTRATION ACCEPT message is set to "Registered for emergency services", the UE can or shall consider itself registered for emergency services and can or shall release locally PDU session(s) not associated with emergency services, if any.

In some embodiments, the AMF can or shall include the allowed NSSAI for the current PLMN and can or shall include the mapped S-NSSAI(s) for the allowed NSSAI contained in the requested NSSAI (i.e. Requested NSSAI IE or Requested mapped NSSAI IE) from the UE if available, in the REGISTRATION ACCEPT message if the UE included the requested NSSAI in the REGISTRATION REQUEST message and the AMF allows one or more S-NSSAIs for the current PLMN in the Requested NSSAI IE or one or more mapped S-NSSAIs in the Requested NSSAI IE or Requested mapped NSSAI IE. In some embodiments, the S-NSSAI associated with each of the active PDN connections for which interworking to 5GS is supported, can or shall be included in the allowed NSSAI if the UE included the UE status IE with the EMM registration status set to "UE is in EMM-REGISTERED state" in the REGISTRATION REQUEST message and the AMF supports N26 interface.

In some embodiments, the AMF may also include rejected NSSAI in the REGISTRATION ACCEPT message. Rejected NSSAI contains S-NSSAI(s) which was included in the requested NSSAI but rejected by the network associated with rejection cause(s). In some embodiments, if the UE indicated the support for network slice-specific authentication and authorization, and:

a) if the Requested NSSAI IE only includes the S-NSSAIs:

1) which are subject to network slice-specific authentication and authorization; and 2) for which the network slice-specific authentication and authorization procedure has not been initiated;

the AMF can or shall in the REGISTRATION ACCEPT message include:

1) the "NSSAA to be performed" indicator in the 5GS registration result IE set to indicate whether network slice-specific authentication and authorization procedure will be performed by the network;

2) pending NSSAI containing one or more S-NSSAIs for which network slice-specific authentication and authorization will be performed; and 3) the current registration area in the list of "non-allowed tracking areas" in the Service area list IE; or b) if the Requested NSSAI IE includes one or more S-NSSAIs subject to network slice-specific authentication and authorization, the AMF can or shall in the REGISTRATION ACCEPT message include:

1) the allowed NSSAI containing the S-NSSAIs or the mapped S-NSSAIs which are not subject to network slice-specific authentication and authorization or for which the network slice-specific authentication and authorization has been successfully performed; and 2) pending NSSAI containing one or more S-NSSAIs for which network slice-specific authentication and authorization will be performed, if any.

In some embodiments, if the UE indicated the support for network slice-specific authentication and authorization, and if:

a) the UE did not include the requested NSSAI in the REGISTRATION REQUEST message or none of the S-NSSAIs in the requested NSSAI in the REGISTRATION REQUEST message are present in the subscribed S-NSSAIs; and b) all of the S-NSSAIs in the subscribed S-NSSAIs are subject to network slice-specific authentication and authorization;

the AMF can or shall in the REGISTRATION ACCEPT message include:

a) the "NSSAA to be performed" indicator in the 5GS registration result IE to indicate whether network slice-specific authentication and authorization procedure will be performed by the network;

b) pending NSSAI containing one or more S-NSSAIs for which network slice-specific authentication and authorization will be performed; and c) the current registration area in the list of "non-allowed tracking areas" in the Service area list IE.

In some embodiments, the AMF may include a new configured NSSAI for the current PLMN in the REGISTRATION ACCEPT message if:

a) the REGISTRATION REQUEST message did not include a requested NSSAI;

b) the REGISTRATION REQUEST message included a requested NSSAI containing an S-NSSAI that is not valid in the serving PLMN;

c) the REGISTRATION REQUEST message included a requested NSSAI containing an S-NSSAI with incorrect mapping information to an S-NSSAI of the HPLMN;

d) the REGISTRATION REQUEST message included the Network slicing indication IE with the Default configured NSSAI indication bit set to "Requested NSSAI created from default configured NSSAI"; or e) the REGISTRATION REQUEST message included the requested mapped NSSAI.

In some embodiments, if a new configured NSSAI for the current PLMN is included, the AMF can or shall also include the mapped S-NSSAI(s) for the configured NSSAI for the current PLMN if available in the REGISTRATION ACCEPT message. In such embodiments, the AMF can or shall start timer T3550 and enter state 5GMM-COMMON-PROCEDURE-INITIATED.

In some embodiments, the AMF can or shall include the Network slicing indication IE with the Network slicing subscription change indication set to "Network slicing subscription changed" in the REGISTRATION ACCEPT message if the UDM has indicated that the subscription data for network slicing has changed. In this case the AMF can or shall start timer T3550 and enter state 5GMM-COMMON-PROCEDURE-INITIATED.

In some embodiments, if the S-NSSAI(s) associated with the existing PDU session(s) of the UE is not included in the requested NSSAI of the REGISTRATION REQUEST message, the AMF can or shall perform a local release of the PDU session(s) associated with the S-NSSAI(s) and can or shall request the SMF to perform a local release of those PDU session(s). In some embodiments, the UE receiving the pending NSSAI in the REGISTRATION ACCEPT message can or shall store the S-NSSAI. In some embodiments, the UE receiving the rejected NSSAI in the REGISTRATION ACCEPT message takes the following actions based on the rejection cause in the rejected NSSAI:

"S-NSSAI not available in the current PLMN or SNPN": the UE can or shall add the rejected S-NSSAI(s) in the rejected NSSAI for the current PLMN and not attempt to use this S-NSSAI in the current PLMN until switching off the UE, the UICC containing the USIM is removed, the entry of the "list of subscriber data" with the SNPN identity of the current SNPN is updated, or the rejected S-NSSAI(s) are removed or deleted.

"S-NSSAI not available in the current registration area": the UE can or shall add the rejected S-NSSAI(s) in the rejected NSSAI for the current registration area and not attempt to use this S-NSSAI in the current registration area until switching off the UE, the UE moving out of the current registration area, the UICC containing the USIM is removed, the entry of the "list of subscriber data" with the SNPN identity of the current SNPN is updated, or the rejected S-NSSAI(s) are removed or deleted.

In some embodiments, if the UE set the NSSAA bit in the 5GMM capability IE to "Network slice-specific authentication and authorization not supported", and:

a) if the Requested NSSAI IE only includes the S-NSSAIs subject to network slice-specific authentication and authorization and one or more subscribed S-NSSAIs (containing one or more S-NSSAIs each of which may be associated with a new S-NSSAI) marked as default are available, the AMF can or shall include in the REGISTRATION ACCEPT message:

1) the allowed NSSAI containing the subscribed S-NSSAIs marked as default S-NSSAI(s); and 2) the rejected NSSAI containing the S-NSSAI(s) subject to network slice specific authentication and authorization with the rejection cause indicating "S-NSSAI not available in the current PLMN"; or b) if the Requested NSSAI IE includes one or more S-NSSAIs subject to network slice-specific authentication and authorization, the AMF can or shall include in the REGISTRATION ACCEPT message:

1) the allowed NSSAI containing the S-NSSAI(s) or the mapped S-NSSAI(s) which are not subject to network slice-specific authentication and authorization; and 2) the rejected NSSAI containing:

i) the S-NSSAI(s) subject to network slice specific authentication and authorization with the rejection cause indicating "S-NSSAI not available in the current PLMN"; and ii) the S-NSSAI(s) which was included in the requested NSSAI but rejected by the network associated with the rejection cause indicating "S-NSSAI not available in the current PLMN" or the rejection cause indicating "S-NSSAI not available in the current registration area", if any.

In some embodiments, for a REGISTRATION REQUEST message with a 5GS registration type IE indicating "mobility registration updating", if the UE does not indicate support for network slice-specific authentication and authorization, and:

a) the UE is not in NB-N1 mode; and
b) if:

1) the UE did not include the requested NSSAI in the REGISTRATION REQUEST message;

2) none of the S-NSSAIs in the requested NSSAI in the REGISTRATION REQUEST message are present in the subscribed S-NSSAIs; or 3) all the S-NSSAIs included in the requested NSSAI in the REGISTRATION REQUEST message are considered to be rejected by the network;

and one or more subscribed S-NSSAIs marked as default are available, the AMF can or shall put the subscribed S-NSSAIs marked as default S-NSSAIs in the allowed NSSAI of the REGISTRATION ACCEPT message. In some embodiments, the AMF can or shall determine a registration area such that all S-NSSAIs of the allowed NSSAI are available in the registration area.

During a registration procedure for mobility and periodic registration update for which the 5GS registration type IE indicates:

a) "periodic registration updating"; or
b) "mobility registration updating" and the UE is in NB-N1 mode;

the AMF may provide a new allowed NSSAI to the UE in the REGISTRATION ACCEPT message.

In some embodiments, if the REGISTRATION ACCEPT message contains the Network slicing indication IE with the Network slicing subscription change indication set to "Network slicing subscription changed", the UE can or shall delete the network slicing information for each and every PLMN except for the current PLMN.

In some embodiments, if the REGISTRATION ACCEPT message contains the allowed NSSAI, then the UE can or shall store the included allowed NSSAI together with the PLMN identity of the registered PLMN and the registration area.

With respect to each of the PDU session(s) active in the UE, if the allowed NSSAI contains neither:

a) an S-NSSAI matching to the S-NSSAI of the PDU session; nor b) a mapped S-NSSAI matching to the mapped S-NSSAI of the PDU session;

the UE can or shall perform a local release of all such PDU sessions except for the persistent PDU session(s).

For each of the PDU session(s) active in the UE, if the allowed NSSAI contains a mapped S-NSSAI matching to the mapped S-NSSAI of the PDU session, the UE can or shall locally update the S-NSSAI associated with the PDU session to the corresponding S-NSSAI received in the allowed NSSAI.

In some embodiments, if the REGISTRATION ACCEPT message contains a configured NSSAI IE with a new configured NSSAI for the current PLMN and optionally the mapped S-NSSAI(s) for the configured NSSAI for the current PLMN, the UE can or shall store the contents of the configured NSSAI IE.

During a registration procedure for mobility and periodic registration update for which the 5GS registration type IE indicates:

a) "periodic registration updating"; or
b) "mobility registration updating" and the UE is in NB-N1 mode;

if the REGISTRATION ACCEPT message does not contain an allowed NSSAI, the UE considers the previously received allowed NSSAI as valid.

In some embodiments, if the Uplink data status IE is included in the REGISTRATION REQUEST message:

a) if the AMF determines that the UE is in non-allowed area or is not in allowed area, and the PDU session(s) indicated by the Uplink data status IE is non-emergency PDU session(s) or the UE is not configured for high priority access in selected PLMN, the AMF can or shall include the PDU session reactivation result IE in the REGISTRATION ACCEPT message indicating that user-plane resources for the corresponding PDU session(s) cannot be re-established, and can or shall include the PDU session reactivation result error cause IE with the 5GMM cause set to #28 "Restricted service area";

b) otherwise, the AMF can or shall:

1) indicate the SMF to re-establish the user-plane resources for the corresponding PDU session;

2) include PDU session reactivation result IE in the REGISTRATION ACCEPT message to indicate the user-plane resources re-establishment result of the PDU sessions for which the UE requested to re-establish the user-plane resources; and 3) determine the UE presence in LADN service area and forward the UE presence in LADN service area towards the SMF, if the corresponding PDU session is a PDU session for LADN.

In some embodiments, if the Uplink data status IE is not included in the REGISTRATION REQUEST message and the REGISTRATION REQUEST message is sent for the trigger d), the AMF may indicate the SMF to re-establish the user-plane resources for the PDU sessions.

In some embodiments, if a PDU session status IE is included in the REGISTRATION REQUEST message, the AMF can or shall:

a) perform a local release of all those PDU session which are in 5GSM state PDU SESSION ACTIVE on the AMF side associated with the access type the REGISTRATION REQUEST message is sent over, but are indicated by the UE as being in 5GSM state PDU SESSION INACTIVE; and b) include a PDU session status IE in the REGISTRATION ACCEPT message to indicate which PDU sessions associated with the access type the REGISTRATION REQUEST message is sent over are active in the AMF.

In some embodiments, if the Allowed PDU session status IE is included in the REGISTRATION REQUEST message, the AMF can or shall:

a) for a 5GSM message from each SMF that has indicated pending downlink signalling only, forward the received 5GSM message via 3GPP access to the UE after the REGISTRATION ACCEPT message is sent;

b) for each SMF that has indicated pending downlink data only:

1) notify the SMF that reactivation of the user-plane resources for the corresponding PDU session(s) associated with non-3GPP access cannot be performed if the corresponding PDU session ID(s) are not indicated in the Allowed PDU session status IE; and 2) notify the SMF that reactivation of the user-plane resources for the corresponding PDU session(s) associated with non-3GPP access can be performed if the corresponding PDU session ID(s) are indicated in the Allowed PDU session status IE.

c) for each SMF that have indicated pending downlink signalling and data:

1) notify the SMF that reactivation of the user-plane resources for the corresponding PDU session(s) associated with non-3GPP access cannot be performed if the corresponding PDU session ID(s) are not indicated in the Allowed PDU session status IE;

2) notify the SMF that reactivation of the user-plane resources for the corresponding PDU session(s) associated with non-3GPP access can be performed if the corresponding PDU session ID(s) are indicated in the Allowed PDU session status IE; and 3) discard the received 5GSM message for PDU session(s) associated with non-3GPP access; and d) include the PDU session reactivation result IE in the REGISTRATION ACCEPT message to indicate the successfully re-established user-plane resources for the corresponding PDU sessions, if any.

In some embodiments, if the PDU session reactivation result IE is included in the REGISTRATION ACCEPT message indicating that the user-plane resources have been successfully reactivated for a PDU session that was requested by the UE in the Allowed PDU session status IE, the UE considers the corresponding PDU session to be associated with the 3GPP access. In some embodiments, if the user-plane resources of a PDU session have been successfully reactivated over the 3GPP access, the AMF and SMF update the associated access type of the corresponding PDU session.

In some embodiments, if the AMF has included the PDU session reactivation result IE in the REGISTRATION ACCEPT message and there exist one or more PDU sessions for which the user-plane resources cannot be re-established, then the AMF may include the PDU session reactivation result error cause IE to indicate the cause of failure to re-establish the user-plane resources.

In some embodiments, if an EPS bearer context status IE is included in the REGISTRATION REQUEST message, the AMF handles the received EPS bearer context status IE as specified in, e.g., 3GPP TS 23.502.

In some embodiments, if the EPS bearer context status information is generated for the UE during the inter-system change from S1 mode to N1 mode as specified in, e.g., 3GPP TS 23.502 and the AMF supports N26 interface, the AMF can or shall include an EPS bearer context status IE in the REGISTRATION ACCEPT message to indicate the UE which mapped EPS bearer contexts are active in the network.

In some embodiments, if the user-plane resources cannot be established for a PDU session, the AMF can or shall include the PDU session reactivation result IE in the REGISTRATION ACCEPT message indicating that user-plane resources for the corresponding PDU session cannot be re-established, and can or shall include the PDU session reactivation result error cause IE with the 5GMM cause set to:

a) #43 "LADN not available" if the user-plane resources cannot be established because the SMF indicated to the AMF that the UE is located out of the LADN service area (see, e.g., 3GPP TS 29.502);

b) #28 "restricted service area" if the user-plane resources cannot be established because the SMF indicated to the AMF that only prioritized services are allowed (see, e.g., 3GPP TS 29.502); or c) #92 "insufficient user-plane resources for the PDU session" if the user-plane resources cannot be established because the SMF indicated to the AMF that the resource is not available in the UPF (see, e.g., 3GPP TS 29.502).

In some embodiments, it may be up to UE implementation when to re-send a request for user-plane re-establishment for the associated PDU session after receiving a PDU session reactivation result error cause IE with a 5GMM cause set to #92 "insufficient user-plane resources for the PDU session".

In some embodiments, if the AMF needs to initiate PDU session status synchronization the AMF can or shall include a PDU session status IE in the REGISTRATION ACCEPT message to indicate the UE which PDU sessions are active in the AMF.

The AMF may include the LADN information IE in the REGISTRATION ACCEPT message. The UE, upon receiving the REGISTRATION ACCEPT message with the LADN information IE, can or shall delete its old LADN information (if any) and store the received new LADN information.

In some embodiments, if the AMF does not include the LADN information IE in the REGISTATION ACCEPT message during registration procedure for mobility and registration update, the UE can or shall delete its old LADN information. In some embodiments, if the PDU session status IE is included in the REGISTRATION ACCEPT message, the UE can or shall perform a local release of all those PDU sessions associated with the access type the REGISTRATION ACCEPT message is sent over which are in 5GSM state PDU SESSION ACTIVE on the UE side, but are indicated by the AMF as being in 5GSM state PDU SESSION INACTIVE.

In some embodiments, if:

a) the UE included a PDU session status IE in the REGISTRATION REQUEST message;

b) the UE is operating in the single-registration mode;

c) the UE is performing inter-system change from S1 mode to N1 mode in 5GMM-IDLE mode; and d) the UE has received the IWK N26 bit set to "interworking without N26 interface supported";

the UE can or shall ignore the PDU session status IE if received in the REGISTRATION ACCEPT message.

In some embodiments, if the EPS bearer context status IE is included in the REGISTRATION ACCEPT message, the UE can or shall locally delete all those QoS flow descriptions and all associated QoS rules, if any, which are associated with inactive EPS bearer contexts as indicated by the AMF in the EPS bearer context status IE. In some embodiments, if the UE included S1 mode supported indication in the REGISTRATION REQUEST message, the AMF supporting inter-system change with EPS can or shall set the IWK N26 bit to either:

a) "interworking without N26 not supported" if the AMF supports N26 interface; or b) "interworking without N26 supported" if the AMF does not support N26 interface in the 5GS network feature support IE in the REGISTRATION ACCEPT message.

The UE supporting S1 mode can or shall operate in the mode for inter-system interworking with EPS as follows:

a) if the IWK N26 bit in the 5GS network feature support IE is set to "interworking without N26 interface not supported", the UE can or shall operate in single-registration mode;

b) if the IWK N26 bit in the 5GS network feature support IE is set to "interworking without N26 interface supported" and the UE supports dual-registration mode, the UE may operate in dual-registration mode; or c) if the IWK N26 bit in the 5GS network feature support IE is set to "interworking without N26 interface supported" and the UE only supports single-registration mode, the UE can or shall operate in single-registration mode.

In some embodiments, the UE can or shall treat the received interworking without N26 interface indicator for inter-system change with EPS as valid in the entire PLMN and its equivalent PLMN(s).

In some embodiments, the network informs the UE about the support of specific features, such as IMS voice over PS session, location services (5G-LCS), emergency services or emergency services fallback, in the 5GS network feature support information element. In a UE with IMS voice over PS session capability, the IMS voice over PS session indicator, Emergency services support indicator and Emergency services fallback indicator can or shall be provided to the upper layers. The upper layers take the IMS voice over PS session indicator into account when selecting the access domain for voice sessions or calls. When initiating an emergency call, the upper layers take the IMS voice over PS session indicator, Emergency services support indicator and Emergency services fallback indicator into account for the access domain selection. When the UE determines via the IMS voice over PS session indicator that the network does not support IMS voice over PS sessions in N1 mode, then the UE can or shall not perform a local release of any persistent PDU session if the AMF does not indicate that the PDU session is in 5GSM state PDU SESSION INACTIVE via the PDU session status IE. When the UE determines via the Emergency services support indicator that the network does not support emergency services in N1 mode, then the UE can or shall not perform a local release of any emergency PDU session if user-plane resources associated with that emergency PDU session are established if the AMF does not indicate that the PDU session is in 5GSM state PDU SESSION INACTIVE via the PDU session status IE. In a UE with LCS capability, location services indicators (5G-LCS) can or shall be provided to the upper layers.

In some embodiments, the AMF can or shall set the EMF bit in the 5GS network feature support IE to:

a) "Emergency services fallback supported in NR connected to 5GCN and E-UTRA connected to 5GCN" if the network supports the emergency services fallback procedure when the UE is in an NR cell connected to 5GCN or an E-UTRA cell connected to 5GCN;

b) "Emergency services fallback supported in NR connected to 5GCN only" if the network supports the emergency services fallback procedure when the UE is in an NR cell connected to 5GCN and does not support the emergency services fallback procedure when the UE is in an E-UTRA cell connected to 5GCN;

c) "Emergency services fallback supported in E-UTRA connected to 5GCN only" if the network supports the emergency services fallback procedure when the UE is in an E-UTRA cell connected to 5GCN and does not support the emergency services fallback procedure when the UE is in an NR cell connected to 5GCN; or d) "Emergency services fallback not supported" if network does not support the emergency services fallback procedure when the UE is in any cell connected to 5GCN.

In some embodiments, if the emergency services are supported in neither the EPS nor the 5GS homogeneously, based on operator policy, the AMF will set the EMF bit in the 5GS network feature support IE to "Emergency services fallback not supported".

In some embodiments, even though the AMF's support of emergency services fallback is indicated per RAT, the UE's support of emergency services fallback is not per RAT, e.g., the UE's support of emergency services fallback is the same for both NR connected to 5GCN and E-UTRA connected to 5GCN.

In some embodiments, if the UE is not operating in SNPN access mode:

a) the network informs the UE that the use of access identity 1 is valid in the RPLMN or equivalent PLMN by setting the MPS indicator bit of the 5GS network feature support IE to "Access identity 1 valid", in the REGISTRATION ACCEPT message. Based on operator policy, the AMF sets the MPS indicator bit in the REGISTRATION ACCEPT message based on the MPS priority information in the user's subscription context obtained from the UDM;

b) upon receiving a REGISTRATION ACCEPT message with the MPS indicator bit set to "Access identity 1 valid", the UE can or shall act as a UE with access identity 1 configured for MPS, in all NG-RAN of the registered PLMN and its equivalent PLMNs. The MPS indicator bit in the 5GS network feature support IE provided in the REGISTRATION ACCEPT message is valid until the UE receives a REGISTRATION ACCEPT message with the MPS indicator bit set to "Access identity 1 not valid" or until the UE selects a non-equivalent PLMN. Access identity 1 is only applicable while the UE is in N1 mode;

c) during ongoing active PDU sessions that were set up relying on the MPS indicator bit being set to "Access identity 1 valid", if the network indicates in a registration update that the MPS indicator bit is reset to "Access identity 1 not valid", then the UE can or shall no longer act as a UE with access identity 1 configured for MPS unless the USIM contains a valid configuration for access identity 1 in RPLMN or equivalent PLMN. In the UE, the ongoing active PDU sessions are not affected by the change of the MPS indicator bit;

d) the network informs the UE that the use of access identity 2 is valid in the RPLMN or equivalent PLMN by setting the MCS indicator bit of the 5GS network feature support IE to "Access identity 2 valid", in the REGISTRATION ACCEPT message. Based on operator policy, the AMF sets the MCS indicator bit in the REGISTRATION ACCEPT message based on the MCS priority information in the user's subscription context obtained from the UDM;

e) upon receiving a REGISTRATION ACCEPT message with the MCS indicator bit set to "Access identity 2 valid", the UE can or shall act as a UE with access identity 2 configured for MCS, in all NG-RAN of the registered PLMN and its equivalent PLMNs. The MCS indicator bit in the 5GS network feature support IE provided in the REGISTRATION ACCEPT message is valid until the UE receives a REGISTRATION ACCEPT message with the MCS indicator bit set to "Access identity 2 not valid" or until the UE selects a non-equivalent PLMN. Access identity 2 is only applicable while the UE is in N1 mode; and f) during ongoing active PDU sessions that were set up relying on the MCS indicator bit being set to "Access identity 2 valid", if the network indicates in a registration update that the MCS indicator bit is reset to "Access identity 2 not valid", then the UE can or shall no longer act as a UE with access identity 2 configured for MCS unless the USIM contains a valid configuration for access identity 2 in RPLMN or equivalent PLMN. In the UE, the ongoing active PDU sessions are not affected by the change of the MCS indicator bit.

In some embodiments, if the UE indicates support for restriction on use of enhanced coverage in the REGISTRATION REQUEST message and the AMF decides to restrict the use of enhanced coverage for the UE, then the AMF can or shall set the RestrictEC bit to "Use of enhanced coverage is restricted" in the 5GS network feature support IE in the REGISTRATION ACCEPT message.

In some embodiments, if the UE is operating in SNPN access mode:

a) the network informs the UE that the use of access identity 1 is valid in the RSNPN by setting the MPS indicator bit of the 5GS network feature support IE to "Access identity 1 valid", in the REGISTRATION ACCEPT message. Based on operator policy, the AMF sets the MPS indicator bit in the REGISTRATION ACCEPT message based on the MPS priority information in the user's subscription context obtained from the UDM;

b) upon receiving a REGISTRATION ACCEPT message with the MPS indicator bit set to "Access identity 1 valid", the UE can or shall act as a UE with access identity 1 configured for MPS, in all NG-RAN of the registered SNPN. The MPS indicator bit in the 5GS network feature support IE provided in the REGISTRATION ACCEPT message is valid until the UE receives a REGISTRATION ACCEPT message with the MPS indicator bit set to "Access identity 1 not valid" or until the UE selects another SNPN. Access identity 1 is only applicable while the UE is in N1 mode;

c) during ongoing active PDU sessions that were set up relying on the 1VIPS indicator bit being set to "Access identity 1 valid", if the network indicates in a registration update that the MPS indicator bit is reset to "Access identity 1 not valid", then the UE can or shall no longer act as a UE with access identity 1 configured for 1VIPS unless the unified access control configuration in the "list of subscriber data" stored in the ME (see, e.g., 3GPP TS 23.122) indicates the UE is configured for access identity 1 in the RSNPN. In the UE, the ongoing active PDU sessions are not affected by the change of the MPS indicator bit;

d) the network informs the UE that the use of access identity 2 is valid in the RSNPN by setting the MCS indicator bit of the 5GS network feature support IE to "Access identity 2 valid", in the REGISTRATION ACCEPT message. Based on operator policy, the AMF sets the MCS indicator bit in the REGISTRATION ACCEPT message based on the MCS priority information in the user's subscription context obtained from the UDM;

e) upon receiving a REGISTRATION ACCEPT message with the MCS indicator bit set to "Access identity 2 valid", the UE can or shall act as a UE with access identity 2 configured for MCS, in all NG-RAN of the registered SNPN. The MCS indicator bit in the 5GS network feature support IE provided in the REGISTRATION ACCEPT message is valid until the UE receives a REGISTRATION ACCEPT message with the MCS indicator bit set to "Access identity 2 not valid" or until the UE selects another SNPN. Access identity 2 is only applicable while the UE is in N1 mode; and f) during ongoing active PDU sessions that were set up relying on the MCS indicator bit being set to "Access identity 2 valid", if the network indicates in a registration update that the MCS indicator bit is reset to "Access identity 2 not valid", then the UE can or shall no longer act as a UE with access identity 2 configured for MCS unless the unified access control configuration in the "list of subscriber data" stored in the ME (see, e.g., 3GPP TS 23.122) indicates the UE is configured for access identity 2 in the RSNPN. In the UE, the ongoing active PDU sessions are not affected by the change of the MCS indicator bit.

In some embodiments, if the UE has set the Follow-on request indicator to "Follow-on request pending" in the REGISTRATION REQUEST message, or the network has downlink signalling pending, the AMF can or shall not immediately release the NAS signalling connection after the completion of the registration procedure.

In some embodiments, if the UE is authorized to use vehicle-to-everything (V2X) communication over a PC5 reference point or interface based on:

a) at least one of the following bits in the 5GMM capability IE of the REGISTRATION REQUEST message set by the UE, or already stored in the 5GMM context in the AMF during the previous registration procedure as follows:

1) the V2XCEPC5 bit to "V2X communication over E-UTRA-PC5 supported"; or 2) the V2XCNPC5 bit to "V2X communication over NR-PC5 supported"; and b) the user's subscription context obtained from the UDM as defined in, e.g., 3GPP TS 23.287;

the AMF should not immediately release the NAS signalling connection after the completion of the registration procedure.

In some embodiments, if a Requested DRX [discontinuous reception] parameters IE was included in the REGISTRATION REQUEST message, the AMF can or shall include the Negotiated DRX parameters IE in the REGISTRATION ACCEPT message. The AMF may set the Negotiated DRX parameters IE based on the received Requested DRX parameters IE and operator policy if available.

In some embodiments, the AMF can or shall include the Negotiated extended DRX parameters IE in the REGISTRATION ACCEPT message only if the Requested extended DRX parameters IE was included in the REGISTRATION REQUEST message, and the AMF supports and accepts the use of eDRX. The AMF may set the Negotiated extended DRX parameters IE based on the received Requested extended DRX parameters IE, operator policy, and the user's subscription context obtained from the UDM if available.

In some embodiments, if the UE included in the REGISTRATION REQUEST message the UE status information IE with the enterprise mobility management (EMM) registration status set to "UE is in EMM-REGISTERED state" and the AMF does not support N26 interface, the AMF can or shall operate as described in, e.g., 3GPP TS 24.501 or 3GPP TS 29.502.

In some embodiments, if the UE has indicated support for service gap control in the REGISTRATION REQUEST message, a service gap time value is available in the 5GMM context, the AMF may include the T3447 value IE set to the service gap time value in the REGISTRATION ACCEPT message.

In some embodiments, if the UE requests ciphering keys for ciphered broadcast assistance data in the REGISTRATION REQUEST message and the AMF has valid ciphering key data applicable to the UE's subscription and current tracking area, then the AMF can or shall include the ciphering key data in the Ciphering key data IE of the REGISTRATION ACCEPT message.

In some embodiments, if due to regional subscription restrictions or access restrictions the UE is not allowed to access the TA, but the UE has an emergency PDU session established, the AMF may accept the REGISTRATION REQUEST message and indicate to the SMF to release all non-emergency PDU sessions when the registration procedure is initiated in 5GMM-CONNECTED mode. When the registration procedure is initiated in 5GMM-IDLE mode, the AMF indicates to the SMF to release all non-emergency PDU sessions and informs the UE via the PDU session status IE in the REGISTRATION ACCEPT message. The AMF can or shall not indicate to the SMF to release the emergency PDU session. The network can or shall behave as if the UE is registered for emergency services.

In some embodiments, if the REGISTRATION ACCEPT message includes the PDU session reactivation result error cause IE with the 5GMM cause set to #28 "Restricted service area", the UE can or shall enter the state 5GMM-REGISTERED.NON-ALLOWED-SERVICE, and behave, e.g., as specified in, e.g., 3GPP TS 24.501 or 3GPP TS 29.502.

In some embodiments, if the REGISTRATION ACCEPT message includes the SOR transparent container IE and:

a) the SOR transparent container IE does not successfully pass the integrity check (see, e.g., 3GPP TS 33.501); and b) if the UE attempts obtaining service on another PLMNs as specified in, e.g., 3GPP TS 23.122;

then the UE can or shall release locally the established NAS signalling connection after sending a REGISTRATION COMPLETE message.

In some embodiments, if the REGISTRATION ACCEPT message includes the SOR transparent container IE and the SOR transparent container IE successfully passes the integrity check (see, e.g., 3GPP TS 33.501):

a) the UE can or shall proceed with the behavior as specified in, e.g., 3GPP TS 23.122;
and b) if the registration procedure is performed over 3GPP access and the UE attempts obtaining service on another PLMNs as specified in, e.g., 3GPP TS 23.122 then the UE may release locally the established NAS signalling connection after sending a REGISTRATION COMPLETE message. Otherwise the UE can or shall send a REGISTRATION COMPLETE message and not release the current N1 NAS signalling connection locally. If an acknowledgement is requested in the SOR transparent container IE of the REGISTRATION ACCEPT message, the UE acknowledgement is included in the SOR transparent container IE of the REGISTRATION COMPLETE message.

In some embodiments, if the SOR transparent container IE successfully passes the integrity check (see, e.g., 3GPP TS 33.501), indicates list of preferred PLMN/access technology combinations is provided and the list type indicates:

a) "PLMN ID and access technology list", then the ME can or shall replace the highest priority entries in the "Operator Controlled PLMN Selector with Access Technology" list stored in the ME and can or shall proceed with the behavior as specified in, e.g., 3GPP TS 23.122; or b) "secured packet", then the ME can or shall behave as if a SMS is received with protocol identifier set to SIM data download, data coding scheme set to class 2 message and SMS payload as secured packet contents of SOR transparent container IE. The SMS payload is forwarded to UICC as specified in, e.g., 3GPP TS 23.040 and the ME can or shall proceed with the behavior as specified in, e.g., 3GPP TS 23.122.

In some embodiments, if required by operator policy, the AMF can or shall include the NSSAI inclusion mode IE in the REGISTRATION ACCEPT message (See, e.g., 3GPP TS 24.501 or 3GPP TS 29.502). Upon receipt of the REGISTRATION ACCEPT message:

a) if the message includes the NSSAI inclusion mode IE, the UE can or shall operate in the NSSAI inclusion mode indicated in the NSSAI inclusion mode IE over the current access within the current PLMN and its equivalent PLMN(s), if any, in the current registration area; or b) otherwise if:

1) the UE has NSSAI inclusion mode for the current PLMN and access type stored in the UE, the UE can or shall operate in the stored NSSAI inclusion mode; or 2) the UE does not have NSSAI inclusion mode for the current PLMN and the access type stored in the UE and if the UE is performing the registration procedure over:

i) 3GPP access, the UE can or shall operate in NSSAI inclusion mode D in the current PLMN and the current access type; or ii) non-3GPP access, the UE can or shall operate in NSSAI inclusion mode C in the current PLMN and the current access type.

The AMF may include operator-defined access category definitions in the REGISTRATION ACCEPT message.

In some embodiments, if there is a running T3447 timer in the AMF and the Uplink data status IE is included or the Follow-on request indicator is set to "Follow-on request pending" in the REGISTRATION REQUEST message, the AMF can or shall ignore the Uplink data status IE or that the Follow-on request indicator is set to "Follow-on request pending" and proceed as if the Uplink data status IE was not received or the Follow-on request indicator was not set to "Follow-on request pending" except for the following case:

the PDU session(s) indicated by the Uplink data status IE is emergency PDU session(s);

the UE is configured for high priority access in selected PLMN;

the REGISTRATION REQUEST message is as a paging response; or the UE is establishing an emergency PDU session or performing emergency services fallback.

In some embodiments, if the UE receives Operator-defined access category definitions IE in the REGISTRATION ACCEPT message and the Operator-defined access category definitions IE contains one or more operator-defined access category definitions, the UE can or shall delete any operator-defined access category definitions stored for the RPLMN and can or shall store the received operator-defined access category definitions for the RPLMN. In some embodiments, if the UE receives the Operator-defined access category definitions IE in the REGISTRATION ACCEPT message and the Operator-defined access category definitions IE contains no operator-defined access category definitions, the UE can or shall delete any operator-defined access category definitions stored for the RPLMN. If the REGISTRATION ACCEPT message does not contain the Operator-defined access category definitions IE, the UE can or shall not delete the operator-defined access category definitions stored for the RPLMN.

In some embodiments, if the UE has indicated support for service gap control in the REGISTRATION REQUEST message and:

the REGISTRATION ACCEPT message contains the T3447 value IE, then the UE can or shall store the new T3447 value, erase any previous stored T3447 value if exists and use the new T3447 value with the timer T3447 next time it is started; or the REGISTRATION ACCEPT message does not contain the T3447 value IE, then the UE can or shall erase any previous stored T3447 value if exists and stop the timer T3447 if running.

In some embodiments, if the UE has set the RACS bit to "RACS supported" in the 5GMM Capability IE of the REGISTRATION REQUEST message and the REGISTRATION ACCEPT message includes:

a) a UE radio capability ID deletion indication IE set to "Network-assigned UE radio capability IDs deletion requested", the UE can or shall delete any network-assigned UE radio capability IDs associated with the RPLMN or RSNPN stored at the UE, then the UE can or shall initiate a registration procedure for mobility and periodic registration update as specified in, e.g., 3GPP TS 24.501 or 3GPP TS 29.502. In some embodiments, if the UE has an applicable manufacturer-assigned UE radio capability ID for the current UE configuration, the UE can or shall include the manufacturer-assigned UE radio capability ID in the UE radio capability ID IE of the REGISTRATION REQUEST message; and b) a UE radio capability ID IE, the UE can or shall store the UE radio capability ID.

UE is not using 5GS services with control plane CIoT 5GS optimization

In some embodiments, if the UE has an emergency PDU session, the AMF can or shall accept the SERVICE REQUEST message even if the UE does not pass CAG access control is not a pass. In some embodiments, if the UE not passing CAG access control has an emergency PDU session, the AMF can or shall perform a local release of all non-emergency PDU sessions associated with 3GPP access and can or shall request the SMF to perform a local release of all those non-emergency PDU sessions.

For cases other than h), the UE can or shall treat the reception of the SERVICE ACCEPT message as successful completion of the procedure. The UE can or shall reset the service request attempt counter, stop timer T3517 and enter the state 5GMM-REGISTERED.

For case h), a) the UE can or shall treat the indication from the lower layers when the UE has changed to S1 mode or E-UTRA connected to 5GCN (see, e.g., 3GPP TS 23.502) as successful completion of the procedure and stop timer T3517;

b) if a UE operating in single-registration mode has changed to S1 mode, it can or shall disable the N1 mode capability for 3GPP access; and c) the AMF can or shall not perform CAG access control.

In some embodiments, if the AMF needs to initiate PDU session status synchronization or a PDU session status IE was included in the SERVICE REQUEST message, the AMF can or shall include a PDU session status IE in the SERVICE ACCEPT message to indicate which PDU sessions associated with the access type the SERVICE ACCEPT message is sent over are active in the AMF. In some embodiments, if the PDU session status information element is included in the SERVICE ACCEPT message, then the UE can or shall perform a local release of all those PDU sessions which are active on the UE side associated with the access type the SERVICE ACCEPT message is sent over, but are indicated by the AMF as being inactive.

In some embodiments, if the Uplink data status IE is included in the SERVICE REQUEST message, the AMF can or shall:

a) indicate the SMF to re-establish the user-plane resources for the corresponding PDU sessions;

b) include the PDU session reactivation result IE in the SERVICE ACCEPT message to indicate the user-plane resources re-establishment result of the PDU sessions for which the UE requested to re-establish the user-plane resources; and c) determine the UE presence in LADN service area and forward the UE presence in LADN service area towards the SMF, if the corresponding PDU session is a PDU session for LADN.

In some embodiments, if the Allowed PDU session status IE is included in the SERVICE REQUEST message, the AMF can or shall:

a) for a 5GSM message from each SMF that has indicated pending downlink signalling only, forward the received 5GSM message via 3GPP access to the UE after the SERVICE ACCEPT message is sent;

b) for each SMF that has indicated pending downlink data only:

1) notify the SMF that reactivation of the user-plane resources for the corresponding PDU session(s) associated with non-3GPP access cannot be performed if the corresponding PDU session ID(s) are not indicated in the Allowed PDU session status IE; and 2) notify the SMF that reactivation of the user-plane resources for the corresponding PDU session(s) associated with non-3GPP access can be performed if the corresponding PDU session ID(s) are indicated in the Allowed PDU session status IE.

c) for each SMF that have indicated pending downlink signalling and data:

1) notify the SMF that reactivation of the user-plane resources for the corresponding PDU session(s) associated with non-3GPP access cannot be performed if the corresponding PDU session ID(s) are not indicated in the Allowed PDU session status IE;

2) notify the SMF that reactivation of the user-plane resources for the corresponding PDU session(s) associated with non-3GPP access can be performed if the corresponding PDU session ID(s) are indicated in the Allowed PDU session status IE; and 3) discard the received 5GSM message for PDU session(s) associated with non-3GPP access; and d) include the PDU session reactivation result IE in the SERVICE ACCEPT message to indicate the successfully re-established user-plane resources for the corresponding PDU sessions, if any.

In some embodiments, if the PDU session reactivation result IE is included in the SERVICE ACCEPT message indicating that the user-plane resources have been successfully reactivated for a PDU session that was requested by the UE in the Allowed PDU session status IE, the UE considers the corresponding PDU session to be associated with the 3GPP access. If the user-plane resources of a PDU session have been successfully reactivated over the 3GPP access, the AMF and SMF update the associated access type of the corresponding PDU session.

In some embodiments, if the user-plane resources cannot be established for a PDU session, the AMF can or shall include the PDU session reactivation result IE in the SERVICE ACCEPT message indicating that user-plane resources for the corresponding PDU session cannot be re-established, and can or shall include the PDU session reactivation result error cause IE with the 5GMM cause set to:

a) #43 "LADN not available" if the user-plane resources cannot be established because the SMF indicated to the AMF that the UE is located out of the LADN service area (see, e.g., 3GPP TS 29.502);

b) #28 "restricted service area" if the user-plane resources cannot be established because the SMF indicated to the AMF that only prioritized services are allowed (see, e.g., 3GPP TS 29.502); or c) #92 "insufficient user-plane resources for the PDU session" if the user-plane resources cannot be established because the SMF indicated to the AMF that the resource is not available in the UPF (see, e.g., 3GPP TS 29.502).

Is some embodiments, it may be up to UE implementation when to re-send a request for user-plane re-establishment for the associated PDU session after receiving a PDU session reactivation result error cause IE with a 5GMM cause set to #92 "insufficient user-plane resources for the PDU session".

In some embodiments, if the SERVICE REQUEST message is for emergency services fallback, the AMF triggers the emergency services fallback procedure, e.g., as specified in, e.g., 3GPP TS 23.502.

In some embodiments, if the UE having an emergency PDU session sent the SERVICE REQUEST message via:

a) a CAG cell and none of the CAG-IDs of the CAG cell are included in the "Allowed CAG list" for the current PLMN in the UE's subscription; or b) a non-CAG cell in a PLMN for which the UE's subscription contains an "indication that the UE is only allowed to access 5GS via CAG cells";

the network can or shall accept the SERVICE REQUEST message and release all non-emergency PDU sessions locally. The emergency PDU session can or shall not be released.

In some embodiments, a request to establish a non-emergency PDU session from a UE served by either a non-CAG cell of a PLMN to which the UE is only allowed to access via a CAG cell or a non-allowed CAG cell, the UE needs to be rejected. However, no such mechanism is available. Since the SMF does not have CAG information, this needs to be handled by the AMF.

In some embodiments, if a UE served by:

a non-CAG cell of a PLMN to which the UE is only allowed to access via a CAG cell; or a non-allowed CAG cell;

the UE sends an UL NAS TRANSPORT messages containing a message requesting to establish a non-emergency PDU session, the AMF rejects it by sending a DL NAS TRANSPORT message including the PDU session ID, the request message, and the 5GMM cause #76 "Not authorized for this CAG or authorized for CAG cells only".

Upon receiving the DL NAS TRANSPORT message, the UE stops timer T3580 and aborts the PDU session establishment procedure.

In some embodiments, if a UE served by:

a non-CAG cell of a PLMN to which the UE is only allowed to access via a CAG cell; or a non-allowed CAG cell;

sends an UL NAS TRANSPORT messages containing a message requesting to establish a non-emergency PDU session, the AMF rejects it by sending a DL NAS TRANSPORT message including the PDU session ID, the request message, and the 5GMM cause #76 "Not authorized for this CAG or authorized for CAG cells only".

Upon receiving the DL NAS TRANSPORT message, the UE stops timer T3580 and aborts the PDU session establishment procedure.

In some embodiments, the following abnormal cases in AMF are identified:

a) if the Payload container type IE is set to "N1 SM information" and:

1) if the Old PDU session ID IE is not included in the UL NAS TRANSPORT message, the AMF does not have a PDU session routing context for the PDU session ID and the UE, the Request type IE is set to "initial request" or "MA PDU request", and the SMF selection fails, then the AMF can or shall send back to the UE the 5GSM message which was not forwarded, e.g., as specified in, e.g., 3GPP TS 24.501 or 3GPP TS 29.502;

2) if the Old PDU session ID IE is included in the UL NAS TRANSPORT message, the AMF has a PDU session routing context for the old PDU session ID and the UE and does not have a PDU session routing context for the PDU session ID and the UE, the Request type IE is set to "initial request", the AMF received a reallocation requested indication from the SMF indicating that the SMF is to be reallocated, and the SMF selection fails, then the AMF can or shall send back to the UE the 5GSM message which was not forwarded, e.g., as specified in 3GPP TS 24.501 or 3GPP TS 29.502;

3) if the AMF does not have a PDU session routing context for the PDU session ID and the UE, the Request type IE is set to "existing PDU session" or "MA PDU request", and the user's subscription context obtained from the UDM does not contain an SMF ID for the PDU session ID matching the PDU session ID received from the UE or for the DNN matching the DNN received from the UE such that the SMF ID includes a PLMN identity corresponding to the UE's HPLMN or the current PLMN, then the AMF may send back to the UE the 5GSM message which was not forwarded, e.g., as specified in 3GPP TS 24.501 or 3GPP TS 29.502.

4) if the Old PDU session ID IE is included in the UL NAS TRANSPORT message, and the AMF has a PDU session routing context for the old PDU session ID and the UE and does not have a PDU session routing context for the PDU session ID and the UE, the Request type IE is set to "initial request" and the AMF has not received a reallocation requested indication, the AMF should select an SMF with following handlings:

In some embodiments, if the S-NSSAI IE is not included and the user's subscription context obtained from UDM:

i) contains one default S-NSSAI, the AMF can or shall use the default S-NSSAI as the S-NSSAI;

ii) contains two or more default S-NSSAIs, the AMF can or shall use one of the default S-NSSAIs selected by operator policy as the S-NSSAI; and iii) does not contain a default S-NSSAI, the AMF can or shall use an S-NSSAI selected based on operator policy as the S-NSSAI.

In some embodiments, if the DNN IE is not included, and the user's subscription context obtained from UDM:

i) contains the default DNN for the S-NSSAI, the AMF can or shall use the default DNN as the DNN; and ii) does not contain the default DNN for the S-NSSAI, the AMF can or shall use a locally configured DNN as the DNN; and In some embodiments, if the DNN selected by the network is a LADN DNN, the AMF can or shall determine the UE presence in LADN service area.

In some embodiments, if the SMF selection is successful, the AMF should store a PDU session routing context for the PDU session ID and the UE, set the SMF ID in the stored PDU session routing context to the selected SMF ID, and forward the 5GSM message, the PDU session ID, the old PDU session ID, the S-NSSAI, the mapped S-NSSAI (if available in roaming scenarios), the DNN determined by the AMF, DNN selected by the network (if different from DNN determined by the AMF), the request type and UE presence in LADN service area (if DNN selected by the network corresponds to an LADN DNN) towards the SMF ID of the PDU session routing context.

In some embodiments, if the SMF selection fails, then the AMF can or shall send back to the UE the 5GSM message which was not forwarded, e.g., as specified in 3GPP TS 24.501 or 3GPP TS 29.502.

5) if the AMF has a PDU session routing context for the PDU session ID and the UE, the PDU session routing context indicates that the PDU session is an emergency PDU session, the Request type IE is set to "initial emergency request", the AMF should forward the 5GSM message, the PDU session ID, the S-NSSAI (if configured in the AMF emergency configuration data), the DNN (if configured in the AMF emergency configuration data) and the request type towards the SMF ID of the PDU session routing context.

6) if the Request type IE is set to "initial emergency request" and the S-NSSAI or the DNN is received, the AMF ignores the received S-NSSAI or the DNN and uses the emergency DNN from the AMF emergency configuration data, if any.

7) if the AMF does not have a PDU session routing context for the PDU session ID and the UE, and the Request type IE of the UL NAS TRANSPORT message is either not provided or is provided but set to other value then "initial request", "existing PDU session", "initial emergency request", "existing emergency PDU session" and "MA PDU request", then the AMF may send back to the UE the 5GSM message which was not forwarded, e.g., as specified in 3GPP TS 24.501 or 3GPP TS 29.502.

8) if the AMF unsuccessfully attempted to forward the 5GSM message, the PDU session ID, the S-NSSAI, the mapped S-NSSAI (if available in roaming scenarios), the DNN and the request type (if received) towards a SMF ID, then the AMF may send back to the UE the 5GSM message which was not forwarded, e.g., as specified in 3GPP TS 24.501 or 3GPP TS 29.502.

9) the Old PDU session ID IE is included in the UL NAS TRANSPORT message, the AMF does not have a PDU session routing context for the old PDU session ID and the UE, the AMF does not have a PDU session routing context for the PDU session ID and the UE, the Request type IE is set to "initial request", the AMF should select an SMF with following handlings In some embodiments, if the S-NSSAI IE is not included and the user's subscription context obtained from UDM:

i) contains one default S-NSSAI, the AMF can or shall use the default S-NSSAI as the S-NSSAI;

ii) contains two or more default S-NSSAIs, the AMF can or shall use one of the default S-NSSAIs selected by operator policy as the S-NSSAI; and iii) does not contain a default S-NSSAI, the AMF can or shall use an S-NSSAI selected based on operator policy as the S-NSSAI.

In some embodiments, if the DNN IE is not included, and the user's subscription context obtained from UDM:

i) contains the default DNN for the S-NSSAI, the AMF can or shall use the default DNN as the DNN; and ii) does not contain the default DNN for the S-NSSAI, the AMF can or shall use a locally configured DNN as the DNN; and In some embodiments, if the DNN selected by the network is a LADN DNN, the AMF can or shall determine the UE presence in LADN service area.

In some embodiments, if the SMF selection is successful, the AMF should store a PDU session routing context for the PDU session ID and the UE, set the SMF ID in the stored PDU session routing context to the selected SMF ID, and forward the 5GSM message, the PDU session ID, the old PDU session ID, the S-NSSAI, the mapped S-NSSAI (if available in roaming scenarios), the DNN determined by the AMF, DNN selected by the network (if different from DNN determined by the AMF), the request type and UE presence in LADN service area (if DNN selected by the network corresponds to an LADN DNN) towards the SMF ID of the PDU session routing context.

In some embodiments, if the SMF selection fails, then the AMF can or shall send back to the UE the 5GSM message which was not forwarded, e.g., as specified in 3GPP TS 24.501 or 3GPP TS 29.502.

10) if the AMF has a PDU session routing context for the PDU session ID and the UE, the PDU session routing context indicates that the PDU session is not an emergency PDU session, and the Request type IE is included and is set to "existing emergency PDU session", the AMF may send back to the UE the 5GSM message which was not forwarded, e.g., as specified in 3GPP TS 24.501 or 3GPP TS 29.502.

11) if the AMF has a PDU session routing context for the PDU session ID and the UE, the PDU session routing context indicates that the PDU session is an emergency PDU session, and the Request type IE is included and is set to "existing PDU session", the AMF may forward the 5GSM message, the PDU session ID, the S-NSSAI (if configured in the AMF emergency configuration data), the DNN (if configured in the AMF emergency configuration data), and the request type towards the SMF identified by the SMF ID of the PDU session routing context.

12) if the AMF has a PDU session routing context for the PDU session ID and the UE, the Request type IE is set to "initial request", then the AMF can or shall perform a local release of the PDU session identified by the PDU session ID and can or shall request the SMF to perform a local release of the PDU session, and proceed, e.g., as specified in 3GPP TS 24.501 or 3GPP TS 29.502.

13) if the Request type IE is set to "initial request" and the S-NSSAI IE contains an S-NSSAI that is not allowed by the network, then the AMF can or shall send back to the UE the 5GSM message which was not forwarded, e.g., as specified in 3GPP TS 24.501 or 3GPP TS 29.502.

14) if the Request type IE is set to "existing PDU session", the AMF has a PDU session routing context for the PDU session ID and the UE, the PDU session routing context indicates that the PDU session is not an emergency PDU session, and the S-NSSAI associated with the PDU session identified by the PDU session ID is not allowed for the target access type, the AMF can or shall send back to the UE the 5GSM message which was not forwarded, e.g., as specified in 3GPP TS 24.501 or 3GPP TS 29.502.

15) if the Request type IE is set to "initial request", "existing PDU session", "modification request" or "MA PDU request", the UE is not configured for high priority access in selected PLMN, and the UE is in non-allowed area or is not in allowed area, the AMF can or shall send back to the UE the 5GSM message which was not forwarded, and 5GMM cause #28 "Restricted service area," e.g., as specified in 3GPP TS 24.501 or 3GPP TS 29.502.

16) if the Request type IE is set to "initial request" or "MA PDU request", the AMF is pending the receipt of a REGISTRATION REQUEST message indicating "mobility registration updating" in the 5GS registration type IE, and an emergency PDU session exists for the UE (See, e.g., 3GPP TS 24.501 or 3GPP TS 29.502), the AMF can or shall send back to the UE the 5GSM message which was not forwarded, e.g., as specified in 3GPP TS 24.501 or 3GPP TS 29.502.

17) if the timer T3447 is running and the UE supports service gap control:

i) the UE is not configured for high priority access in selected PLMN;

ii) the current NAS signalling connection was not triggered by paging; and iii) mobile terminated signalling has not been sent or no user-plane resources have been established for any PDU session after the establishment of the current NAS signalling connection, then the AMF can or shall send back to the UE the 5GSM message which was not forwarded, e.g., as specified in 3GPP TS 24.501 or 3GPP TS 29.502.

18) if the AMF has a PDU session routing context for the PDU session ID and the UE, the Request type IE is not included, the UE is not configured for high priority access in selected PLMN, and the PDU session is not an emergency PDU session, then the AMF can or shall forward the 5GSM message, and the PDU session ID IE towards the SMF identified by the SMF ID of the PDU session routing context with:

i) an exemptionInd attribute indicating "message was exempted from the DNN based congestion activated in the AMF," e.g., as specified in 3GPP TS 29.502, if DNN based congestion control is activated for the selected DNN;

ii) an exemptionInd attribute indicating "message was exempted from the S-NSSAI and DNN based congestion activated in the AMF," e.g., as specified in 3GPP TS 29.502, if S-NSSAI and DNN based congestion control is activated for the selected S-NSSAI and the selected DNN; or iii) an exemptionInd attribute indicating "message was exempted from the S-NSSAI only based congestion activated in the AMF," e.g., as specified in 3GPP TS 29.502, if S-NSSAI only based congestion control is activated for the selected S-NSSAI.

19) if the Request type IE is set to "MA PDU request" and the S-NSSAI IE contains an S-NSSAI that is not allowed by the network on neither access, then the AMF can or shall send to the UE the 5GSM message which was not forwarded, e.g., as specified in 3GPP TS 24.501 or 3GPP TS 29.502.

20) if the Request type IE is set to neither "initial emergency request" nor "existing emergency PDU session", the UE sent the UL NAS TRANSPORT message via:

i) a CAG cell, and none of the CAG-ID(s) supported by the CAG cell is included in the UE's "allowed CAG list" for the current PLMN; or ii) a non-CAG cell, and the entry of the UE's "CAG information list" for the current PLMN includes an "indication that the UE is only allowed to access 5GS via CAG cells";

then the AMF can or shall send to the UE the 5GSM message which was not forwarded, e.g., as specified in 3GPP TS 24.501 or 3GPP TS 29.502.

b) If the Payload container type IE is set to "SMS" and the AMF does not have an SMSF address associated with the UE or the AMF cannot forward the content of the Payload container IE to the SMSF associated with the SMSF address available in the AMF, the AMF can or shall abort the procedure.

c) If the Payload container type IE is set to "LTE Positioning Protocol (LPP) message container" and if the Additional information IE is not included in the UL NAS TRANSPORT message or the AMF cannot forward the content of the Payload container IE to the LMF associated with the routing information included in the Additional information IE, the AMF can or shall abort the procedure.

d) If the Payload container type IE is set to "UE policy container" and the AMF does not have a PCF address associated with the UE or the AMF cannot forward the content of the Payload container IE to the PCF associated with the PCF address available in the AMF, the AMF can or shall abort the procedure.

e) If the Payload container type IE is set to "Location services message container" and if the Additional information IE is included in the UL NAS TRANSPORT message and the AMF cannot forward the content of the Payload container IE to an LMF associated with the routing information included in the Additional information IE, the AMF can or shall abort the procedure.

f) If the Payload container type IE is set to "SMS" or "LTE Positioning Protocol (LPP) message container":

1) the timer T3447 is running and the UE supports service gap control;

2) the UE is not configured for high priority access in selected PLMN;

3) the current NAS signalling connection was not triggered by paging; and 4) mobile terminated signalling has not been sent or no user-plane resources have been established for any PDU session after the establishment of the UE in 5GMM-CONNECTED mode receives mobile terminated signalling or downlink data over the user-plane the current NAS signalling connection, the AMF can or shall abort the procedure.

In some embodiments, in such a state the N1 NAS signalling connection can be released by the network.

g) If the Payload container type IE is set to "CIoT user data container" and:

1) if the AMF does not have a PDU session routing context for the PDU session ID and the UE; or 2) if the AMF unsuccessfully attempted to forward the user data container and the PDU session ID, then the AMF may send back to the UE the CIoT user data container which was not forwarded, e.g., as specified in 3GPP TS 24.501 or 3GPP TS 29.502.

h) If the Payload container type IE is set to "CIoT user data container":

1) if the timer T3447 is running and the UE supports service gap control;

2) the UE is not configured for high priority access in selected PLMN;

3) the current N1 NAS signalling connection was not triggered by paging; and 4) mobile terminated signalling has not been sent or no user-plane resources have been established for any PDU session after the establishment of the current NAS signalling connection, then the AMF can or shall send back to the UE the CIoT user data container which was not forwarded, e.g., as specified in 3GPP TS 24.501 or 3GPP TS 29.502.

The purpose of the network-initiated NAS transport procedure is to provide a transport of:

a) a single 5GSM message;
b) SMS;
c) an LPP message;
d) an SOR transparent container;
e) a single uplink 5GSM message which was not forwarded due to routing failure;
f) a single uplink 5GSM message which was not forwarded due to congestion control;
g) a UE policy container;
h) a single uplink 5GSM message which was not forwarded, because the PLMN's maximum number of PDU sessions has been reached;
i) a single uplink 5GSM message which was not forwarded due to service area restrictions;
ia) a single uplink 5GSM message which was not forwarded due to CAG;
j) a UE parameters update transparent container;
k) a location services message;
l) a CIoT user data container;
l1) a single uplink CIoT user data container which was not forwarded due to routing failure;
l2) a single uplink CIoT user data container which was not forwarded due to congestion control; or
m) multiple of the above types from the AMF to the UE in a 5GMM message.

In some embodiments, when the UE is in 5GMM-CONNECTED mode, the AMF initiates the NAS transport procedure by sending the DL NAS TRANSPORT message.

In case a), e.g., upon reception from an SMF of a 5GSM message without an N1 SM delivery skip allowed indication for a UE or a 5GSM message with an N1 SM delivery skip allowed indication for a UE in the 5GMM-CONNECTED mode, the AMF can or shall:

a) include the PDU session information (PDU session ID) in the PDU session ID IE;
b) set the Payload container type IE to "N1 SM information"; and
c) set the Payload container IE to the 5GSM message.

In case b), e.g., upon reception from an SMSF of an SMS payload, the AMF can or shall:

a) set the Payload container type IE to "SMS";
b) set the Payload container IE to the SMS payload; and
c) select the access type to deliver the DL NAS TRANSPORT message as follows in case the access type selection is required:

1) if the UE to receive the DL NAS TRANSPORT message is registered to the network via both 3GPP access and non-3GPP access, the 5GMM context of the UE indicates that SMS over NAS is allowed, the UE is in MICO mode, and the UE is in 5GMM-IDLE mode for 3GPP access and in 5GMM-CONNECTED mode for non-3GPP access, then the AMF selects non-3GPP access. Otherwise, the AMF selects either 3GPP access or non-3GPP access.

In some embodiments, if the delivery of the DL NAS TRANSPORT message over 3GPP access has failed, the AMF may re-send the DL NAS TRANSPORT message over the non-3GPP access.

In some embodiments, if the delivery of the DL NAS TRANSPORT message over non-3GPP access has failed, the AMF may re-send the DL NAS TRANSPORT message over the 3GPP access; and 2) otherwise, the AMF selects 3GPP access.

In some embodiments, the AMF may select an access type between 3GPP access and non-3GPP access based on operator policy.

In case c), e.g., upon reception from an LMF of an LPP message payload, the AMF can or shall:

a) set the Payload container type IE to "LTE Positioning Protocol (LPP) message container";
b) set the Payload container IE to the LPP message payload received from the LMF;
c) set the Additional information IE to an LCS correlation identifier received from the LMF from which the LPP message was received.

In some embodiments, the LCS Correlation Identifier is assigned originally by the AMF except for LPP message transfer associated with event reporting for periodic or triggered location, e.g., as described in 3GPP TS 23.273, where the LMF assigns the correlation identifier. AMF and LMF assigned correlation identifiers can be distinguished by an implementation specific convention (e.g. use of a different number of octets) to enable an AMF to distinguish one from the other when received in the Additional Information IE in an UL NAS Transport message.

In case d), e.g., upon reception of a steering of roaming information (see, e.g., 3GPP TS 23.122) from the UDM to be forwarded to the UE, the AMF can or shall:

a) set the Payload container type IE to "SOR transparent container"; and
b) set the Payload container IE to the steering of roaming information (see, e.g., 3GPP TS 23.122) received from the UDM.

In case e), e.g., upon sending a single uplink 5GSM message which was not forwarded due to routing failure, the AMF can or shall:

a) include the PDU session ID in the PDU session ID IE;
b) set the Payload container type IE to "N1 SM information";
c) set the Payload container IE to the 5GSM message which was not forwarded; and
d) set the 5GMM cause IE to the 5GMM cause #90 "payload was not forwarded" or 5GMM cause #91 "DNN not supported or not subscribed in the slice". The AMF sets the 5GMM cause IE to the 5GMM cause #91 "DNN not supported or not subscribed in the slice", if the 5GSM message could not be forwarded since SMF selection fails due to:

1) the DNN is not supported in the slice identified by the S-NSSAI used by the AMF; or
2) neither the DNN provided by the UE nor the wildcard DNN are in the subscribed DNN list of the UE for the S-NSSAI used by the AMF.

Otherwise, the AMF sets the 5GMM cause IE to the 5GMM cause #90 "payload was not forwarded".

In case f), e.g., upon sending a single uplink 5GSM message which was not forwarded due to congestion control, the AMF can or shall:

a) include the PDU session ID in the PDU session ID IE;
b) set the Payload container type IE to "N1 SM information";

c) set the Payload container IE to the 5GSM message which was not forwarded;

d) set the 5GMM cause IE to the 5GMM cause #22 "Congestion", the 5GMM cause #67 "insufficient resources for specific slice and DNN" or the 5GMM cause #69 "insufficient resources for specific slice"; and e) include the Back-off timer value IE.

In case g), e.g., upon reception of a UE policy container from the PCF to be forwarded to the UE, the AMF can or shall:

a) set the Payload container type IE to "UE policy container"; and b) set the Payload container IE to the UE policy container received from the PCF.

In case h), e.g., upon sending a single uplink 5GSM message which was not forwarded, because the PLMN's maximum number of PDU sessions has been reached, the AMF can or shall:

a) include the PDU session ID in the PDU session ID IE;

b) set the Payload container type IE to "N1 SM information";

c) set the Payload container IE to the 5GSM message which was not forwarded; and d) set the 5GMM cause IE to the 5GMM cause #65 "maximum number of PDU sessions reached".

In case i), e.g., upon sending a single uplink 5GSM message which was not forwarded due to service area restrictions, the AMF can or shall:

a) include the PDU session ID in the PDU session ID IE;

b) set the Payload container type IE to "N1 SM information";

c) set the Payload container IE to the 5GSM message which was not forwarded; and d) set the 5GMM cause IE to the 5GMM cause #28 "Restricted service area".

In case ia), e.g., upon sending a single uplink 5GSM message which was not forwarded due to CAG, the AMF can or shall:

a) include the PDU session ID in the PDU session ID IE;

b) set the Payload container type IE to "N1 SM information";

c) set the Payload container IE to the 5GSM message which was not forwarded; and d) set the 5GMM cause IE to the 5GMM cause #76 "Not authorized for this CAG or authorized for CAG cells only".

In case j), e.g., upon reception of UE parameters update data (see, e.g., 3GPP TS 23.502) from the UDM to be forwarded to the UE, the AMF can or shall:

a) set the Payload container type IE to "UE parameters update transparent container"; and b) set the contents of the Payload container IE to the UE parameters update data (see, e.g., 3GPP TS 23.502) received from the UDM.

For case k), e.g., upon reception from a location services application of a Location services message payload, the AMF can or shall:

a) set the Payload container type IE to "Location services message container"; and b) set the Payload container IE to the Location services message payload.

For case k), e.g., upon reception from an LMF of a Location services message payload, the AMF can or shall:

a) set the Payload container type IE to "Location services message container";

b) set the Payload container IE to the Location services message payload; and c) set the Additional information IE to routing information associated with the LMF from which the Location services message payload was received.

NOTE 3: Case k) may support transport of a Location services message container between a UE and an AMF and between a UE and an LMF. For transport between a UE and an LMF, the Additional information IE is included and provides routing information for the LMF. For transport between a UE and an AMF, the Additional information IE is not included.

In case l), e.g., upon reception from an SMF of a user data container payload, the AMF can or shall:

a) include the PDU session ID in the PDU session ID IE;

b) set the Payload container type IE to "CIoT user data container"; and c) set the Payload container IE to the user data container.

For case ll), e.g., upon sending a single uplink CIoT user data container which was not forwarded due to service gap control, the AMF can or shall:

a) include the PDU session ID in the PDU session ID IE;

b) set the Payload container type IE to "CIoT user data container";

c) set the Payload container IE to the CIoT user data container which was not forwarded; and d) set the 5GMM cause IE to the 5GMM cause #90 "payload was not forwarded".

In case m), the AMF can or shall:

a) set the Payload container type IE to "Multiple payloads";

b) set each payload container entry of the Payload container IE, e.g., as follows:

i) set the payload container type field of the payload container entry to a payload container type value set in the Payload container type IE as specified for cases a) to k) above;

ii) set the payload container contents field of the payload container entry to the payload contents set in the Payload container type IE as specified for cases a) to k) above;

iii) set the optional IE fields, if any, to the optional associated information as specified for cases a) to k) above.

Network-initiated NAS transport of messages

Upon reception of a DL NAS TRANSPORT message, the UE can or shall stop the timer T3346 if running.

Upon reception of a DL NAS TRANSPORT message, if the Payload container type IE is set to:

a) "N1 SM information" and the 5GMM cause IE is not included in the DL NAS TRANSPORT message, the 5GSM message in the Payload container IE and the PDU session ID are handled in the 5GSM procedures specified in clause 6;

b) "SMS", the UE can or shall forward the content of the Payload container IE to the SMS stack entity;

c) "LTE Positioning Protocol (LPP) message container", the UE can or shall forward the payload container type, the content of the Payload container IE and the routing information included in the Additional information IE to the upper layer location services application;

d) "SOR transparent container" and if the Payload container IE:

1) successfully passes the integrity check (see, e.g., 3GPP TS 33.501), indicates a list of preferred PLMN/access technology combinations is provided and the list type indicates:

i) "PLMN ID and access technology list", then the ME can or shall replace the highest priority entries in the "Operator Controlled PLMN Selector with Access Technology" list stored in the ME and can or shall proceed with the behavior as specified in, e.g., 3GPP TS 23.122; or ii) "secured packet", then the ME can or shall behave as if a SMS is received with protocol identifier set to SIM data download, data coding scheme set to class 2 message and SMS payload as secured packet contents of SOR transparent container IE. The SMS payload is forwarded to UICC as specified in, e.g., 3GPP TS 23.040 and the ME can or shall proceed with the behavior as specified in, e.g., 3GPP TS 23.122; or 2) does not successfully pass the integrity check (see, e.g., 3GPP TS 33.501) then the UE can or shall proceed with the behavior as specified in, e.g., 3GPP TS 23.122.

e) Void;

f) Void;

g) "N1 SM information" and:

1) the 5GMM cause IE is set to the 5GMM cause #22 "Congestion", the UE passes to the 5GSM sublayer an indication that the 5GSM message was not forwarded due to DNN based congestion control along with the 5GSM message from the Payload container IE of the DL NAS TRANSPORT message, and the time value from the Back-off timer value IE;

2) the 5GMM cause IE is set to the 5GMM cause #28 "Restricted service area", the UE passes to the 5GSM sublayer an indication that the 5GSM message was not forwarded due to service area restrictions along with the 5GSM message from the Payload container IE of the DL NAS TRANSPORT message, enters the state 5GMM-REGISTERED.NON-ALLOWED-SERVICE and, if the DL NAS TRANSPORT message is received over 3GPP access, performs the registration procedure for mobility and periodic registration update;

3) the 5GMM cause IE is set to the 5GMM cause #65 "maximum number of PDU sessions reached", the UE passes to the 5GSM sublayer an indication that the 5GSM message was not forwarded because the PLMN's maximum number of PDU sessions has been reached, along with the 5GSM message from the Payload container IE of the DL NAS TRANSPORT message;

4) the 5GMM cause IE is set to the 5GMM cause #67 "insufficient resources for specific slice and DNN", the UE passes to the 5GSM sublayer an indication that the 5GSM message was not forwarded due to S-NSSAI and DNN based congestion control along with the 5GSM message from the Payload container IE of the DL NAS TRANSPORT message, and the time value from the Back-off timer value IE;

5) the 5GMM cause IE is set to the 5GMM cause #69 "insufficient resources for specific slice", the UE passes to the 5GSM sublayer an indication that the 5GSM message was not forwarded due to S-NSSAI only based congestion control along with the 5GSM message from the Payload container IE of the DL NAS TRANSPORT message, and the time value from the Back-off timer value IE;

5a) the 5GMM cause IE is set to the 5GMM cause #76 "Not authorized for this CAG or authorized for CAG cells only", the UE passes to the 5GSM sublayer an indication that the 5GSM message was not forwarded due to CAG along with the 5GSM message from the Payload container IE of the DL NAS TRANSPORT message;

6) the 5GMM cause IE is set to the 5GMM cause #90 "payload was not forwarded", the UE passes to the 5GSM sublayer an indication that the 5GSM message was not forwarded due to routing failure along with the 5GSM message from the Payload container IE of the DL NAS TRANSPORT message; or 7) the 5GMM cause IE is set to the 5GMM cause #91 "DNN not supported or not subscribed in the slice", the UE passes to the 5GSM sublayer an indication that the 5GSM message was not forwarded due to the DNN is not supported or not subscribed in a slice along with the 5GSM message from the Payload container IE of the DL NAS TRANSPORT message;

h) "UE policy container", the UE policy container in the Payload container IE is handled in the UE policy delivery procedures;

i) "UE parameters update transparent container" and if the Payload container IE 1) successfully passes the integrity check (see, e.g., 3GPP TS 33.501):

i) if the UE parameters update list includes a UE parameters update data set with UE parameters update data set type indicating "Routing indicator update data", A) the ME can or shall behave as if an SMS is received with protocol identifier set to SIM data download, data coding scheme set to class 2 message and SMS payload as secured packet contents of UE parameters update transparent container IE. The SMS payload is forwarded to UICC as specified in, e.g., 3GPP TS 23.040; and B) if the ACK bit of the UE parameters update header in the UE parameters update transparent container is set to "acknowledgment requested" and if the ME receives status bytes from the UICC indicating that the UICC has received the secured packet successfully, the ME can or shall send an acknowledgement in the Payload container IE of an UL NAS TRANSPORT message with Payload type IE set to "UE parameters update transparent container"; and C) if the ME receives a REFRESH command from the UICC as specified in, e.g., 3GPP TS 31.111 and if the REG bit of the UE parameters update header in the UE parameters update transparent container IE is set to "re-registration requested", and:

C1) the UE is registered over 3GPP access, then the UE can or shall wait until it enters 5GMM-IDLE mode over 3GPP access or 5GMM-CONNECTED mode with RRC inactive indication, and then perform a de-registration procedure, delete its 5G-GUTI and initiate a registration procedure for initial registration, e.g., as specified in 3GPP TS 24.501 or 3GPP TS 29.502;

C2) the UE is registered over non-3GPP access and does not have emergency services ongoing over non-3GPP access, then the UE can or shall locally release the N1 NAS signalling connection and enter 5GMM-IDLE mode over non-3GPP access, perform a de-registration procedure, delete its 5G-GUTI if the UE is registered to different PLMN on 3GPP access or the UE is not registered over 3GPP access, and then initiate a registration procedure for initial registration, e.g., as specified in 3GPP TS 24.501 or 3GPP TS 29.502; and C3) the UE is registered over non-3GPP access and has an emergency services ongoing over non-3GPP access, then the UE can or shall wait until the emergency services are completed before locally releasing the N1 NAS signalling connection and enter 5GMM-IDLE mode over non-3GPP access, perform a de-registration procedure, delete its 5G-GUTI if the UE is registered to different PLMN on 3GPP access or if the UE is not registered over 3GPP access, and then initiate a registration procedure for initial registration, e.g., as specified in 3GPP TS 24.501 or 3GPP TS 29.502.

ii) if the UE parameters update list includes a UE parameters update data set with UE parameters update data set type indicating "Default configured NSSAI update data", A) if the ACK bit of the UE parameters update header in the UE parameters update transparent container is set to "acknowledgment requested" and if the UE parameters update list does not include a UE parameters update data set with UE parameters update data set type indicating "Routing indicator update data", the ME can or shall send an acknowledgement in the Payload container IE of an UL NAS TRANSPORT message with Payload type IE set to "UE parameters update transparent container," e.g., as specified in 3GPP TS 24.501 or 3GPP TS 29.502;

B) the ME can or shall replace the stored default configured NSSAI with the default configured NSSAI included in the default configured NSSAI update data; and C) if the UE parameters update list does not include a UE parameters update data set with UE parameters update data set type indicating "Routing indicator update data", the UE used the old default configured NSSAI to create the requested NSSAI in a REGISTRATION REQUEST message, the UE does not have a configured NSSAI for the current PLMN and the UE has an allowed NSSAI for the current PLMN which contains one or more S-NSSAIs that are not included in the new default configured NSSAI, the UE can or shall wait until it enters 5GMM-IDLE mode and then the UE can or shall initiate a registration procedure for mobility and periodic registration update, e.g., as specified in 3GPP TS 24.501 or 3GPP TS 29.502; and 2) does not successfully pass the integrity check (see, e.g., 3GPP TS 33.501) then the UE can or shall discard the content of the payload container IE;

j) "Location services message container" and the 5GMM cause IE is not included in the DL NAS TRANSPORT message, the UE can or shall forward the payload container type, the content of the Payload container IE and the routing information in the Additional information IE if included to the upper layer location services application;

k) "CIoT user data container", the UE can or shall forward the content of the Payload container IE and the PDU session ID to the 5GSM sublayer; and l) "CIoT user data container" and:

1) the 5GMM cause IE is set to the 5GMM cause #22 "Congestion", the UE passes to the 5GSM sublayer an indication that the CIoT user data was not forwarded due to DNN based congestion control along with the CIoT user data from the Payload container IE of the DL NAS TRANSPORT message, and the time value from the Back-off timer value IE.

2) the 5GMM cause IE is set to the 5GMM cause #90 "payload was not forwarded", the UE passes to the 5GSM sublayer an indication that the user data container was not forwarded due to routing failure along with the user data container from the Payload container IE and the PDU session ID from the PDU session ID IE of the DL NAS TRANSPORT message.

m) "Multiple payloads", the UE can or shall first decode the content of the Payload container IE to obtain the number of payload container entries and for each payload container entry, the UE can or shall:

1) decode the payload container type field;

2) decode the optional IE fields and the payload container contents field in the payload container entry; and 3) handle the content of each payload container entry the same as the content of the Payload container IE and the associated optional IEs as specified in bullets a) to 1) above according to the payload container type field.

According to some embodiments, the following abnormal cases can be identified:

a) Expiry of timer T3580

The UE can or shall, on the first expiry of the timer T3580:

if the PDU SESSION ESTABLISHMENT REQUEST message was sent with request type set to "initial emergency request" or "existing emergency PDU session", then the UE may:

a) inform the upper layers of the failure of the procedure; or b) de-register locally, if not de-registered already, attempt initial registration for emergency services.

otherwise, retransmit the PDU SESSION ESTABLISHMENT REQUEST message and the PDU session information which was transported together with the initial transmission of the PDU SESSION ESTABLISHMENT REQUEST message and can or shall reset and start timer T3580, if still needed. This retransmission can be repeated up to four times, i.e. on the fifth expiry of timer T3580, the UE can or shall abort the procedure, release the allocated PTI and enter the state PROCEDURE TRANSACTION INACTIVE.

b) Upon receiving an indication that the 5GSM message was not forwarded due to routing failure along with a PDU SESSION ESTABLISHMENT REQUEST message with the PDU session ID IE set to the same value as the PDU session ID that was sent by the UE, the UE can or shall stop timer T3580 and can or shall abort the procedure. If the UE sent the PDU SESSION ESTABLISHMENT REQUEST message in order for the handover of an existing non-emergency PDU session between 3GPP access and non-3GPP access, the UE can or shall consider that the PDU session is associated with the source access type.

b1) Upon receiving an indication that the 5GSM message was not forwarded due to service area restrictions along with a PDU SESSION ESTABLISHMENT REQUEST message with the PDU session ID IE set to the same value as the PDU session ID that was sent by the UE, the UE can or shall abort the procedure.

b2) Upon receiving an indication that the 5GSM message was not forwarded due to CAG with a PDU SESSION ESTABLISHMENT REQUEST message with the PDU session ID IE set to the same value as the PDU session ID that was sent by the UE, the UE can or shall stop timer T3580 and can or shall abort the procedure.

c) Collision of UE-requested PDU session establishment procedure and network-requested PDU session release procedure.

If the UE receives a PDU SESSION RELEASE COMMAND message after sending a PDU SESSION ESTABLISHMENT REQUEST message to the network, and the PDU session ID in the PDU SESSION RELEASE COMMAND message is the same as the PDU session ID in the PDU SESSION ESTABLISHMENT REQUEST message, the UE can or shall ignore the PDU SESSION RELEASE COMMAND message and proceed with the UE-requested PDU session establishment procedure.

In some embodiments, the CNA 200 and/or the apparatus 300 can be configured to carry out some or all portions of any of the methods described herein. For instance, referring again to FIGS. 1-3, the operations can be performed or partially performed by means such as the CNA 200 of FIG. 4 and/or the apparatus 300 of FIG. 5 to handle emergency services in private networks according to any of the methods described herein. In some embodiments, the CNA 200 and/or the apparatus 300 can include means, such as the processor 202, 304, the memory 204, 306, 308, the communication interface 206, the user interface 312, and/or the like for sending or receiving UL NAS TRANSPORT messages comprising a message requesting to establish a non-emergency PDU session. In some embodiments, the CNA 200 and/or the apparatus 300 can include means, such as the processor 202, 304, the memory 204, 306, 308, the communication interface 206, the user interface 312, and/or the like for accepting the UL NAS TRANSPORT message or rejecting the UL NAS TRANSPORT message by, e.g., sending a DL NAS TRANSPORT message comprising the PDU session ID, the request message, and a reject cause number, e.g., 5GMM cause #76 "Not authorized for this CAG or authorized for CAG cells only." In some embodiments, the CNA 200 and/or the apparatus 300 can include means, such as the processor 202, 304, the memory 204, 306, 308, the communication interface 206, the user interface 312, and/or the like for starting and/or stopping a timer, e.g., timer T3580, and/or aborting the PDU session establishment procedure. In some embodiments, the CNA 200 and/or the apparatus 300 can include means, such as the processor 202, 304, the memory 204, 306, 308, the communication interface 206, the user interface 312, and/or the like for updating CAG information. In some embodiments, the CNA 200 and/or the apparatus 300 can include means, such as the processor 202, 304, the memory 204, 306, 308, the communication interface 206, the user interface 312, and/or the like for, in an instance in which the CAG information has been updated, determining whether a user equipment has requested an emergency PDU session and whether the UE does not pass CAG access control with the updated CAG information. In some embodiments, the CNA 200 and/or the apparatus 300 can include means, such as the processor 202, 304, the memory 204, 306, 308, the communication interface 206, the user interface 312, and/or the like for performing a local release of all PDU sessions, e.g., in an instance in which the CAG information has been updated, except for emergency PDU sessions. In some embodiments, the CNA 200 and/or the apparatus 300 can include means, such as the processor 202, 304, the memory 204, 306, 308, the communication interface 206, the user interface 312, and/or the like for deregistering the UE from the network upon receiving CAG information or updated CAG information. In some embodiments, the CNA 200 and/or the apparatus 300 can include means, such as the processor 202, 304, the memory 204, 306, 308, the communication interface 206, the user interface 312, and/or the like for checking to see whether a UE has an emergency PDU session established or requested, and then only deregistering the UE from the network, upon receiving CAG information or updated CAG information and determining the UE does not pass CAG access control based on the CAG information or updated CAG information, if the UE does not have an emergency PDU session established or registered with the network. In some embodiments, a CAG access control process can comprise a process for checking, by an AMF in the selected PLMN for which an entry in a "CAG information list" exists, upon receipt of a REGISTRATION REQUEST message or the like, a DEREGISTRATION REQUEST message or the like, or a SERVICE REQUEST message or the like, from a UE or another network entity with the "CAG information list", whether the message, e.g., 5GMM message, was sent via a CAG cell and subsequently whether, if the message was sent via a CAG cell, whether the selected CAG-ID is included in the UE's "allowed CAG list" for the current PLMN, or, if the message was sent via a non-CAG cell, whether the entry for the UE's "CAG information list" for the current PLMN includes an "indication that the UE is only allowed to access 5GS via CAG cells." In some embodiments, the CNA 200 and/or the apparatus 300 can include means, such as the processor 202, 304, the memory 204, 306, 308, the communication interface 206, the user interface 312, and/or the like for, in an instance in which a 5GMM message was sent via a CAG cell, terminating the CAG access control process by passing the UE when the selected CAG-ID is included in the "allowed CAG list" for the current PLMN, or, if a 5GMM message was sent via a non-CAG cell, then the CAG access control process is terminated and the UE passes if the entry of the UE's "CAG information list" for the current PLMN does not include an "indication that the UE is only allowed to access 5GS via CAG cells," and otherwise to terminate the CAG access control process and fail the UE.

Referring now to FIG. 6a, a UL NAS TRANSPORT message is illustrated between the UE 102 and the AMF 108. In some embodiments, the AMF 108 can receive the UL NAS TRANSPORT message directly from the UE 102 and in other embodiments the AMF 108 can receive the UL NAS TRANSPORT message indirectly, e.g., by way of the RAN 104 or the like. In some embodiments, the UL NAS TRANSPORT message can comprise or include a PDU SESSION ESTABLISHMENT REQUEST message requesting to establish a non-emergency PDU session from the UE 102 in a cell restricted by CAG. In such an instance, from the AMF 108 perspective, if the Payload container type IE in the UL NAS TRANSPORT message is set to "N1 SM information" and if the Request type IE is set to neither "initial emergency request" nor to "existing emergency PDU session," and further if the UE 102 sent the UL NAS TRANSPORT message via a CAG cell and the selected CAG-ID is not included in the UE's 102 "allowed CAG list" for the current PLMN, or if the UE 102 sent the UL NAS TRANSPORT message via a non-CAG cell and the entry of the UE's "CAG information list" for the current PLMN includes an "indication that the UE is only allowed to access 5GS via CAG cells," then the AMF 108 can or shall send to the UE the 5GSM message which was not forwarded (the 5GSM message contained in the Payload container IE of the UL NAS TRANSPORT message) using the DL NAS TRANSPORT message as illustrated in FIG. 6b.

As illustrated in FIG. 6b, the AMF 108, once the above conditions are determined to not have been met, e.g., the UE 102 fails the CAG access control process or test, the AMF 108 can send the UE 102, directly or by way of, e.g., the RAN 104, the DL NAS TRANSPORT message indicating that the request is rejected due to CAG requirements. To do so, the AMF 108 can or shall include the PDU session ID in the PDU session ID IE of the DL NAS TRANSPORT message, set the Payload container type IE of the DL NAS TRANSPORT message to "N1 SM information," set the Payload container IE of the DL NAS TRANSPORT message to the 5GSM message which was not forwarded, and set the 5GMM cause IE of the DL NAS TRANSPORT message to the 5GMM cause #76 "Not authorized for the CAG or authorized for CAG cells only."

Once the UE 102 receives the DL NAS TRANSPORT message from the AMF 108, e.g., by the 5GMM sublayer of the UE 102, the 5GMM sublayer of the UE 102 indicates to the 5GSM sublayer of the UE 102 that something is wrong. As the 5GMM sublayer of the UE 102 receives the DL NAS TRANSPORT message, if the Payload container type IE is set to "N1 SM information" and the 5GMM cause IE is set to the 5GMM cause #76 "Not authorized for this CAG or authorized for CAG cells only," the UE 102, or more precisely the 5GMM sublayer of the UE 102, can pass an indication that the 5GSM message was not forwarded due to CAG requirements, along with the 5GSM message from the Payload container IE of the DL NAS TRANSPORT message, to the 5GSM sublayer of the UE 102.

Referring now to FIG. 7, in an instance in which the 5GSM sublayer of the UE 102 receives an indication from the 5GMM sublayer of the UE 102 that the 5GSM message was not forwarded due to CAG requirements, and upon receiving the 5GSM message from the Payload container IE of the DL NAS TRANSPORT message, the 5GSM sublayer of the UE 102 can take an action. For instance, in some embodiments, upon receiving an indication that the 5GSM message was not forwarded due to CAG requirements, along with a PDU SESSION ESTABLISHMENT REQUEST message with the PDU session ID IE set to the same value as the PDU session ID that was sent by the UE 102, the 5GSM sublayer of the UE 102 can or shall stop a timer T3580 and can or shall abort the procedure.

In an instance in which the AMF 108 needs to update the CAG information, the AMF 108 can or shall include the CAG information list IE in a CONFIGURATION UPDATE COMMAND message transmitted to or towards the UE 102. If the UE 102 has an ongoing emergency PDU session and the UE 102 does not pass the CAG access control process, described above, with regards to the updated CAG information, the AMF 108 can or shall perform a local release of all PDU sessions except for emergency PDU sessions. That way, even though the UE 102 does not pass the CAG access control process or test, since the UE 102 has an established/ongoing emergency PDU session with the CN 101 by way of the AMF 108, the AMF 108 will not release the UE's 102 ongoing emergency PDU session. In some embodiments, if the "CAG information list" received by the UE 102 includes an entry containing the identity of the current PLMN, the UE 102 can or shall operate as follows.

In an instance in which the UE 102 receives the CONFIGURATION UPDATE COMMAND message from the AMF 108 via a CAG cell, the "allowed CAG list" for the current PLMN in the received "CAG information list" does not include the CAG-ID of the current CAG cell (e.g., the one by which the CONFIGURATION UPDATE COMMAND message was received), and the entry for the current PLMN in the received "CAG information list" does not include an "indication that the UE is only allowed to access 5GS via CAG cells," then the UE 102 can or shall enter the state 5GMM-REGISTERED.LIMITED-SERVICE and can or shall search for a suitable cell, e.g., according to 3GPP TS 38.304, with the updated "CAG information list."

In an instance in which the UE 102 receives the CONFIGURATION UPDATE COMMAND message from the AMF 108 via a CAG cell, the "allowed CAG list" for the current PLMN in the received "CAG information list" does not include the CAG-ID of the current CAG cell (e.g., the one by which the CONFIGURATION UPDATE COMMAND message was received), and the entry for the current PLMN in the received "CAG information list" includes an "indication that the UE is only allowed to access 5GS via CAG cells," and if the "allowed CAG list" for the current PLMN in the received "CAG information list" includes one or more CAG-IDs, the UE 102 can or shall enter the state 5GMM-REGISTERED.LIMITED-SERVICE and can or shall search for a suitable cell, e.g., according to 3GPP TS 38.304, with the updated "CAG information list."

In an instance in which the UE 102 receives the CONFIGURATION UPDATE COMMAND message from the AMF 108 via a CAG cell, the "allowed CAG list" for the current PLMN in the received "CAG information list" does not include the CAG-ID of the current CAG cell (e.g., the one by which the CONFIGURATION UPDATE COMMAND message was received), and the entry for the current PLMN in the received "CAG information list" includes an "indication that the UE is only allowed to access 5GS via CAG cells," and if the "allowed CAG list" for the current PLMN in the received "CAG information list" does not include any CAG-ID, and the UE 102 does not have an emergency PDU session, then the UE can or shall enter the state 5GMM-DEREGISTERED.PLMN-SEARCH and can or shall apply the PLMN selection process, e.g., defined in 3GPP TS 23.122, with the updated "CAG information list."

In an instance in which the UE 102 receives the CONFIGURATION UPDATE COMMAND message from the AMF 108 via a CAG cell, the "allowed CAG list" for the current PLMN in the received "CAG information list" does not include the CAG-ID of the current CAG cell (e.g., the one by which the CONFIGURATION UPDATE COMMAND message was received), and the entry for the current PLMN in the received "CAG information list" includes an "indication that the UE is only allowed to access 5GS via CAG cells," and if the "allowed CAG list" for the current PLMN in the received "CAG information list" does not include any CAG-ID, and the UE has an emergency PDU session, then the UE 102 can or shall perform a local release of all PDU sessions except for emergency PDU sessions.

In an instance in which the UE receives the CONFIGURATION UPDATE COMMAND message via a non-CAG cell and the entry for the current PLMN in the received "CAG information list" includes an "indication that the UE is only allowed to access 5GS via CAG cells," and if the "allowed CAG list" for the current PLMN in the received "CAG information list" includes one or more CAG-IDs, the UE 102 can or shall enter the state 5GMM-REGISTERED.LIMITED-SERVICE and can or shall search for a suitable cell, e.g., according to 3GPP TS 38.304, with the updated "CAG information list."

In an instance in which the UE 102 receives the CONFIGURATION UPDATE COMMAND message via a non-CAG cell and the entry for the current PLMN in the received "CAG information list" includes an "indication that the UE is only allowed to access 5GS via CAG cells," if the "allowed CAG list" for the current PLMN in the received "CAG information list" does not include any CAG-ID, and the UE 102 does not have an emergency PDU session, then the UE 102 can or shall enter the state 5GMM-DEREGISTERED.PLMN-SEARCH and can or shall apply the PLMN selection process, e.g., defined in 3GPP TS 23.122, with the updated "CAG information list."

In an instance in which the UE 102 receives the CONFIGURATION UPDATE COMMAND message via a non-CAG cell and the entry for the current PLMN in the received "CAG information list" includes an "indication that the UE is only allowed to access 5GS via CAG cells," if the "allowed CAG list" for the current PLMN in the received "CAG information list" does not include any CAG-ID, and the UE 102 has an emergency PDU session, then the UE 102 can or shall perform a local release of all PDU sessions except for emergency PDU sessions.

Referring now to FIG. 8, a method 10 can be provided for handling emergency services in private networks. In some embodiments, the method can be carried out by an apparatus, e.g., the CAN 200 and/or the apparatus 300, which may comprise means, such as a processor, memory storing computer program code, and/or a communications interface, which can cause at least receiving, at a user equipment (UE), a configuration update command message from a network entity of a current public land mobile network (PLMN), the configuration update command message comprising an updated closed access group (CAG) information list, at 11. In some embodiments, the method 10 can further comprise performing, by the UE, a local release of all protocol data unit (PDU) session(s) except for an emergency PDU session, if the entry for the PLMN in the received CAG information list includes an indication that the UE is only allowed to access the PLMN via CAG cells and the allowed CAG list for the PLMN in the received CAG information list does not include any CAG-ID, at 12.

Referring now to FIG. 9, a method 20 can be provided for handling emergency services in private networks. In some embodiments, the method can be carried out by an apparatus, e.g., the CAN 200 and/or the apparatus 300, which may comprise means, such as a processor, memory storing computer program code, and/or a communications interface, which can cause at least receiving, at a mobility management sublayer of a user equipment, from a network entity of a public land mobile network (PLMN), a downlink non-access stratum (NAS) transport message including a message to request session management and a cause value indicating that the UE is not authorized to make the request due to CAG constraints, at 21. In some embodiments, the method 20 can further comprise sending an indication, from the mobility management sublayer of the user equipment to a session management sublayer of the user equipment, an indication that the message to request session management was not forwarded due to CAG along with the message to request session management, at 22. In some embodiments, the method 20 can further comprise, upon receiving, at the session management sublayer of the user equipment, the indication that the message to request session management was not forwarded due to CAG along with the message to request session management, stopping a timer associated with the session management request and aborting the procedure for the session management, at 23.

Referring now to FIG. 10, a method 30 can be provided for handling emergency services in private networks. In some embodiments, the method 30 can be carried out by an apparatus, e.g., the CNA 200 and/or the apparatus 300, which may comprise means, such as a processor, memory storing computer program code, and/or a communications interface, which can cause at least receiving, at a user equipment, a configuration update command message from a network entity of a current public land mobile network (PLMN), the configuration update command message comprising an updated closed access group (CAG) information list, at 31. In some embodiments, the method 30 can further comprise, in an instance in which the configuration update command message is received via a particular CAG cell, an entry for the current PLMN includes an indication that user equipment are only allowed to access PLMNs via CAG cells, does not include CAG identification information, and the user equipment has not requested or established an emergency protocol data unit (PDU) session with the current PLMN, entering the a deregistered PLMN search state and applying a PLMN selection process based on the updated CAG information list, at 32. In some embodiments, the method 30 can further comprise, in an instance in which the configuration update command message is received via a particular CAG cell, an entry for the current PLMN includes an indication that user equipment are only allowed to access the current PLMN via CAG cells, does not include CAG identification information, and the user equipment has requested or established an emergency PDU session with the current PLMN, performing a local release of all PDU sessions except for the emergency PDU session, at 33. In some embodiments, the method 30 can further comprise, in an instance in which the configuration update command message is received via a non-CAG cell, the entry for the current PLMN in the CAG information list includes an indication that the UE is only allowed to access PLMNs CAG cells, the allowed CAG list for the current PLMN in the received CAG information list does not include CAG identification information, and the user equipment has not requested or established an emergency PDU session with the current PLMN, entering the a deregistered PLMN search state and applying a PLMN selection process based on the updated CAG information list, at 34. In some embodiments, the method 30 can further comprise, in an instance in which the configuration update command message is received via a non-CAG cell, the entry for the current PLMN in the CAG information list includes an indication that the UE is only allowed to access PLMNs CAG cells, the allowed CAG list for the current PLMN in the received CAG information list does not include CAG identification information, and the user equipment has requested or established an emergency PDU session with the current PLMN, performing a local release of all PDU sessions except for the emergency PDU session, at 35.

Referring now to FIG. 11, a method 40 can be provided for handling emergency services in private networks. In some embodiments, the method 40 can be carried out by an apparatus, e.g., the CNA 200 and/or the apparatus 300, which may comprise means, such as a processor, memory storing computer program code, and/or a communications interface, which can cause at least receiving, from a user equipment, a session request message for a public land mobile network, at 41. In some embodiments, the method 40 can further comprise, in an instance in which the session request message comprises an initial emergency session request, sending a session acceptance message to the user equipment, at 42. In some embodiments, the method 40 can further comprise, in an instance in which the session request message does not comprises the initial emergency session request, the session request was made through a closed access group cell, and a selected closed access group cell identification in the session request message is not included in a list of allowed closed access groups for the public land mobile network, sending a session rejection message to the user equipment, at 43. In some embodiments, the method 40 can further comprise, in an instance in which the session request message does not comprises the initial emergency session request, the session request was made through a non-closed access group cell, and an entry of a closed access group information list for the public land mobile network includes an indication that the user equipment is only allowed to access the public land mobile network through closed access group cells, sending the session rejection message to the user equipment, at 44.

Referring now to FIG. 12, a method 50 can be provided for handling emergency services in private networks. In some embodiments, the method 50 can be carried out by an apparatus, e.g., the CNA 200 and/or the apparatus 300, which may comprise means, such as a processor, memory storing computer program code, and/or a communications interface, which can cause at least receiving, at a mobility management sublayer of a user equipment, from a network entity of a public land mobile network (PLMN), a session rejection message comprising an indication that a session request received from the user equipment was not forwarded due to updated closed access group (CAG) requirements, at 51. In some embodiments, the method 50 can further comprise sending an indication, from the mobility management sublayer of the user equipment to a session management sublayer of the user equipment, an indication that the session request was rejected by the PLMN due to updated CAG requirements, at 52. In some embodiments, the method 50 can further comprise, upon receiving, at the session management sublayer of the user equipment, the indication that the session request was rejected by the PLMN due to updated CAG requirements, stopping a timer associated with the session request and discontinuing the session request, at 53.

As described above, FIGS. 8-12 are flowcharts of methods that can be carried out by an apparatus according to related computer program products comprising computer program code. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device, e.g., 204, of an apparatus, e.g., 200, employing an embodiment of the present invention and executed by processing circuitry, e.g., 202, of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of at least FIGS. 8-12. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Described herein are methods, apparatuses, and computer program products provided in accordance with example embodiments to handle emergency services in private networks. In some embodiments, a method can comprise receiving, at a user equipment (UE), a configuration update command message from a network entity of a current public land mobile network (PLMN), the configuration update command message comprising an updated closed access group (CAG) information list; and performing, by the UE, a local release of all protocol data unit (PDU) session(s) except for an emergency PDU session, if the entry for the PLMN in the received CAG information list includes an indication that the UE is only allowed to access the PLMN via CAG cells and the allowed CAG list for the PLMN in the received CAG information list does not include any CAG-ID.

In some embodiments, an apparatus can comprise at least one processor; and at least one memory including computer program code, the at least one memory and the computer program code configured to, with the at least one processor, cause the apparatus at least to perform: receiving, at a user equipment (UE), a configuration update command message from a network entity of a current public land mobile network (PLMN), the configuration update command message comprising an updated closed access group (CAG) information list; and performing, by the UE, a local release of all protocol data unit (PDU) session(s) except for an emergency PDU session, if the entry for the PLMN in the received CAG information list includes an indication that the UE is only allowed to access the PLMN via CAG cells and the allowed CAG list for the PLMN in the received CAG information list does not include any CAG-ID.

In some embodiments, an apparatus can comprise means, such as a processor or processing circuitry and a memory storing computer program code, for receiving a configuration update command message from a network entity of a current public land mobile network (PLMN), the configuration update command message comprising an updated closed access group (CAG) information list; and means for performing a local release of all protocol data unit (PDU) session(s) except for an emergency PDU session, if the entry for the PLMN in the received CAG information list includes an indication that user equipment are only allowed to access the PLMN via CAG cells and the allowed CAG list for the PLMN in the received CAG information list does not include any CAG-ID.

In some embodiments, a computer program product can comprise a non-transitory computer readable medium comprising computer instructions stored thereon for performing at least the following: receiving, at a user equipment (UE), a configuration update command message from a network entity of a current public land mobile network (PLMN), the configuration update command message comprising an updated closed access group (CAG) information list; and performing, by the UE, a local release of all protocol data unit (PDU) session(s) except for an emergency PDU session, if the entry for the PLMN in the received CAG information list includes an indication that the UE is only allowed to access the PLMN via CAG cells and the allowed CAG list for the PLMN in the received CAG information list does not include any CAG-ID.

In some embodiments, a method can comprise receiving, at a mobility management sublayer of a user equipment, from a network entity of a public land mobile network (PLMN), a downlink non-access stratum (NAS) transport message including a message to request session management and a cause value indicating that the UE is not authorized to make the request due to CAG constraints; sending an indication, from the mobility management sublayer of the user equipment to a session management sublayer of the user equipment, an indication that the message to request session management was not forwarded due to CAG along with the message to request session management; and, upon receiving, at the session management sublayer of the user equipment, the indication that the message to request session management was not forwarded due to CAG along with the message to request session management, stopping a timer associated with the session management request and aborting the procedure for the session management.

In some embodiments, an apparatus can comprise at least one processor; and at least one memory including computer program code, the at least one memory and the computer program code configured to, with the at least one processor, cause the apparatus at least to perform: receiving, at a mobility management sublayer of a user equipment, from a network entity of a public land mobile network (PLMN), a downlink non-access stratum (NAS) transport message including a message to request session management and a cause value indicating that the UE is not authorized to make the request due to CAG constraints; sending an indication, from the mobility management sublayer of the user equipment to a session management sublayer of the user equipment, an indication that the message to request session management was not forwarded due to CAG along with the message to request session management; and, upon receiving, at the session management sublayer of the user equipment, the indication that the message to request session management was not forwarded due to CAG along with the message to request session management, stopping a timer associated with the session management request and aborting the procedure for the session management.

In some embodiments, an apparatus can comprise means, such as a processor or processing circuitry and a memory storing computer program code, for receiving, at a mobility management sublayer of a user equipment, from a network entity of a public land mobile network (PLMN), a downlink non-access stratum (NAS) transport message including a message to request session management and a cause value indicating that the UE is not authorized to make the request due to CAG constraints; means for sending an indication, from the mobility management sublayer of the user equipment to a session management sublayer of the user equipment, an indication that the message to request session management was not forwarded due to CAG along with the message to request session management; and means for, upon receiving, at the session management sublayer of the user equipment, the indication that the message to request session management was not forwarded due to CAG along with the message to request session management, stopping a timer associated with the session management request and aborting the procedure for the session management.

In some embodiments, a computer program product can comprise a non-transitory computer readable medium comprising computer instructions stored thereon for performing at least the following: receiving, at a mobility management sublayer of a user equipment, from a network entity of a public land mobile network (PLMN), a downlink non-access stratum (NAS) transport message including a message to request session management and a cause value indicating that the UE is not authorized to make the request due to CAG constraints; sending an indication, from the mobility management sublayer of the user equipment to a session management sublayer of the user equipment, an indication that the message to request session management was not forwarded due to CAG along with the message to request session management; and, upon receiving, at the session management sublayer of the user equipment, the indication that the message to request session management was not forwarded due to CAG along with the message to request session management, stopping a timer associated with the session management request and aborting the procedure for the session management.

In some embodiments, a method can comprise receiving, at a user equipment, a configuration update command message from a network entity of a current public land mobile network (PLMN), the configuration update command message comprising an updated closed access group (CAG) information list; in an instance in which the configuration update command message is received via a particular CAG cell, an entry for the current PLMN in the CAG information list includes an indication that the user equipment is only allowed to access PLMNs via CAG cells, an allowed CAG list for the current PLMN in the received CAG information list does not include CAG identification information, and the user equipment has not requested or established an emergency protocol data unit (PDU) session with the current PLMN, entering a deregistered PLMN search state and applying a PLMN selection process based on the updated CAG information list; in an instance in which the configuration update command message is received via a particular CAG cell, the entry for the current PLMN in the CAG information list includes an indication that the user equipment is only allowed to access the current PLMN via CAG cells, the allowed CAG list for the current PLMN in the received CAG information list does not include CAG identification information, and the user equipment has requested or established an emergency PDU session with the current PLMN, performing a local release of all PDU sessions except for the emergency PDU session; in an instance in which the configuration update command message is received via a non-CAG cell, the entry for the current PLMN in the CAG information list includes an indication that the UE is only allowed to access PLMNs CAG cells, the allowed CAG list for the current PLMN in the received CAG information list does not include CAG identification information, and the user equipment has not requested or established an emergency PDU session with the current PLMN, entering the deregistered PLMN search state and applying the PLMN selection process based on the updated CAG information list; and, in an instance in which the configuration update command message is received via a non-CAG cell, the entry for the current PLMN in the CAG information list includes an indication that the UE is only allowed to access PLMNs CAG cells, the allowed CAG list for the current PLMN in the received CAG information list does not include CAG identification information, and the user equipment has requested or established an emergency PDU session with the current PLMN, performing the local release of all PDU sessions except for the emergency PDU session.

In some embodiments, an apparatus can be provided that comprises at least one processor; and at least one memory including computer program code, the at least one memory and the computer program code configured to, with the at least one processor, cause the apparatus at least to perform: receiving, at a user equipment, a configuration update command message from a network entity of a current public land mobile network (PLMN), the configuration update command message comprising an updated closed access group (CAG) information list; in an instance in which the configuration update command message is received via a particular CAG cell, an entry for the current PLMN in the CAG information list includes an indication that the user equipment is only allowed to access PLMNs via CAG cells, an allowed CAG list for the current PLMN in the received CAG information list does not include CAG identification information, and the user equipment has not requested or established an emergency protocol data unit (PDU) session with the current PLMN, entering a deregistered PLMN search state and applying a PLMN selection process based on the updated CAG information list; in an instance in which the configuration update command message is received via a particular CAG cell, the entry for the current PLMN in the CAG information list includes an indication that the user equipment is only allowed to access the current PLMN via CAG cells, the allowed CAG list for the current PLMN in the received CAG information list does not include CAG identification information, and the user equipment has requested or established an emergency PDU session with the current PLMN, performing a local release of all PDU sessions except for the emergency PDU session; in an instance in which the configuration update command message is received via a non-CAG cell, the entry for the current PLMN in the CAG information list includes an indication that the UE is only allowed to access PLMNs CAG cells, the allowed CAG list for the current PLMN in the received CAG information list does not include CAG identification information, and the user equipment has not requested or established an emergency PDU session with the current PLMN, entering the deregistered PLMN search state and applying the PLMN selection process based on the updated CAG information list; and, in an instance in which the configuration update command message is received via a non-CAG cell, the entry for the current PLMN in the CAG information list includes an indication that the UE is only allowed to access PLMNs CAG cells, the allowed CAG list for the current PLMN in the received CAG information list does not include CAG identification information, and the user equipment has requested or established an emergency PDU session with the current PLMN, performing the local release of all PDU sessions except for the emergency PDU session.

In some embodiments, an apparatus can be provided that comprises means, such as a processor or processing circuitry and a memory storing computer program code, for receiving, at a user equipment, a configuration update command message from a network entity of a current public land mobile network (PLMN), the configuration update command message comprising an updated closed access group (CAG) information list; means for, in an instance in which the configuration update command message is received via a particular CAG cell, an entry for the current PLMN in the CAG information list includes an indication that the user equipment is only allowed to access PLMNs via CAG cells, an allowed CAG list for the current PLMN in the received CAG information list does not include CAG identification information, and the user equipment has not requested or established an emergency protocol data unit (PDU) session with the current PLMN, entering a deregistered PLMN search state and applying a PLMN selection process based on the updated CAG information list; means for, in an instance in which the configuration update command message is received via a particular CAG cell, the entry for the current PLMN in the CAG information list includes an indication that the user equipment is only allowed to access the current PLMN via CAG cells, the allowed CAG list for the current PLMN in the received CAG information list does not include CAG identification information, and the user equipment has requested or established an emergency PDU session with the current PLMN, performing a local release of all PDU sessions except for the emergency PDU session; means for, in an instance in which the configuration update command message is received via a non-CAG cell, the entry for the current PLMN in the CAG information list includes an indication that the UE is only allowed to access PLMNs CAG cells, the allowed CAG list for the current PLMN in the received CAG information list does not include CAG identification information, and the user equipment has not requested or established an emergency PDU session with the current PLMN, entering the deregistered PLMN search state and applying the PLMN selection process based on the updated CAG information list; and means for, in an instance in which the configuration update command message is received via a non-CAG cell, the entry for the current PLMN in the CAG information list includes an indication that the UE is only allowed to access PLMNs CAG cells, the allowed CAG list for the current PLMN in the received CAG information list does not include CAG identification information, and the user equipment has requested or established an emergency PDU session with the current PLMN, performing the local release of all PDU sessions except for the emergency PDU session.

In some embodiments, a computer program product can be provided that comprises a non-transitory computer readable medium comprising computer instructions stored thereon for performing at least the following: receiving, at a user equipment, a configuration update command message from a network entity of a current public land mobile network (PLMN), the configuration update command message comprising an updated closed access group (CAG) information list; in an instance in which the configuration update command message is received via a particular CAG cell, an entry for the current PLMN in the CAG information list includes an indication that the user equipment is only allowed to access PLMNs via CAG cells, an allowed CAG list for the current PLMN in the received CAG information list does not include CAG identification information, and the user equipment has not requested or established an emergency protocol data unit (PDU) session with the current PLMN, entering a deregistered PLMN search state and applying a PLMN selection process based on the updated CAG information list; in an instance in which the configuration update command message is received via a particular CAG cell, the entry for the current PLMN in the CAG information list includes an indication that the user equipment is only allowed to access the current PLMN via CAG cells, the allowed CAG list for the current PLMN in the received CAG information list does not include CAG identification information, and the user equipment has requested or established an emergency PDU session with the current PLMN, performing a local release of all PDU sessions except for the emergency PDU session; in an instance in received via a non-CAG cell, the entry for the current PLMN in the CAG information list includes an indication that the UE is only allowed to access PLMNs CAG cells, the allowed CAG list for the current PLMN in the received CAG information list does not include CAG identification information, and the user equipment has not requested or established an emergency PDU session with the current PLMN, entering the deregistered PLMN search state and applying the PLMN selection process based on the updated CAG information list; and, in an instance in which the configuration update command message is received via a non-CAG cell, the entry for the current PLMN in the CAG information list includes an indication that the UE is only allowed to access PLMNs CAG cells, the allowed CAG list for the current PLMN in the received CAG information list does not include CAG identification information, and the user equipment has requested or established an emergency PDU session with the current PLMN, performing the local release of all PDU sessions except for the emergency PDU session.

In some embodiments, a method can be provided that comprises receiving, from a user equipment, a session request message for a public land mobile network; in an instance in which the session request message comprises an initial emergency session request, sending a session acceptance message to the user equipment; in an instance in which the session request message does not comprises the initial emergency session request, the session request was made through a closed access group cell, and a selected closed access group cell identification in the session request message is not included in a list of allowed closed access groups for the public land mobile network, sending a session rejection message to the user equipment; and, in an instance in which the session request message does not comprises the initial emergency session request, the session request was made through a non-closed access group cell, and an entry of a closed access group information list for the public land mobile network includes an indication that the user equipment is only allowed to access the public land mobile network through closed access group cells, sending the session rejection message to the user equipment.

In some embodiments, an apparatus can be provided that comprises at least one processor; and at least one memory including computer program code, the at least one memory and the computer program code configured to, with the at least one processor, cause the apparatus at least to perform: receiving, from a user equipment, a session request message for a public land mobile network; in an instance in which the session request message comprises an initial emergency session request, sending a session acceptance message to the user equipment; in an instance in which the session request message does not comprises the initial emergency session request, the session request was made through a closed access group cell, and a selected closed access group cell identification in the session request message is not included in a list of allowed closed access groups for the public land mobile network, sending a session rejection message to the user equipment; and, in an instance in which the session request message does not comprises the initial emergency session request, the session request was made through a non-closed access group cell, and an entry of a closed access group information list for the public land mobile network includes an indication that the user equipment is only allowed to access the public land mobile network through closed access group cells, sending the session rejection message to the user equipment.

In some embodiments, an apparatus can be provided that comprises means, such as a processor or processing circuitry and a memory storing computer program code, for receiving, from a user equipment, a session request message for a public land mobile network; means for, in an instance in which the session request message comprises an initial emergency session request, sending a session acceptance message to the user equipment; means for, in an instance in which the session request message does not comprises the initial emergency session request, the session request was made through a closed access group cell, and a selected closed access group cell identification in the session request message is not included in a list of allowed closed access groups for the public land mobile network, sending a session rejection message to the user equipment; and means for, in an instance in which the session request message does not comprises the initial emergency session request, the session request was made through a non-closed access group cell, and an entry of a closed access group information list for the public land mobile network includes an indication that the user equipment is only allowed to access the public land mobile network through closed access group cells, sending the session rejection message to the user equipment.

In some embodiments, a computer program product can be provided that comprises a non-transitory computer readable medium comprising computer instructions stored thereon for performing at least the following: receiving, from a user equipment, a session request message for a public land mobile network; in an instance in which the session request message comprises an initial emergency session request, sending a session acceptance message to the user equipment; in an instance in which the session request message does not comprises the initial emergency session request, the session request was made through a closed access group cell, and a selected closed access group cell identification in the session request message is not included in a list of allowed closed access groups for the public land mobile network, sending a session rejection message to the user equipment; and, in an instance in which the session request message does not comprises the initial emergency session request, the session request was made through a non-closed access group cell, and an entry of a closed access group information list for the public land mobile network includes an indication that the user equipment is only allowed to access the public land mobile network through closed access group cells, sending the session rejection message to the user equipment.

In some embodiments, a method can be provided that comprises receiving, at a mobility management sublayer of a user equipment, from a network entity of a public land mobile network (PLMN), a session rejection message comprising an indication that a session request received from the user equipment was not forwarded due to updated closed access group (CAG) requirements; sending an indication, from the mobility management sublayer of the user equipment to a session management sublayer of the user equipment, an indication that the session request was rejected by the PLMN due to updated CAG requirements; and upon receiving, at the session management sublayer of the user equipment, the indication that the session request was rejected by the PLMN due to updated CAG requirements, stopping a timer associated with the session request and discontinuing the session request.

In some embodiments, an apparatus can be provided that comprises at least one processor; and at least one memory including computer program code, the at least one memory and the computer program code configured to, with the at least one processor, cause the apparatus at least to perform: receiving, at a mobility management sublayer of a user equipment, from a network entity of a public land mobile network (PLMN), a session rejection message comprising an indication that a session request received from the user equipment was not forwarded due to updated closed access group (CAG) requirements; sending an indication, from the mobility management sublayer of the user equipment to a session management sublayer of the user equipment, an indication that the session request was rejected by the PLMN due to updated CAG requirements; and upon receiving, at the session management sublayer of the user equipment, the indication that the session request was rejected by the PLMN due to updated CAG requirements, stopping a timer associated with the session request and discontinuing the session request.

In some embodiments, an apparatus can be provided that comprises means, such as a processor or processing circuitry and a memory storing computer program code, for receiving, at a mobility management sublayer of a user equipment, from a network entity of a public land mobile network (PLMN), a session rejection message comprising an indication that a session request received from the user equipment was not forwarded due to updated closed access group (CAG) requirements; means for sending an indication, from the mobility management sublayer of the user equipment to a session management sublayer of the user equipment, an indication that the session request was rejected by the PLMN due to updated CAG requirements; and means for upon receiving, at the session management sublayer of the user equipment, the indication that the session request was rejected by the PLMN due to updated CAG requirements, stopping a timer associated with the session request and discontinuing the session request.

In some embodiments, a computer program product can be provided that comprises a non-transitory computer readable medium comprising computer instructions stored thereon for performing at least the following: receiving, at a mobility management sublayer of a user equipment, from a network entity of a public land mobile network (PLMN), a session rejection message comprising an indication that a session request received from the user equipment was not forwarded due to updated closed access group (CAG) requirements; sending an indication, from the mobility management sublayer of the user equipment to a session management sublayer of the user equipment, an indication that the session request was rejected by the PLMN due to updated CAG requirements; and upon receiving, at the session management sublayer of the user equipment, the indication that the session request was rejected by the PLMN due to updated CAG requirements, stopping a timer associated with the session request and discontinuing the session request.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation. Any application, publication, technical document, or the like that is cited in this disclosure is hereby incorporated herein by reference in its entirety for all purposes.

What is claimed is:

1. A method comprising:
   receiving, at a user equipment (UE), a configuration update command message from a network entity of a current public land mobile network (PLMN), the configuration update command message comprising an updated closed access group (CAG) information list;
   determining whether one or more protocol data unit (PDU) sessions are emergency PDU sessions; and
   in an instance in which the one or more PDU sessions are not emergency sessions, an entry for the current PLMN in the received CAG information list includes an indication that the UE is only allowed to access the current PLMN via CAG cells, and the allowed CAG list for the current PLMN in the received CAG information list does not include any CAG identification (CAG-ID), performing a local release of the one or more PDU sessions.

2. The method of claim 1, wherein the configuration update command message comprises one or more of: a fifth-generation-globally unique temporary identity (5G-GUTI), a tracking area identify (TAI) list, one or more allowed network slice selection assistance information (NSSAI), one or more mapped single-NSSAIs, local area data network (LADN) information, a service area list, a mobile indicated connection only (MICO) indication, network identity and time-zone (NITZ) information, one or more configured NSSAI, one or more rejected NSSAI, a network slicing subscription change indication, one or more operator-defined access category definitions, a short message service (SMS) indication, a service gap time value, a UE radio capability identity, a 5G system registration result, or a UE radio capability identity deletion indication.

3. The method of claim 1, wherein the configuration update command message comprises a configuration update indication information element comprising a registration requested bit, the registration requested bit being set to indicate that registration is requested.

4. The method of claim 1, further comprising:
   transmitting, from the UE, towards the network entity of the current PLMN, a PDU session request.

5. An apparatus comprising:
   at least one processor; and
   at least one memory including computer program code,
      the at least one memory and the computer program code configured to, with the at least one processor, cause the apparatus at least to perform:
      receiving a configuration update command message from a network entity of a current public land mobile network (PLMN), the configuration update command message comprising an updated closed access group (CAG) information list;
      determining whether one or more protocol data unit (PDU) sessions are emergency PDU sessions; and
      in an instance in which the one or more PDU sessions are not emergency sessions, an entry for the current PLMN in the received CAG information list includes an indication that the apparatus is only allowed to access the current PLMN via CAG cells, and the allowed CAG list for the current PLMN in the received CAG information list does not include any CAG identification (CAG-ID), performing a local release of the one or more PDU sessions.

6. The apparatus of claim 5, wherein the configuration update command message comprises one or more of: a fifth-generation-globally unique temporary identity (5G-GUTI), a tracking area identify (TAI) list, one or more allowed network slice selection assistance information (NS-SAI), one or more mapped single-NSSAIs, local area data network (LADN) information, a service area list, a mobile indicated connection only (MICO) indication, network identity and time-zone (NITZ) information, one or more configured NSSAI, one or more rejected NSSAI, a network slicing subscription change indication, one or more operator-defined access category definitions, a short message service (SMS) indication, a service gap time value, a UE radio capability identity, a 5G system registration result, or a user equipment radio capability identity deletion indication.

7. The apparatus of claim 5, wherein the configuration update command message comprises a configuration update indication information element comprising a registration requested bit, the registration requested bit being set to indicate that registration is requested.

8. The apparatus of claim 5, wherein the at least one memory and the computer program code are configured to, with the at least one processor, cause the apparatus at least to perform:
transmitting, towards the network entity of the current PLMN, a PDU session request.

9. A method comprising:
receiving, at a user equipment (UE), a configuration update command message from a network entity of a current public land mobile network (PLMN), the configuration update command message comprising an updated closed access group (CAG) information list;
in an instance in which the configuration update command message is received via a particular CAG cell, an entry for the current PLMN in the CAG information list includes an indication that the UE is only allowed to access PLMNs via CAG cells, an allowed CAG list for the current PLMN in the received CAG information list does not include CAG identification information, and the UE has not requested or established an emergency protocol data unit (PDU) session with the current PLMN, entering a deregistered PLMN search state and applying a PLMN selection process based on the updated CAG information list; and
in an instance in which the configuration update command message is received via a particular CAG cell, the entry for the current PLMN in the CAG information list includes an indication that the UE is only allowed to access the current PLMN via CAG cells, the allowed CAG list for the current PLMN in the received CAG information list does not include CAG identification information, and the UE has requested or established an emergency PDU session with the current PLMN, performing a local release of all PDU sessions except for the emergency PDU session.

10. The method of claim 9, further comprising:
in an instance in which the configuration update command message is received via a non-CAG cell, the entry for the current PLMN in the CAG information list includes an indication that the UE is only allowed to access PLMNs CAG cells, the allowed CAG list for the current PLMN in the received CAG information list does not include CAG identification information, and the UE has not requested or established an emergency PDU session with the current PLMN, entering the deregistered PLMN search state and applying the PLMN selection process based on the updated CAG information list.

11. The method of claim 10, further comprising:
in an instance in which the configuration update command message is received via a non-CAG cell, the entry for the current PLMN in the CAG information list includes an indication that the UE is only allowed to access PLMNs CAG cells, the allowed CAG list for the current PLMN in the received CAG information list does not include CAG identification information, and the UE has requested or established an emergency PDU session with the current PLMN, performing the local release of all PDU sessions except for the emergency PDU session.

12. An apparatus comprising:
at least one processor; and
at least one memory including computer program code, the at least one memory and the computer program code configured to, with the at least one processor, cause the apparatus at least to perform:
receiving a configuration update command message from a network entity of a current public land mobile network (PLMN), the configuration update command message comprising an updated closed access group (CAG) information list;
in an instance in which the configuration update command message is received via a particular CAG cell, an entry for the current PLMN in the CAG information list includes an indication that the apparatus is only allowed to access PLMNs via CAG cells, an allowed CAG list for the current PLMN in the received CAG information list does not include CAG identification information, and the apparatus has not requested or established an emergency protocol data unit (PDU) session with the current PLMN, entering a deregistered PLMN search state and applying a PLMN selection process based on the updated CAG information list; and
in an instance in which the configuration update command message is received via a particular CAG cell, the entry for the current PLMN in the CAG information list includes an indication that the apparatus is only allowed to access the current PLMN via CAG cells, the allowed CAG list for the current PLMN in the received CAG information list does not include CAG identification information, and the apparatus has requested or established an emergency PDU session with the current PLMN, performing a local release of all PDU sessions except for the emergency PDU session.

13. The apparatus of claim 12, wherein the at least one memory and the computer program code are configured to, with the at least one processor, cause the apparatus at least to perform:
in an instance in which the configuration update command message is received via a non-CAG cell, the entry for the current PLMN in the CAG information list includes an indication that the apparatus is only allowed to access PLMNs CAG cells, the allowed CAG list for the current PLMN in the received CAG information list does not include CAG identification information, and the apparatus has not requested or established an emergency PDU session with the current PLMN, entering the deregistered PLMN search state and applying the PLMN selection process based on the updated CAG information list.

14. The apparatus of claim 13, wherein the at least one memory and the computer program code are configured to, with the at least one processor, cause the apparatus at least to perform:
  in an instance in which the configuration update command message is received via a non-CAG cell, the entry for the current PLMN in the CAG information list includes an indication that the apparatus is only allowed to access PLMNs CAG cells, the allowed CAG list for the current PLMN in the received CAG information list does not include CAG identification information, and the apparatus has requested or established an emergency PDU session with the current PLMN, performing the local release of all PDU sessions except for the emergency PDU session.

* * * * *